US012107333B2

(12) United States Patent
Wang et al.

(10) Patent No.: US 12,107,333 B2
(45) Date of Patent: Oct. 1, 2024

(54) ANTENNA ASSEMBLY EQUIPPED WITH A SUB-WAVELENGTH STRUCTURED ENHANCER

(71) Applicant: AuthenX Inc., Hsinchu County (TW)

(72) Inventors: Yu-Chun Wang, Hsinchu County (TW); Po-Kuan Shen, Hsinchu County (TW); Sheng-Fu Lin, Hsinchu County (TW); Jenq-Yang Chang, Hsinchu County (TW); Mao-Jen Wu, Hsinchu County (TW)

(73) Assignee: AuthenX Inc., Hsinchu County (TW)

( * ) Notice: Subject to any disclaimer, the term of this patent is extended or adjusted under 35 U.S.C. 154(b) by 121 days.

(21) Appl. No.: 17/944,254

(22) Filed: Sep. 14, 2022

(65) Prior Publication Data

US 2023/0080502 A1 Mar. 16, 2023

Related U.S. Application Data

(60) Provisional application No. 63/243,782, filed on Sep. 14, 2021.

(51) Int. Cl.
*H01Q 19/06* (2006.01)
*H01Q 1/48* (2006.01)
(Continued)

(52) U.S. Cl.
CPC ............... *H01Q 19/06* (2013.01); *H01Q 1/48* (2013.01); *H01Q 9/0414* (2013.01); *H01Q 9/045* (2013.01); *H01Q 21/06* (2013.01)

(58) Field of Classification Search
CPC ............ H01Q 1/24; H01Q 1/48; H01Q 15/08; H01Q 19/06; H01Q 19/062; H01Q 21/06; H01Q 9/0407; H01Q 9/0414; H01Q 9/045
See application file for complete search history.

(56) References Cited

U.S. PATENT DOCUMENTS

2004/0263419 A1* 12/2004 Henderson ............. H01Q 19/06 343/909
2010/0173593 A1* 7/2010 Magne ..................... H04N 7/20 455/77

(Continued)

OTHER PUBLICATIONS

Millimetre Wave Antennas for Gigabit Wireless Communications. IEEE Paper: Antenna Gain Enhancement by Using Low-Infill 3D-Printed Dielectric Lens Antennas.

*Primary Examiner* — Thien M Le

(57) ABSTRACT

This invention provides an antenna assembly equipped with a sub-wavelength structured enhancer, comprising an antenna supporting substrate with a top surface and a bottom surface opposite to each other; a first patch antenna is disposed on the top surface of the antenna supporting substrate or inside of the antenna supporting substrate; a ground layer is disposed under the bottom surface of the antenna supporting substrate; a signal feeding layer for transmitting satellite communicating signals is disposed on one of surfaces of the antenna supporting substrate, or inside of the antenna supporting substrate, or under the first patch antenna, or under a side of the ground layer back to the antenna supporting substrate; and a solid sub-wavelength structured enhancer is disposed above the first patch antenna and spaced with each other by an air gap ranging between 7 mm and 47 mm.

19 Claims, 78 Drawing Sheets

100

(51) Int. Cl.

| | |
|---|---|
| ***H01Q 9/04*** | (2006.01) |
| ***H01Q 21/06*** | (2006.01) |

(56) References Cited

U.S. PATENT DOCUMENTS

| | | | | |
|---|---|---|---|---|
| 2015/0346334 | A1 | 12/2015 | Nagaishi et al. | |
| 2018/0269576 | A1* | 9/2018 | Scarborough | H01Q 3/245 |
| 2019/0245269 | A1* | 8/2019 | Blanda | H01Q 19/08 |
| 2020/0091622 | A1* | 3/2020 | Turpin | H01Q 5/42 |
| 2020/0203796 | A1* | 6/2020 | Riendeau | H04W 88/085 |
| 2020/0295469 | A1* | 9/2020 | Fenn | H01Q 19/19 |
| 2020/0381831 | A1 | 12/2020 | Milroy et al. | |
| 2020/0381842 | A1 | 12/2020 | Milroy et al. | |
| 2022/0119091 | A1* | 4/2022 | Graf | H01Q 1/282 |
| 2022/0190482 | A1* | 6/2022 | Yang | H01Q 15/10 |
| 2023/0053102 | A1* | 2/2023 | Li | H01Q 19/136 |

* cited by examiner

100

200

400

600

700

800

900

900

1000

1100

1300

1900

1900

ANTENNA ASSEMBLY EQUIPPED WITH A SUB-WAVELENGTH STRUCTURED ENHANCER

CROSS-REFERENCE TO RELATED APPLICATION

This application claims the benefit of U.S. provisional application Ser. No. 63/243,782, filed on Sep. 14, 2021, and the subject matter of which is incorporated herein by reference.

BACKGROUND OF THE INVENTION

Field of the Invention

This invention relates generally to an antenna assembly, and more particularly relate to an antenna assembly equipped with a sub-wavelength structured enhancer.

Description of the Prior Art

In the current global population distribution, satellite communication networks may be a solution for those live in remote areas where lacking of internet service. User's terminal equipment needs to be able to continuously track passing satellites and use phased array antennas for signal transmission and reception, and perform electronic multi-beam steering functions to track satellites. However, due to the long distance and weak signals of the satellite, a plurality of phased array antennas and control IC chips are required to improve the signal quality transmitted by the satellite antenna, resulting in higher and higher costs for satellite communication networks.

FIG. 16 is an operation schematic diagram of a conventional phased array antenna 10. The conventional phased array antenna 10 is mainly composed of an array of antenna elements (A) powered by a transmitter (TX), and the feeding current of each antenna element (A) is controlled by a phase shifter (ϕ) controlled by a computer (C). As shown in FIG. 16, when the conventional phased array antenna 10 is operated, the wavefront of the radio waves transmitted by each antenna element (A) is spherical, and they combine (superimpose) in front of the antenna to form plane waves so as to generate a beam of radio waves propagating in a specific direction. The phase shifter (ϕ) delays the radio waves gradually up the line, so each antenna element (A) has a wavefront launch time later than that of the antenna element (A) below it, which causes the generated plane wave to be oriented at an angle θ relative to an axis of the antenna. However, the phase of the signal can be changed electronically by phase shifter (ϕ) controlled by the computer (C), thereby changing the angle θ of the beam and steering the beam of radio waves in different directions.

According to signal feeding methods for the patch antenna as shown in FIG. 3.3 of the book edited by Kao-Cheng Huang et al., (Millimetre Wave Antennas for Gigabit Wireless Communications, published in 2008), and the antenna assembly with two layers of patch antennas disclosed by Space Exploration Technologies Corp. in US20200381831A and US20200381842A, the conventional antenna assembly 1700 as shown in FIGS. 17A~17C, the conventional antenna assembly 1800 as shown in FIGS. 18A~18C, and the conventional antenna assembly 1900 as shown in FIGS. 19A~19C are usually be selected as the antenna element (A) of the conventional phased array antenna 10 as shown in FIG. 16.

As the schematic perspective view, the exploded view and the cross-sectional view along with the cross-sectional line XVII-XVII' shown in FIGS. 17A-17C, the conventional antenna assembly 1700 comprises: an antenna supporting substrate 1710 with a top surface 1710A and a bottom surface 17108 opposite to each other; a first patch antenna 1720 disposed on the top surface 1710A of the antenna supporting substrate 1710; a ground layer 1730 disposed under the bottom surface 17108 of the antenna supporting substrate 1710; a signal feeding line 1740 disposed on the top surface 1710A of the antenna supporting substrate 1710 and connected with the first patch antenna 1720 for transmitting satellite signals.

As the schematic perspective view, the exploded view and the cross-sectional view along with the cross-sectional line XVIII-XVIII' shown in FIGS. 18A-18C, the conventional antenna assembly 1800 comprises: an antenna supporting substrate 1810 with a top surface 1810A and a bottom surface 18108 opposite to each other; a first patch antenna 1820 disposed on the top surface 1810A of the antenna supporting substrate 1810; a ground layer 1830 disposed under the bottom surface 18108 of the antenna supporting substrate 1810 corresponding to the first patch antenna 1820; a signal feeding line 1840 disposed under the first patch antenna 1820, and the signal feeding line 1840 connected with the first patch antenna 1820 by running through the ground layer 1830 and the antenna supporting substrate 1810 for transmitting satellite signals.

As the schematic perspective view, the exploded view and the cross-sectional view along with the cross-sectional line XIX-XIX' shown in FIGS. 19A-19C, the conventional antenna assembly 1900 comprises: an antenna supporting substrate 1910 with a top surface 1910A and a bottom surface 19108 opposite to each other; a first patch antenna 1920 disposed on the top surface 1910A of the antenna supporting substrate 1910; a ground layer 1930 disposed under the bottom surface 19108 of the antenna supporting substrate 1910; a signal feeding line 1940 is disposed under a side of the ground layer 1930 opposite to the antenna supporting substrate 1910, the signal feeding line 1940 and the ground layer 1930 are spaced apart by an insulating layer 1935, wherein the ground layer 1930 has a coupling slit 1932 corresponding to the first patch antenna 1920 and the second patch antenna 1980, and a vertical projection of a first long axis direction L1 of the signal feeding line 1940 and a vertical projection of a second long axis direction L2 of the coupling slit 1932 are substantially orthogonal to each other to transmit the satellite signals by coupling effect.

The biggest disadvantage of the conventional phased array antenna 10 as shown in FIG. 16 is a large number of antenna elements (A) are required to maintain the signal intensity and quality of the radio waves transmitted by the conventional phased array antenna 10. Therefore, the conventional phased array antenna 10 usually has a huge size and can't meet user's need of size reduction of the satellite antenna, which is not conducive to the popularization of the network in remote areas In order to solve above disadvantage, Kao-Cheng Huang et al., disclosed a hemisphere-shaped enhancer 20 as shown in FIG. 20 and a cannonball-shaped enhancer 21 as shown in FIG. 21 in 2008 (Millimetre Wave Antennas for Gigabit Wireless Communications), and Hitachi Automotive System, Ltd., disclosed a inclined cannonball-shaped enhancer 22 as shown in FIG. 22 in US20150346334A. Either the hemisphere-shaped enhancer 20, the cannonball-shaped enhancer 21 or the inclined cannonball-shaped enhancer 22 was used to completely cap the patch antenna of an antenna assembly to make the radio waves transmitted by the antenna assembly with a good signal intensity and quality by means of enhancing the radio waves through continuous reflection and/or refraction before being transmitted out of the antenna assembly. However, the enhancement of the conventional antenna assemblies equipped with the hemisphere-shaped enhancer 20, the cannonball-shaped enhancer 21 or the inclined cannonball-shaped enhancer 22 is poor.

Accordingly, an antenna assembly can enhance the signal intensity and quality of the radio waves transmitted thereby to promote downsizing of a satellite antenna is highly expected by the industry.

SUMMARY OF THE INVENTION

One aspect of this invention is to provide an antenna assembly equipped with a sub-wavelength structured enhancer, comprising: an antenna supporting substrate with a top surface and a bottom surface opposite to each other; a first patch antenna disposed on the top surface of the antenna supporting substrate or disposed inside of the antenna supporting substrate; a ground layer disposed under the bottom surface of the antenna supporting substrate; a signal feeding line for transmitting satellite signals disposed on one of surfaces of the antenna supporting substrate, or inside of the antenna supporting substrate, or under the first patch antenna, or under a side of the ground layer back to the antenna supporting substrate; and a sub-wavelength structured enhancer disposed above the first patch antenna, wherein the sub-wavelength structured enhancer is a solid structure and spaced with the first patch antenna by an air gap ranging between 7 mm and 47 mm, and a vertical projection of the sub-wavelength structured enhancer overlaps with a vertical projection of the first patch antenna; wherein a maximum 1 D linear dimension of the vertical projection of the sub-wavelength structured enhancer is not greater than the wavelength of Ku band, and the maximum 1 D linear dimension of the vertical projection of the sub-wavelength structured enhancer is greater than or equal to a maximum 1 D linear dimension of the vertical projection of the first patch antenna to make the satellite signals be diffracted when passing through the sub-wavelength structured enhancer.

The antenna assembly equipped with a sub-wavelength structured enhancer as mentioned above, wherein the sub-wavelength structured enhancer is made of a non-metallic material.

The antenna assembly equipped with a sub-wavelength structured enhancer as mentioned above, wherein the sub-wavelength structured enhancer has a polygonal bottom or a circular bottom.

The antenna assembly equipped with a sub-wavelength structured enhancer as mentioned above, wherein the sub-wavelength structured enhancer has a structure of polygonal cylinder, polygonal pyramid, cylinder, cone, sphere, or hemisphere.

The antenna assembly equipped with a sub-wavelength structured enhancer as mentioned above, wherein the maximum 1 D linear dimension of the vertical projection of the sub-wavelength structured enhancer is not greater than 25 mm.

The antenna assembly equipped with a sub-wavelength structured enhancer as mentioned above, wherein the signal feeding line and the first patch antenna are disposed on a same or different surfaces of the antenna supporting substrate and connected to each other.

The antenna assembly equipped with a sub-wavelength structured enhancer as mentioned above, wherein the signal feeding line is disposed under the first patch antenna, and the signal feeding line connects with the first patch antenna by running through the ground layer and part or all of the antenna supporting substrate.

The antenna assembly equipped with a sub-wavelength structured enhancer as mentioned above, wherein the signal feeding line is disposed under a side of the ground layer back to the antenna supporting substrate, and the ground layer has a coupling slit corresponding to the first patch antenna, and a vertical projection of a first long axis direction L1 of the signal feeding line and a vertical projection of a second long axis direction L2 of the coupling slit are substantially orthogonal to each other to transmit the satellite signals by coupling effect.

The antenna assembly equipped with a sub-wavelength structured enhancer as mentioned above, wherein the antenna assembly equipped with a sub-wavelength structured enhancer further comprises a second patch antenna disposed inside of the antenna supporting substrate when the first patch antenna is disposed on the top surface of the antenna supporting substrate, wherein the signal feeding line and the second patch antenna are disposed on a same or different surfaces of the antenna supporting substrate and connected with each other, or the signal feeding line is disposed under the second patch antenna and connected to the second patch antenna by running through part of the antenna supporting substrate and the ground layer, or the signal feeding line is disposed under a side of the ground layer back to the antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

The antenna assembly equipped with a sub-wavelength structured enhancer as mentioned above, wherein the antenna assembly equipped with a sub-wavelength structured enhancer further comprises a second patch antenna disposed on the bottom surface of the antenna supporting substrate when the first patch antenna is disposed on the top surface of the antenna supporting substrate, wherein the signal feeding line is disposed under a side of the ground layer back to the antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

The antenna assembly equipped with a sub-wavelength structured enhancer as mentioned above, wherein the maximum 1 D linear dimension of the vertical projection of the sub-wavelength structured enhancer is N-fold of the maximum 1 D linear dimension of the vertical projection of the first patch antenna, and $1 \le N \le$ ratio of [(wavelength of Ku band)/(the maximum 1 D linear dimension of the vertical projection of the first patch antenna)].

Another aspect of this invention is to provide another antenna assembly equipped with a sub-wavelength structured enhancer, comprising: a first antenna supporting substrate with a first top surface and a first bottom substrate opposite to each other; a first patch antenna disposed on the first top surface or the first bottom surface of the first antenna supporting substrate, or disposed inside of the first antenna supporting substrate; a second antenna supporting substrate with a second top surface and a second bottom substrate opposite to each other, wherein the second antenna supporting substrate is disposed under the first antenna supporting substrate, and the second top surface of the second antenna supporting substrate is facing to the first bottom surface of the first antenna supporting substrate; a second patch antenna disposed on the second top surface of the second antenna supporting substrate or disposed inside of the second antenna supporting substrate; a ground layer disposed under the second bottom surface of the second antenna supporting substrate; a signal feeding line for transmitting satellite signals disposed on one of surfaces of the second antenna supporting substrate, or inside the second antenna supporting substrate, or under the second patch antenna, or under a side of the ground layer back to the second antenna supporting substrate; and a sub-wavelength structured enhancer disposed above the first patch antenna, wherein the sub-wavelength structured enhancer is a solid structure and spaced with the first patch antenna by an air gap ranging between 7 mm and 47 mm, and a vertical projection of the sub-wavelength structured enhancer overlaps with a vertical projection of the first patch antenna and a vertical projection of the second patch antenna; wherein a maximum 1 D linear dimension of the vertical projection of the sub-wavelength structured enhancer is not greater than the wavelength of Ku band, and the maximum 1 D linear dimension of the vertical projection of the sub-wavelength structured enhancer is greater than or equal to a maximum 1 D linear dimension of the vertical projection of the first patch antenna to make the satellite signals be diffracted when passing through the sub-wavelength structured enhancer.

The another antenna assembly equipped with a sub-wavelength structured enhancer as mentioned above, wherein the sub-wavelength structured enhancer is made of a non-metallic material.

The another antenna assembly equipped with a sub-wavelength structured enhancer as mentioned above, wherein the sub-wavelength structured enhancer has a polygonal bottom or a circular bottom.

The another antenna assembly equipped with a sub-wavelength structured enhancer as mentioned above, wherein the sub-wavelength structured enhancer has a structure of polygonal cylinder, polygonal pyramid, cylinder, cone, sphere, or hemisphere.

The another antenna assembly equipped with a sub-wavelength structured enhancer as mentioned above, wherein the maximum 1 D linear dimension of the vertical projection of the sub-wavelength structured enhancer is not greater than 25 mm.

The another antenna assembly equipped with a sub-wavelength structured enhancer as mentioned above, wherein the signal feeding line and the second patch antenna are disposed on a same or different surfaces of the second antenna supporting substrate and connected to each other.

The another antenna assembly equipped with a sub-wavelength structured enhancer as mentioned above, wherein the signal feeding line is disposed under the second patch antenna, and the signal feeding line connects with the second patch antenna by running through the ground layer and part or all of the second antenna supporting substrate.

The another antenna assembly equipped with a sub-wavelength structured enhancer as mentioned above, wherein the signal feeding line is disposed under a side of the ground layer back to the second antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

The another antenna assembly equipped with a sub-wavelength structured enhancer as mentioned above, wherein the maximum 1D linear dimension of the vertical projection of the sub-wavelength structured enhancer is N-fold of the maximum 1 D linear dimension of the vertical projection of the first patch antenna, and 1≤N≤ratio of [(wavelength of Ku band)/(the maximum 1 D linear dimension of the vertical projection of the first patch antenna)].

DETAILED DESCRIPTION OF THE INVENTION

Figure 1A:
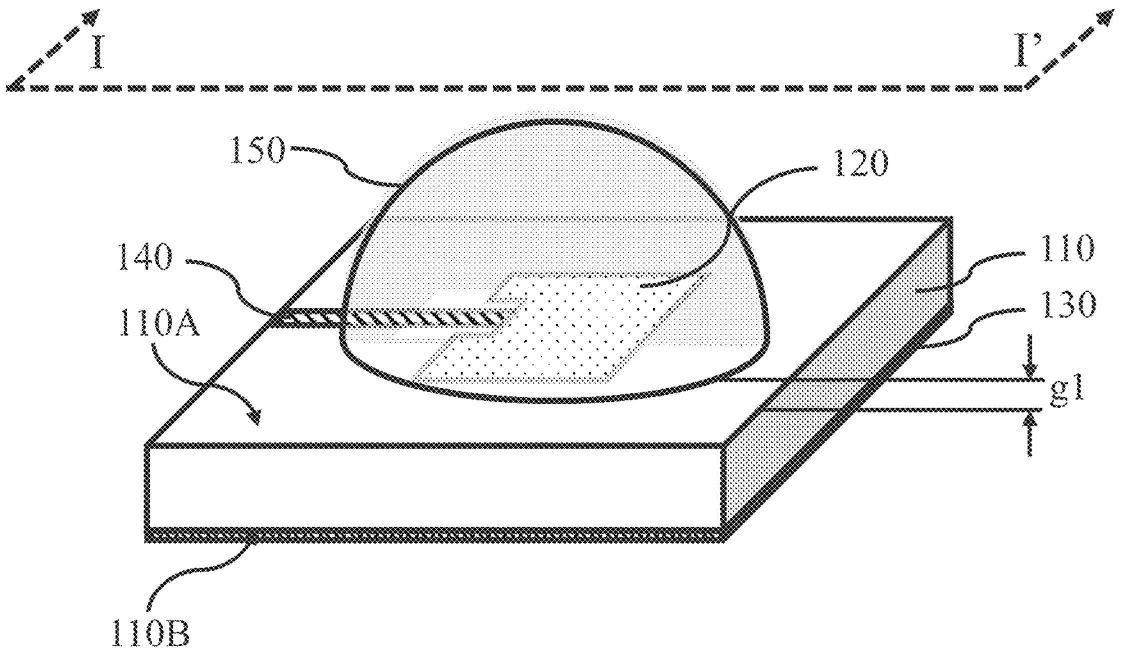
FIGS. 1A~1D are a schematic perspective view, an exploded view, a cross-sectional view along with the cross-sectional line I-I' and a vertical projection of an antenna assembly equipped with a sub-wavelength structured enhancer according to Embodiment 1 of this invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The presently disclosed inventive concepts are not intended to be limited to the embodiments shown herein, but are to be accorded their full scope consistent with the principles underlying the disclosed concepts herein. Directions and references to an element, such as "up", "down", "upper", "lower", "horizontal", "vertical" and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or". As used herein, ranges and subranges mean all ranges including whole and/or fractional values therein and language which defines or modifies ranges and subranges, such as "at least" "greater than" "less than" "no more than" and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. The term "gain" in this specification refers to the ratio of the radiation intensity in a given direction when the power received by the antenna is radiated anisotropically. The term "directivity gain" in this specification refers to the ratio of the radiant intensity in a given direction to the average radiant intensity in all directions. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims.

Embodiments

The sub-wavelength structure is characterized in having a size smaller than the operating wavelength (especially the radio waves), and the interaction between radio waves and sub-wavelength structure is not by way of ray penetration but by wave way of diffraction due to their small size. Therefore, in order to improve the shortcomings of poor signal intensity and quality of the radio wave transmitted by the conventional antenna assembly, this present invention utilize a sub-wavelength structured enhancer to replace the conventional hemisphere-shaped enhancer, the conventional cannonball-shaped enhancer and the conventional inclined cannonball-shaped enhancer. The sub-wavelength structured enhancer of this present invention is solid and disposed above the first patch antenna of an antenna assembly by spacing with the he first patch antenna of an antenna assembly by an air gap g1 ranging between 7 mm and 47 mm. The vertical projection of the first patch antenna and the vertical projection of the sub-wavelength structured enhancer overlap with each other, and the maximum 1D linear dimension D1 of the vertical projection of the sub-wavelength structured enhancer is not greater than the wavelength of Ku band (25.0 mm), and the maximum 1D linear dimension D1 of the vertical projection of the sub-wavelength structured enhancer is greater than or equal to the maximum 1D linear dimension D2 of the vertical projection of the first patch antenna, for example but not limited to the maximum 1D linear dimension D1 of the vertical projection of the sub-wavelength structured enhancer is N-fold of the maximum 1D linear dimension D2 of the vertical projection of the first patch antenna, wherein 1≤N≤ratio of [(wavelength of Ku band)/(the maximum 1D linear dimension D2 of the vertical projection of the first patch antenna)] to make the satellite signals be diffracted when passing through the sub-wavelength structured enhancer and combined (superimposed) to generate a standing wave thereafter, which makes radio waves with stronger signal intensity and higher quality can be transmitted by the antenna assembly equipped with a sub-wavelength structured enhancer according to this present invention. Consequently, the satellite antenna can be integrated with a small number of antenna assemblies, and the volume of the satellite antenna can be greatly reduced, which is helpful to meet user's demand for reducing the size of the antenna. The antenna assembles equipped with a sub-wavelength structured enhancer according to this present invention will be exemplarily described in following Embodiments 1~13.

Embodiment 1

This present Embodiment 1 discloses an antenna assembly 100 equipped with a sub-wavelength structured enhancer as shown in FIGS. 1A~1D.

Figure 1B:
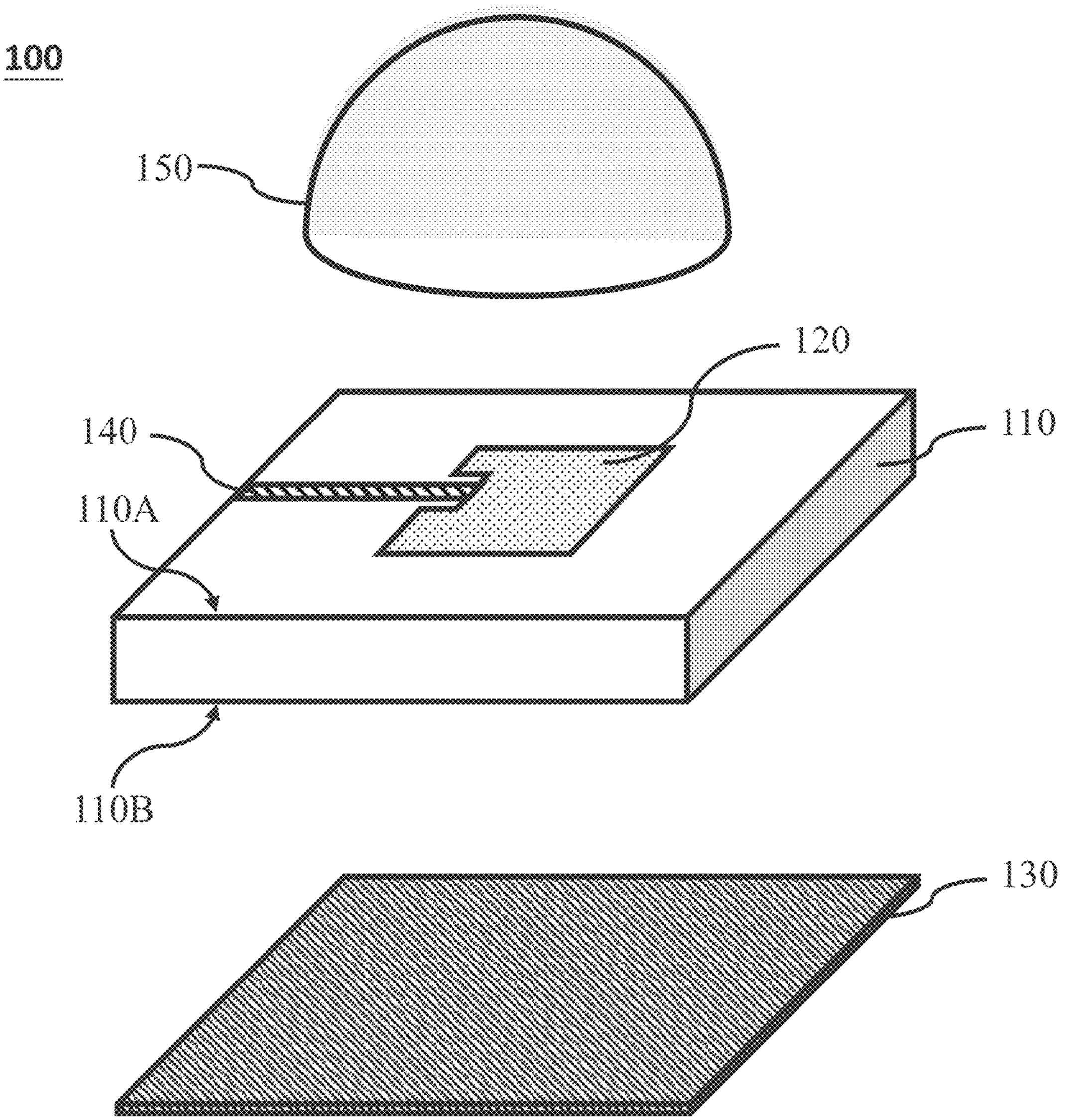
Figure 1C:
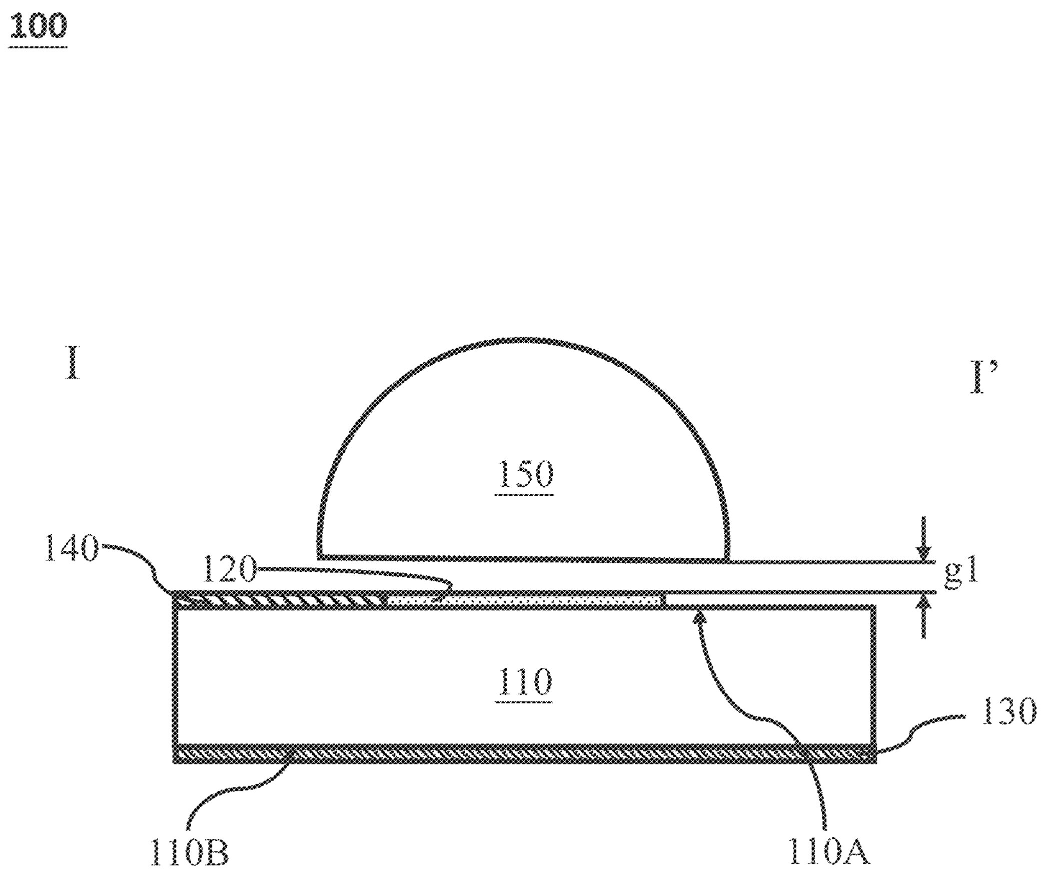

As the schematic perspective view, the exploded view and the cross-sectional view along with the cross-sectional line I-I' shown in FIGS. 1A~1C, the antenna assembly 100 equipped with a sub-wavelength structured enhancer comprises: an antenna supporting substrate 110 with a top surface 110A and a bottom surface 1108 opposite to each other; a first patch antenna 120 disposed on the top surface 110A of the antenna supporting substrate 110; a ground layer 130 disposed under the bottom surface 1108 of the antenna supporting substrate 110; a signal feeding line 140 disposed on the top surface 110A of the antenna supporting substrate 110 and connected with the first patch antenna 120 for transmitting satellite signals; and a sub-wavelength structured enhancer 150 disposed above the first patch antenna 120, wherein the sub-wavelength structured enhancer 150 is a solid structure and spaced with the first patch antenna 120 by an air gap g1 of 10 mm. The air gap g1 between the sub-wavelength structured enhancer 150 and the first patch antenna 120 of other embodiments according to this present invention can be selected in the range of 7 mm to 47 mm as demand.

Figure 1D:
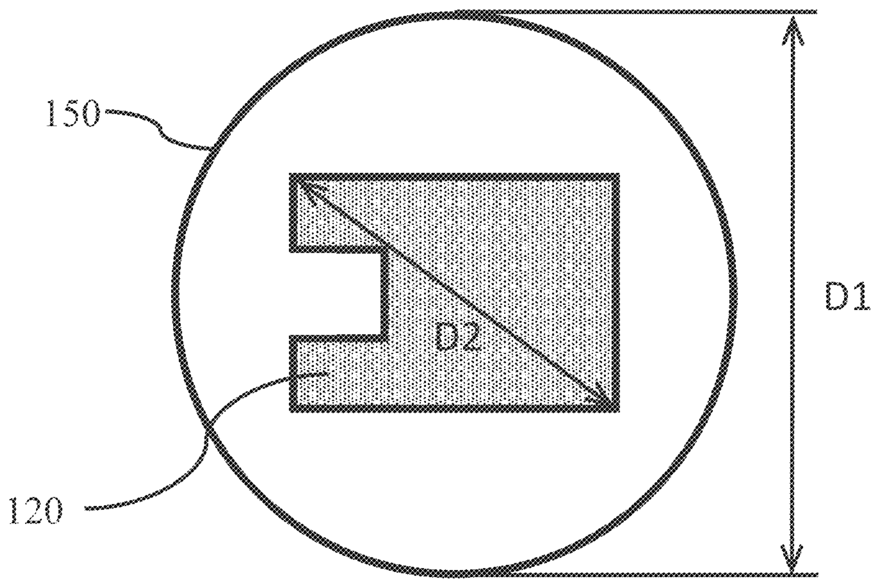

FIG. 1D is a vertical projection of the first patch antenna 120 and the sub-wavelength structured enhancer 150 of the antenna assembly 100 equipped with a sub-wavelength structured enhancer according to Embodiment 1 of this invention. As shown in FIG. 1D, the vertical projection of the first patch antenna 120 and the vertical projection of the sub-wavelength structured enhancer 150 overlap with each other, and the maximum 1D linear dimension D1 of the vertical projection of the sub-wavelength structured enhancer 150 is not greater than the wavelength of Ku band (25.0 mm), and the maximum 1D linear dimension D1 of the vertical projection of the sub-wavelength structured enhancer 150 is greater than or equal to the maximum 1D linear dimension D2 of the vertical projection of the first patch antenna 120, for example but not limited to the maximum 1D linear dimension D1 of the vertical projection of the sub-wavelength structured enhancer 150 is N-fold of the maximum 1D linear dimension D2 of the vertical projection of the first patch antenna 120, wherein 1≤N≤ratio of [(wavelength of Ku band)/(the maximum 1D linear dimension D2 of the vertical projection of the first patch antenna 120)] to make the satellite signals be diffracted when passing through the sub-wavelength structured enhancer 150. The maximum 1D linear dimension D2 of the vertical projection of the first patch antenna 120 of this present Embodiment 1 is 6 mm, and the wavelength of Ku band is 24 mm, therefore N is in the ranging between 1 and 4 and the maximum 1D linear dimension D1 of the vertical projection of the sub-wavelength structured enhancer 150 is in the ranging between 6 mm and 24 mm based on the calculation of the equation mentioned above. According to other embodiments of this present invention, a sub-wavelength structured enhancer 150 with a different maximum 1D linear dimension D1 and a first patch antenna 120 with a different maximum 1D linear dimension D2 can also be selected as demand.

The vertical projection of the first patch antenna 120 of this present Embodiment 1 is a concave shape. However, other vertical projections for example but not limited to a rectangle shape, a circular shape, a polygonal shape or a petal shape of the first patch antenna 120 can also be selected as demand in other embodiments according to this present invention.

Figure 14A:
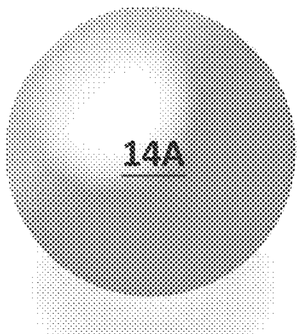
FIGS. 14A~14E are various schematic drawings of solid sub-wavelength structured enhancers suitable for antenna assemblies according to embodiments of this invention.
Figure 14B:
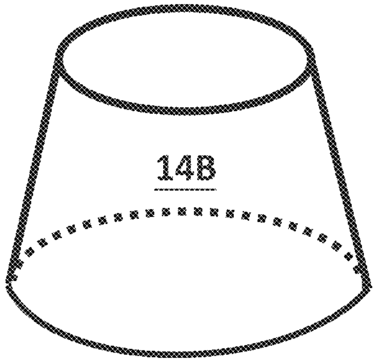
Figure 14C:
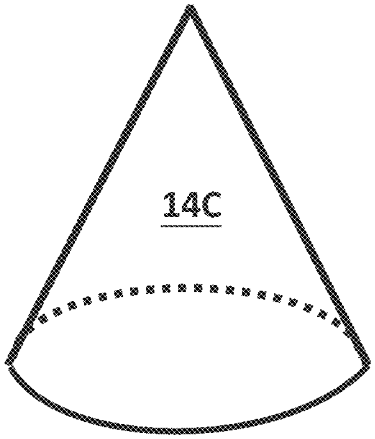
Figure 14D:
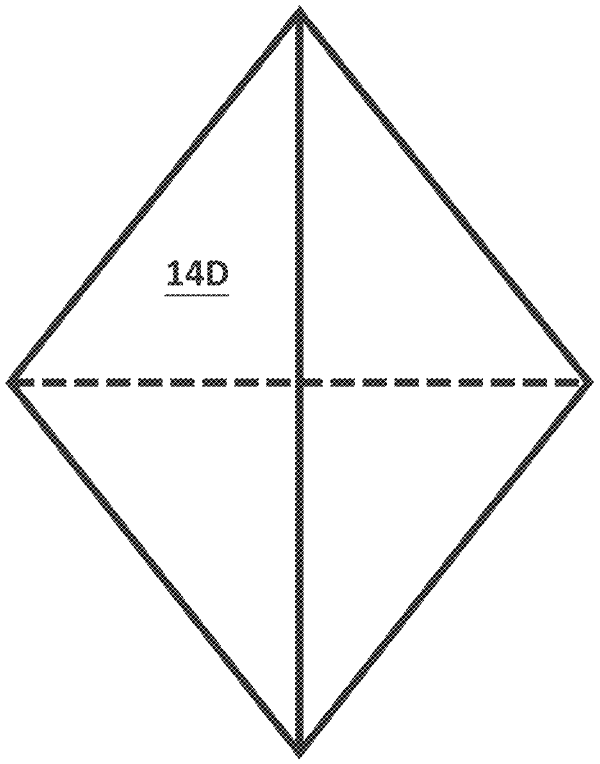
Figure 14E:
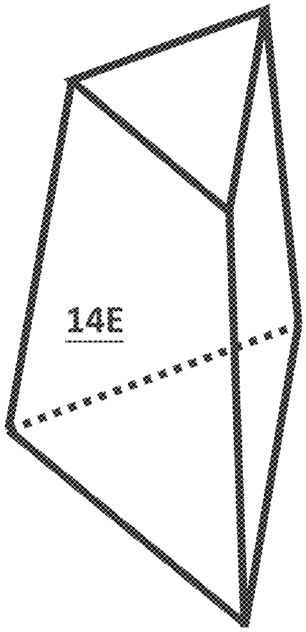

The sub-wavelength structured enhancer 150 of this present Embodiment 1 is made of a non-metallic material, for example but not limited to plastic, glass or ceramic. Moreover, the sub-wavelength structured enhancer 150 of this present Embodiment 1 has a structure of solid hemisphere. Other sub-wavelength structured enhancer 150 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 2

This present Embodiment 2 discloses an antenna assembly 200 equipped with a sub-wavelength structured enhancer as shown in FIGS. 2A~2D.

Figure 2A:
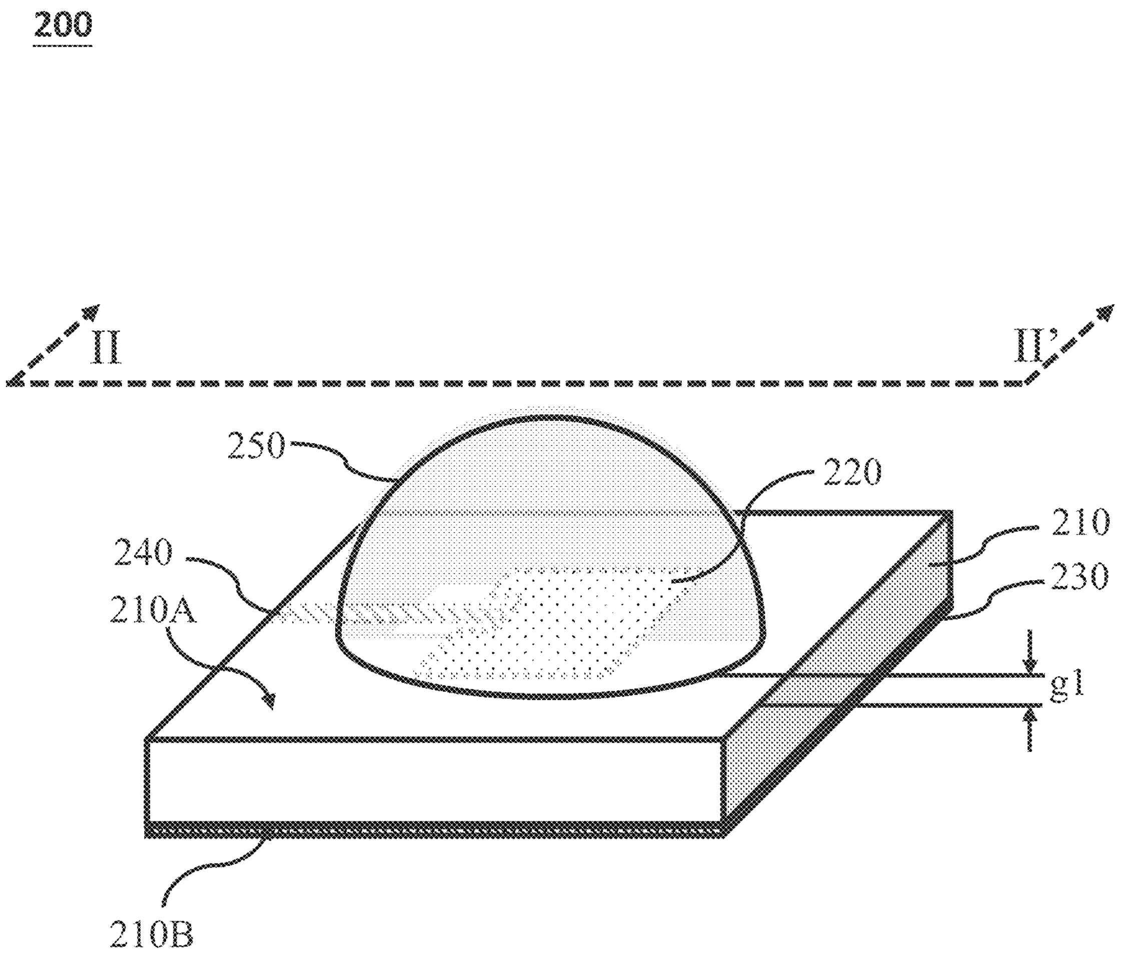
FIGS. 2A~2D are a schematic perspective view, an exploded view, a cross-sectional view along with the cross-sectional line II-II' and a vertical projection of an antenna assembly equipped with a sub-wavelength structured enhancer according to Embodiment 2 of this invention.
Figure 2B:
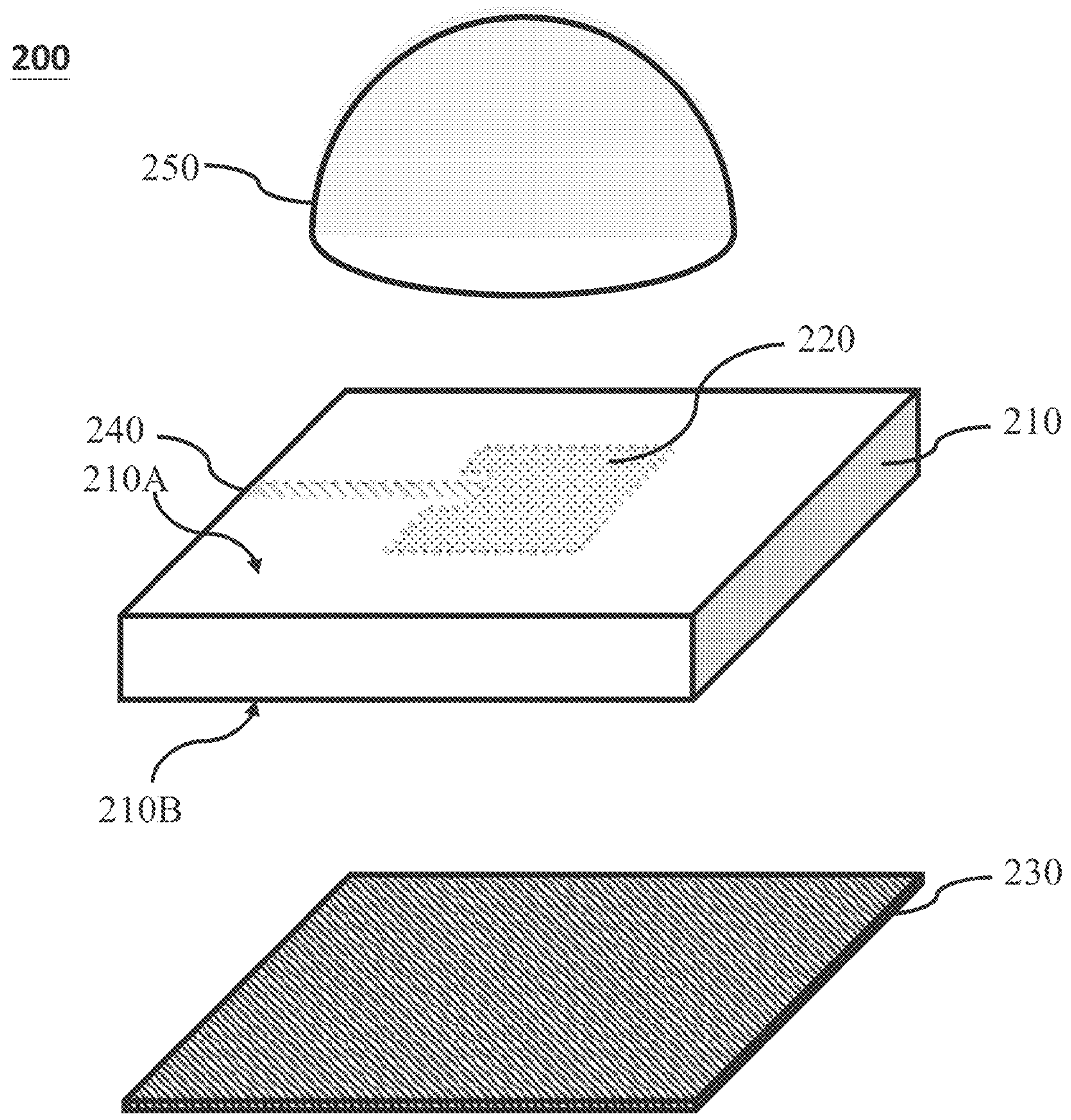
Figure 2C:
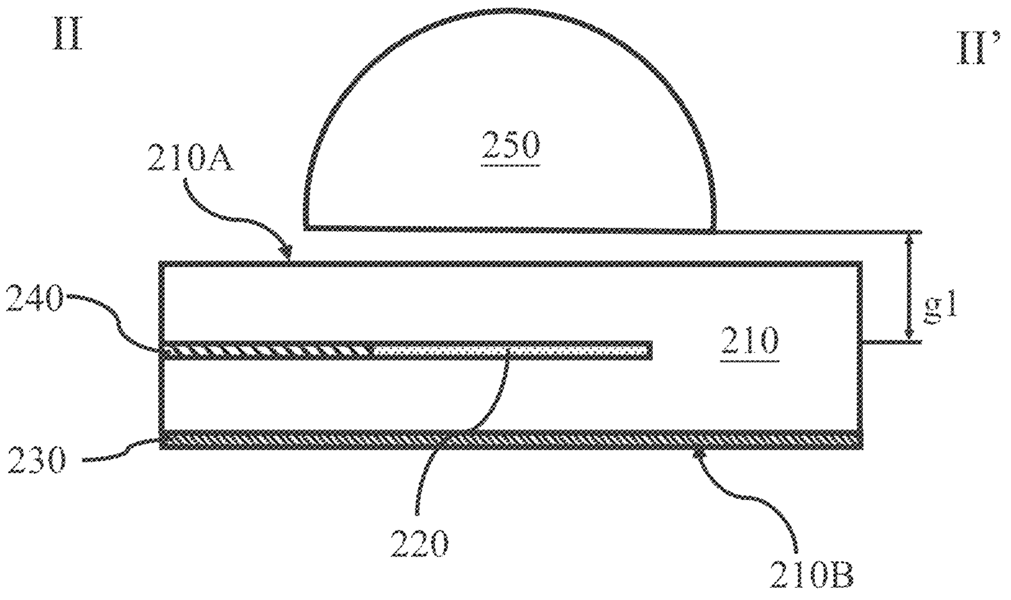

As the schematic perspective view, the exploded view and the cross-sectional view along with the cross-sectional line II-II' shown in FIGS. 2A~2C, the antenna assembly 200 equipped with a sub-wavelength structured enhancer comprises: an antenna supporting substrate 210 with a top surface 210A and a bottom surface 210B opposite to each other; a first patch antenna 220 disposed inside of the antenna supporting substrate 210; a ground layer 230 disposed under the bottom surface 210B of the antenna supporting substrate 210; a signal feeding line 240 disposed inside of the antenna supporting substrate 210 and connected with the first patch antenna 220 for transmitting satellite signals; and a sub-wavelength structured enhancer 250 disposed above the first patch antenna 220, wherein the sub-wavelength structured enhancer 250 is a solid structure and spaced with the first patch antenna 220 by an air gap g1 of 10 mm. The air gap g1 between the sub-wavelength structured enhancer 250 and the first patch antenna 220 of other embodiments according to this present invention can be selected in the range of 7 mm to 47 mm as demand. The signal feeding line 240 for transmitting satellite signals and the first patch antenna 220 can be disposed on a same or different substrate inside of the antenna supporting substrate 210 as demand.

Figure 2D:
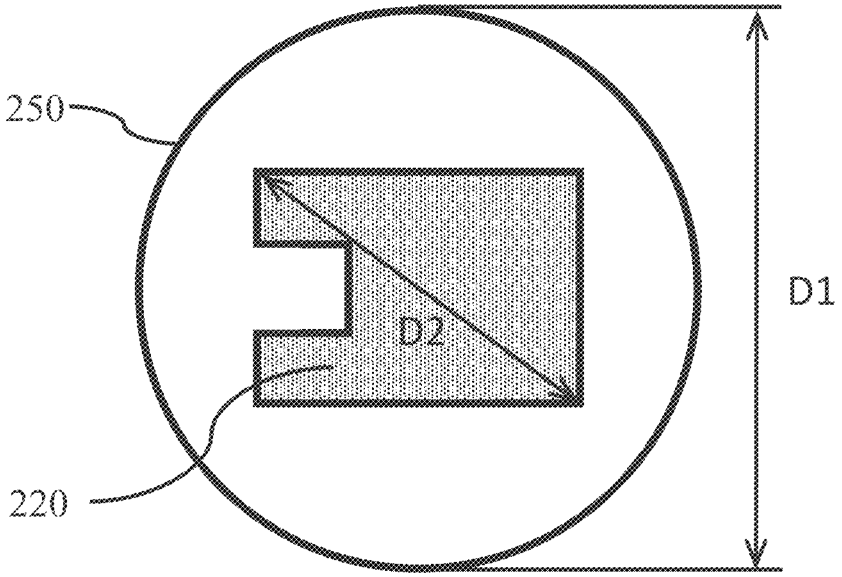

FIG. 2D is a vertical projection of the first patch antenna 220 and the sub-wavelength structured enhancer 250 of the antenna assembly 200 equipped with a sub-wavelength structured enhancer according to Embodiment 2 of this invention. As shown in FIG. 2D, the vertical projection of the first patch antenna 220 and the vertical projection of the sub-wavelength structured enhancer 250 overlap with each other, and the maximum 1D linear dimension D1 of the vertical projection of the sub-wavelength structured enhancer 250 is not greater than the wavelength of Ku band (25.0 mm), and the maximum 1D linear dimension D1 of the vertical projection of the sub-wavelength structured enhancer 250 is greater than or equal to the maximum 1D linear dimension D2 of the vertical projection of the first patch antenna 220, for example but not limited to the maximum 1D linear dimension D1 of the vertical projection of the sub-wavelength structured enhancer 250 is N-fold of the maximum 1D linear dimension D2 of the vertical projection of the first patch antenna 220, wherein 1≤N≤ratio of [(wavelength of Ku band)/(the maximum 1D linear dimension D2 of the vertical projection of the first patch antenna 220)] to make the satellite signals be diffracted when passing through the sub-wavelength structured enhancer 250. The maximum 1D linear dimension D2 of the vertical projection of the first patch antenna 220 of this present Embodiment 2 is 6 mm, and the wavelength of Ku band is 24 mm, therefore N is in the ranging between 1 and 4 and the maximum 1D linear dimension D1 of the vertical projection of the sub-wavelength structured enhancer 250 is in the ranging between 6 mm and 24 mm based on the calculation of the equation mentioned above. According to other embodiments of this present invention, a sub-wavelength structured enhancer 250 with a different maximum 1D linear dimension D1 and a first patch antenna 220 with a different maximum 1D linear dimension D2 can also be selected as demand.

The vertical projection of the first patch antenna 220 of this present Embodiment 2 is a concave shape. However, other vertical projections for example but not limited to a rectangle shape, a circular shape, a polygonal shape or a petal shape of the first patch antenna 220 can also be selected as demand in other embodiments according to this present invention.

The sub-wavelength structured enhancer 250 of this present Embodiment 2 is made of a non-metallic material, for example but not limited to plastic, glass or ceramic. Moreover, the sub-wavelength structured enhancer 250 of this present Embodiment 2 has a structure of solid hemisphere. Other sub-wavelength structured enhancer 250 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 3

This present Embodiment 3 discloses an antenna assembly 300 equipped with a sub-wavelength structured enhancer as shown in FIGS. 3A~3D.

Figure 3A:
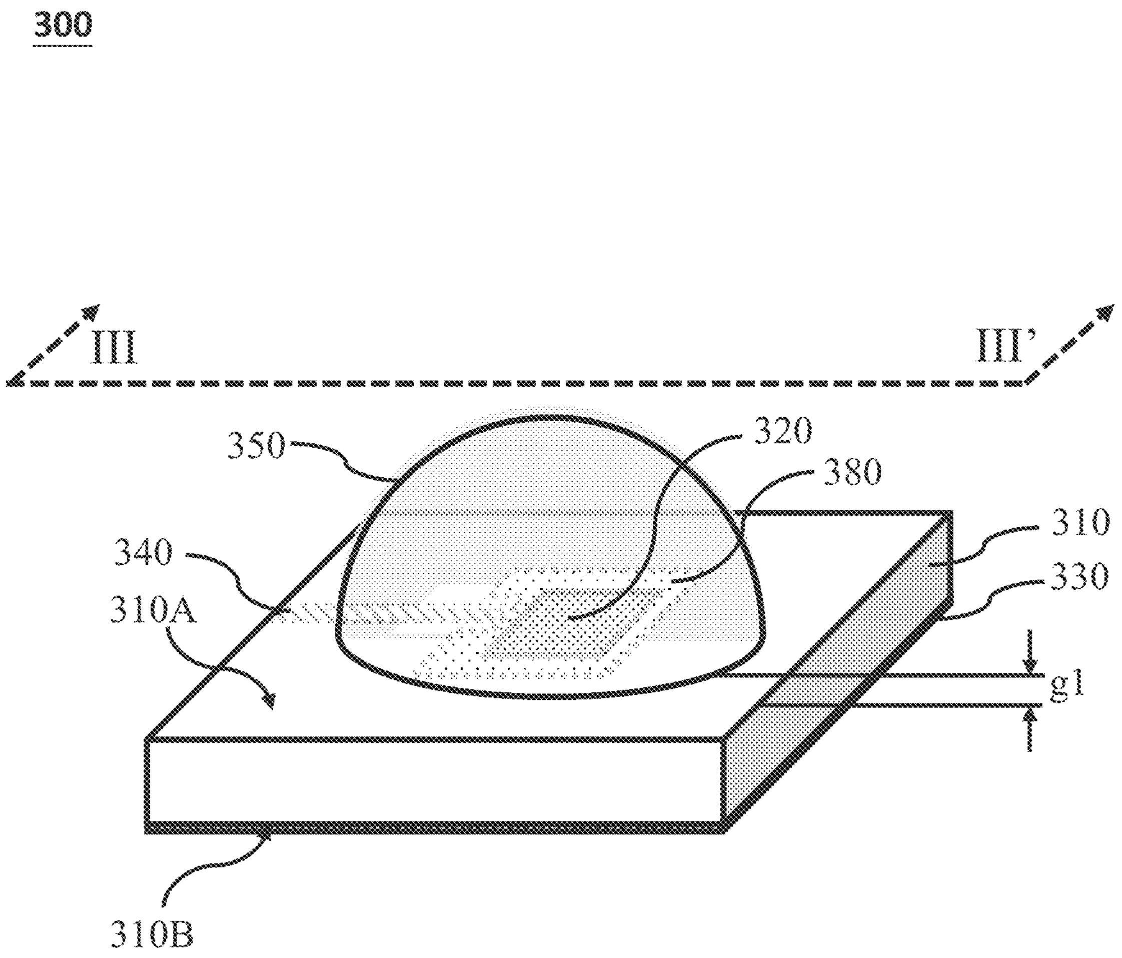
FIGS. 3A~3D are a schematic perspective view, an exploded view, a cross-sectional view along with the cross-sectional line III-III' and a vertical projection of an antenna assembly equipped with a sub-wavelength structured enhancer according to Embodiment 3 of this invention.
Figure 3B:
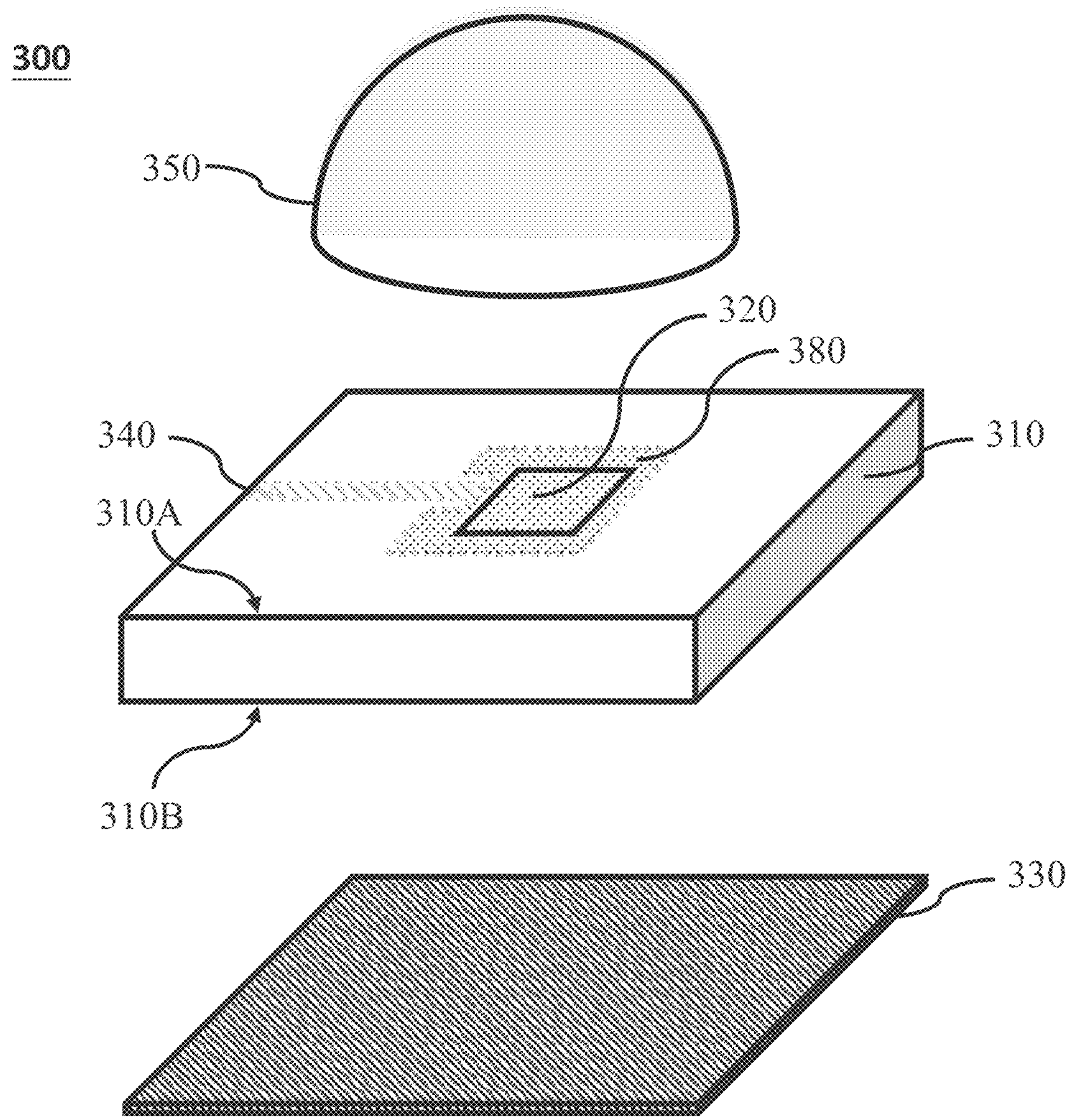
Figure 3C:
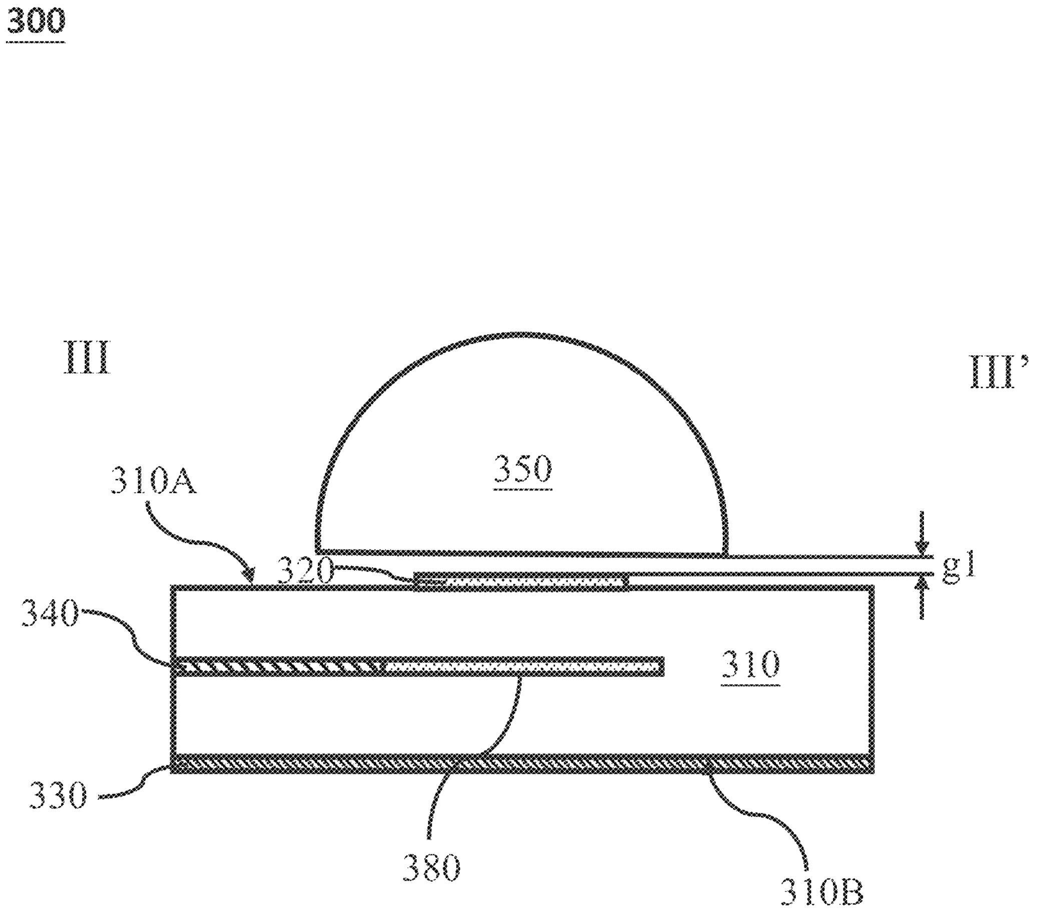

As the schematic perspective view, the exploded view and the cross-sectional view along with the cross-sectional line II-III' shown in FIGS. 3A~3C, the antenna assembly 300 equipped with a sub-wavelength structured enhancer comprises: an antenna supporting substrate 310 with a top surface 310A and a bottom surface 310B opposite to each other; a first patch antenna 320 disposed on the top surface 310A of the antenna supporting substrate 310; a second patch antenna 380 disposed inside of the antenna supporting substrate 310; a ground layer 330 disposed under the bottom surface 3108 of the antenna supporting substrate 310; a signal feeding line 340 disposed inside of the antenna supporting substrate 310 and connected with the second patch antenna 380 for transmitting satellite signals; and a sub-wavelength structured enhancer 350 disposed above the first patch antenna 320, wherein the sub-wavelength structured enhancer 350 is a solid structure and spaced with the first patch antenna 320 by an air gap g1 of 10 mm. The air gap g1 between the sub-wavelength structured enhancer 350 and the first patch antenna 320 of other embodiments according to this present invention can be selected in the range of 7 mm to 47 mm as demand. The signal feeding line 340 for transmitting satellite signals and the second patch antenna 380 can be disposed on a same or different substrate inside of the antenna supporting substrate 310 as demand.

Figure 3D:
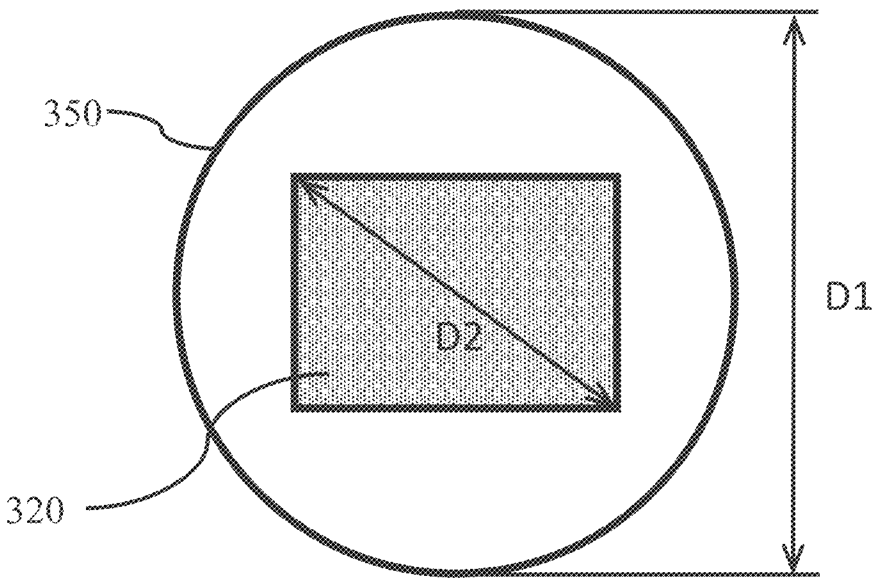

FIG. 3D is a vertical projection of the first patch antenna 320 and the sub-wavelength structured enhancer 350 of the antenna assembly 300 equipped with a sub-wavelength structured enhancer according to Embodiment 3 of this invention. As shown in FIG. 3D, the vertical projection of the first patch antenna 320 and the vertical projection of the sub-wavelength structured enhancer 350 overlap with each other, and the maximum 1D linear dimension D1 of the vertical projection of the sub-wavelength structured enhancer 350 is not greater than the wavelength of Ku band (25.0 mm), and the maximum 1D linear dimension D1 of the vertical projection of the sub-wavelength structured enhancer 350 is greater than or equal to the maximum 1D linear dimension D2 of the vertical projection of the first patch antenna 320, for example but not limited to the maximum 1D linear dimension D1 of the vertical projection of the sub-wavelength structured enhancer 350 is N-fold of the maximum 1D linear dimension D2 of the vertical projection of the first patch antenna 320, wherein 1≤N≤ratio of [(wavelength of Ku band)/(the maximum 1D linear dimension D2 of the vertical projection of the first patch antenna 320)] to make the satellite signals be diffracted when passing through the sub-wavelength structured enhancer 350. The maximum 1D linear dimension D2 of the vertical projection of the first patch antenna 320 of this present Embodiment 3 is 6 mm, and the wavelength of Ku band is 24 mm, therefore N is in the ranging between 1 and 4 and the maximum 1D linear dimension D1 of the vertical projection of the sub-wavelength structured enhancer 350 is in the ranging between 6 mm and 24 mm based on the calculation of the equation mentioned above. According to other embodiments of this present invention, a sub-wavelength structured enhancer 350 with a different maximum 1D linear dimension D1 and a first patch antenna 320 with a different maximum 1D linear dimension D2 can also be selected as demand.

The vertical projection of the first patch antenna 320 of this present Embodiment 3 is a rectangle shape. However, other vertical projections for example but not limited to a concave shape, a circular shape, a polygonal shape or a petal shape of the first patch antenna 320 can also be selected as demand in other embodiments according to this present invention.

The vertical projection of the second patch antenna 380 of this present Embodiment 3 is a rectangle shape. However, other vertical projections for example but not limited to a concave shape, a circular shape, a polygonal shape or a petal shape of the second patch antenna 380 can also be selected as demand in other embodiments according to this present invention.

The sub-wavelength structured enhancer 350 of this present Embodiment 3 is made of a non-metallic material, for example but not limited to plastic, glass or ceramic. Moreover, the sub-wavelength structured enhancer 350 of this present Embodiment 3 has a structure of solid hemisphere. Other sub-wavelength structured enhancer 350 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 4

This present Embodiment 4 discloses an antenna assembly 400 equipped with a sub-wavelength structured enhancer as shown in FIGS. 4A~4D.

Figure 4A:
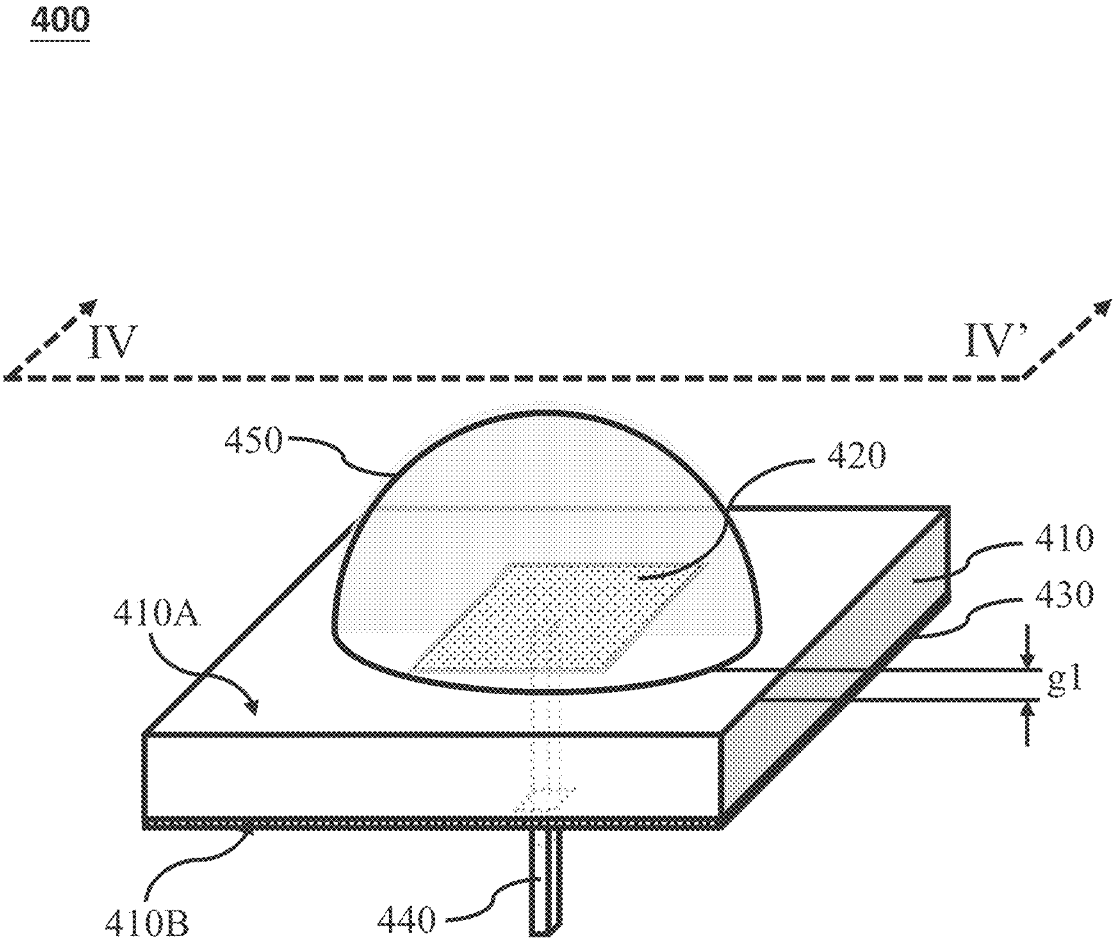
FIGS. 4A~4D are a schematic perspective view, an exploded view, a cross-sectional view along with the cross-sectional line IV-IV' and a vertical projection of an antenna assembly equipped with a sub-wavelength structured enhancer according to Embodiment 4 of this invention.
Figure 4B:
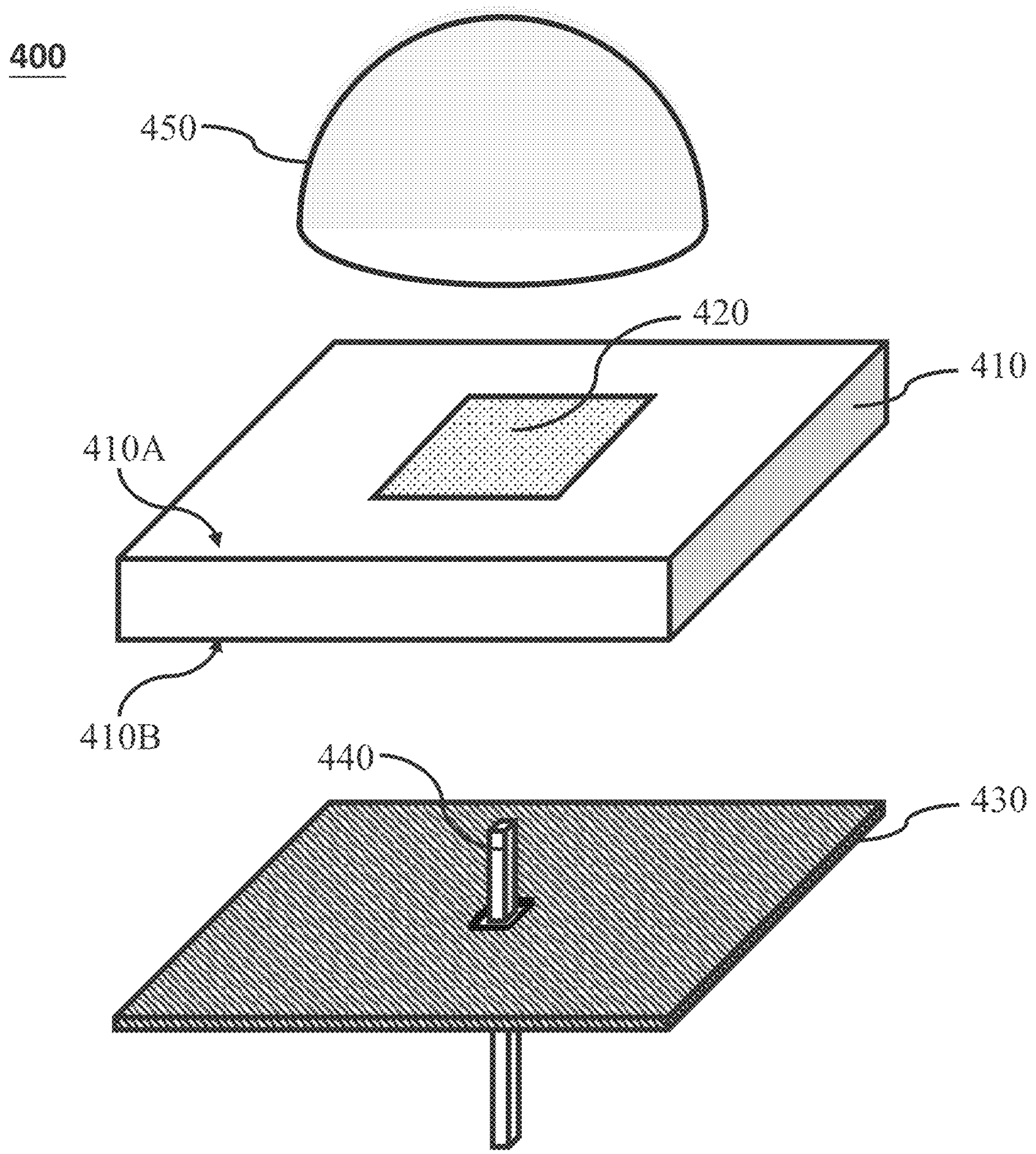
Figure 4C:
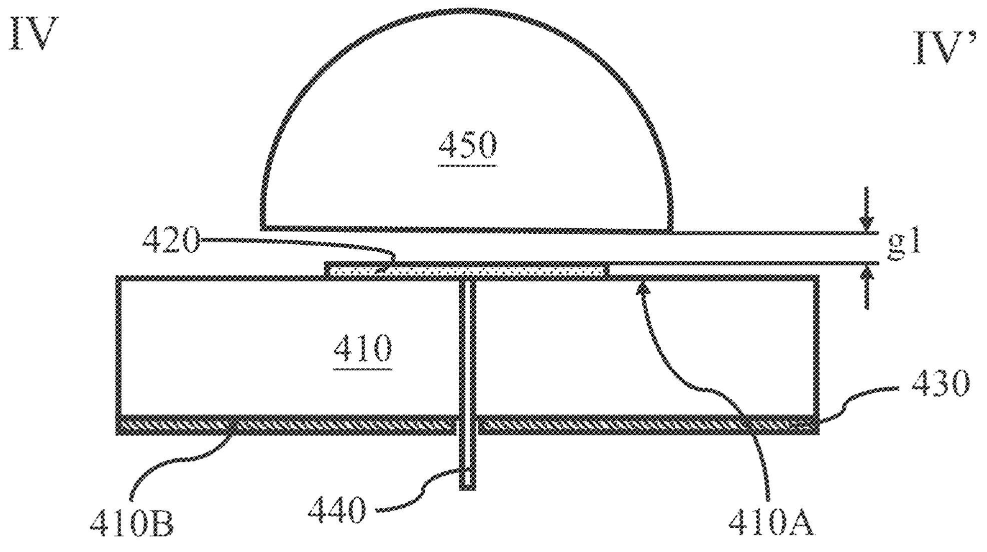

As the schematic perspective view, the exploded view and the cross-sectional view along with the cross-sectional line IV-IV' shown in FIGS. 4A~4C, the antenna assembly 400 equipped with a sub-wavelength structured enhancer comprises: an antenna supporting substrate 410 with a top surface 410A and a bottom surface 4108 opposite to each other; a first patch antenna 420 disposed on the top surface 410A of the antenna supporting substrate 410; a ground layer 430 disposed under the bottom surface 410B of the antenna supporting substrate 410 corresponding to the first patch antenna 420; a signal feeding line 440 disposed under the first patch antenna 420 and connected with the first patch antenna 420 by running through the ground layer 430 and all of the antenna supporting substrate 410 for transmitting satellite signals; and a sub-wavelength structured enhancer 450 disposed above the first patch antenna 420, wherein the sub-wavelength structured enhancer 450 is a solid structure and spaced with the first patch antenna 420 by an air gap g1 of 10 mm. The air gap g1 between the sub-wavelength structured enhancer 450 and the first patch antenna 420 of other embodiments according to this present invention can be selected in the range of 7 mm to 47 mm as demand.

Figure 4D:
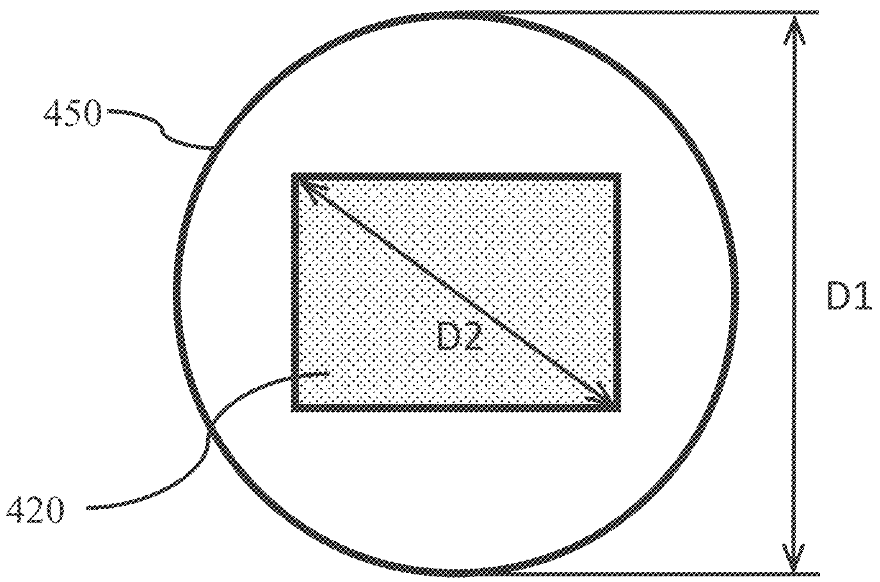

FIG. 4D is a vertical projection of the first patch antenna 420 and the sub-wavelength structured enhancer 450 of the antenna assembly 400 equipped with a sub-wavelength structured enhancer according to Embodiment 4 of this invention. As shown in FIG. 4D, the vertical projection of the first patch antenna 420 and the vertical projection of the sub-wavelength structured enhancer 450 overlap with each other, and the maximum 1D linear dimension D1 of the vertical projection of the sub-wavelength structured enhancer 450 is not greater than the wavelength of Ku band (25.0 mm), and the maximum 1D linear dimension D1 of the vertical projection of the sub-wavelength structured enhancer 450 is greater than or equal to the maximum 1D linear dimension D2 of the vertical projection of the first patch antenna 420, for example but not limited to the maximum 1D linear dimension D1 of the vertical projection of the sub-wavelength structured enhancer 450 is N-fold of the maximum 1D linear dimension D2 of the vertical projection of the first patch antenna 420, wherein 1≤N≤ratio of [(wavelength of Ku band)/(the maximum 1D linear dimension D2 of the vertical projection of the first patch antenna 420)] to make the satellite signals be diffracted when passing through the sub-wavelength structured enhancer 450. The maximum 1D linear dimension D2 of the vertical projection of the first patch antenna 420 of this present Embodiment 4 is 6 mm, and the wavelength of Ku band is 24 mm, therefore N is in the ranging between 1 and 4 and the maximum 1D linear dimension D1 of the vertical projection of the sub-wavelength structured enhancer 450 is in the ranging between 6 mm and 24 mm based on the calculation of the equation mentioned above. According to other embodiments of this present invention, a sub-wavelength structured enhancer 450 with a different maximum 1D linear dimension D1 and a first patch antenna 420 with a different maximum 1D linear dimension D2 can also be selected as demand.

The vertical projection of the first patch antenna 420 of this present Embodiment 4 is a rectangle shape. However, other vertical projections for example but not limited to a concave shape, a circular shape, a polygonal shape or a petal shape of the first patch antenna 420 can also be selected as demand in other embodiments according to this present invention.

The sub-wavelength structured enhancer 450 of this present Embodiment 4 is made of a non-metallic material, for example but not limited to plastic, glass or ceramic. Moreover, the sub-wavelength structured enhancer 450 of this present Embodiment 4 has a structure of solid hemisphere. Other sub-wavelength structured enhancer 450 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 5

This present Embodiment 5 discloses an antenna assembly 500 equipped with a sub-wavelength structured enhancer as shown in FIGS. 5A~5D.

Figure 5A:
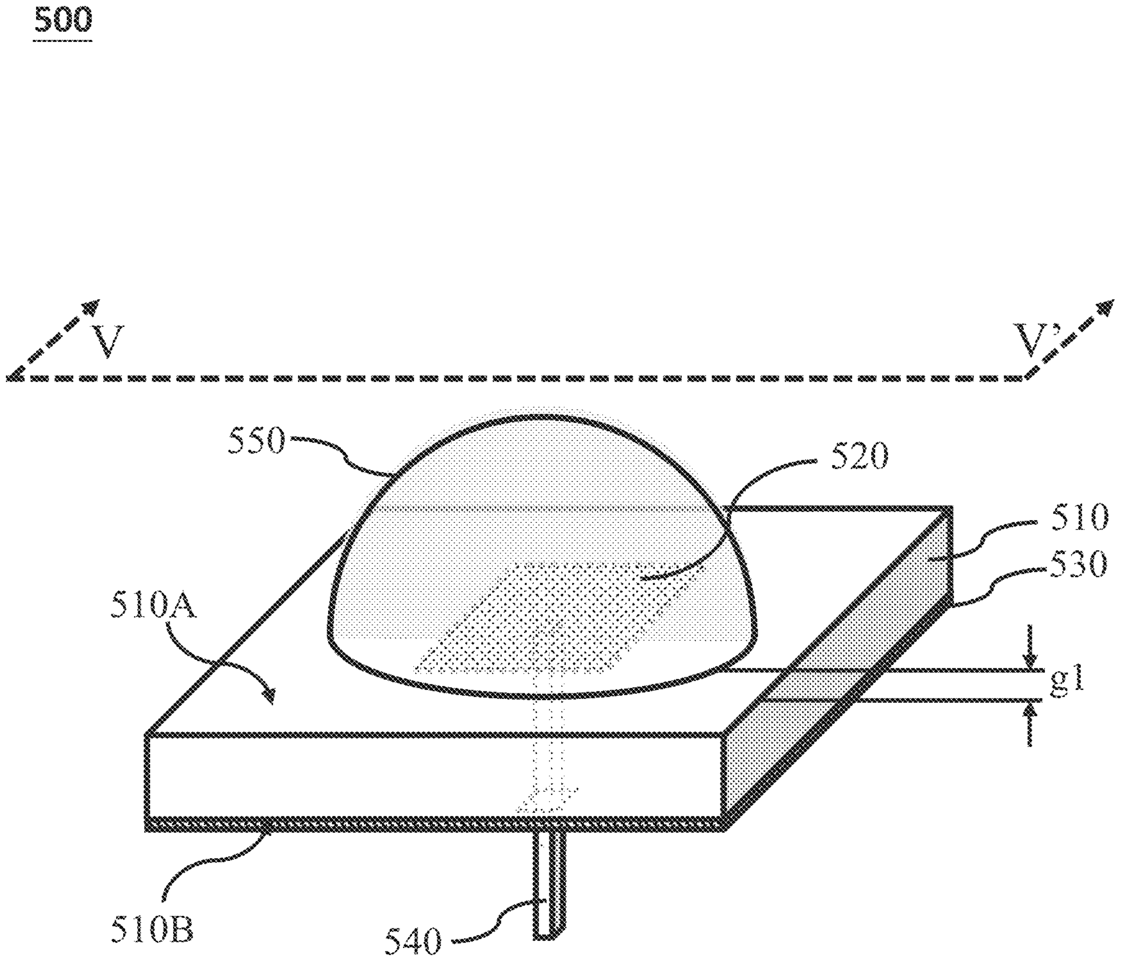
FIGS. 5A~5D are a schematic perspective view, an exploded view, a cross-sectional view along with the cross-sectional line V-V' and a vertical projection of an antenna assembly equipped with a sub-wavelength structured enhancer according to Embodiment 5 of this invention.
Figure 5B:
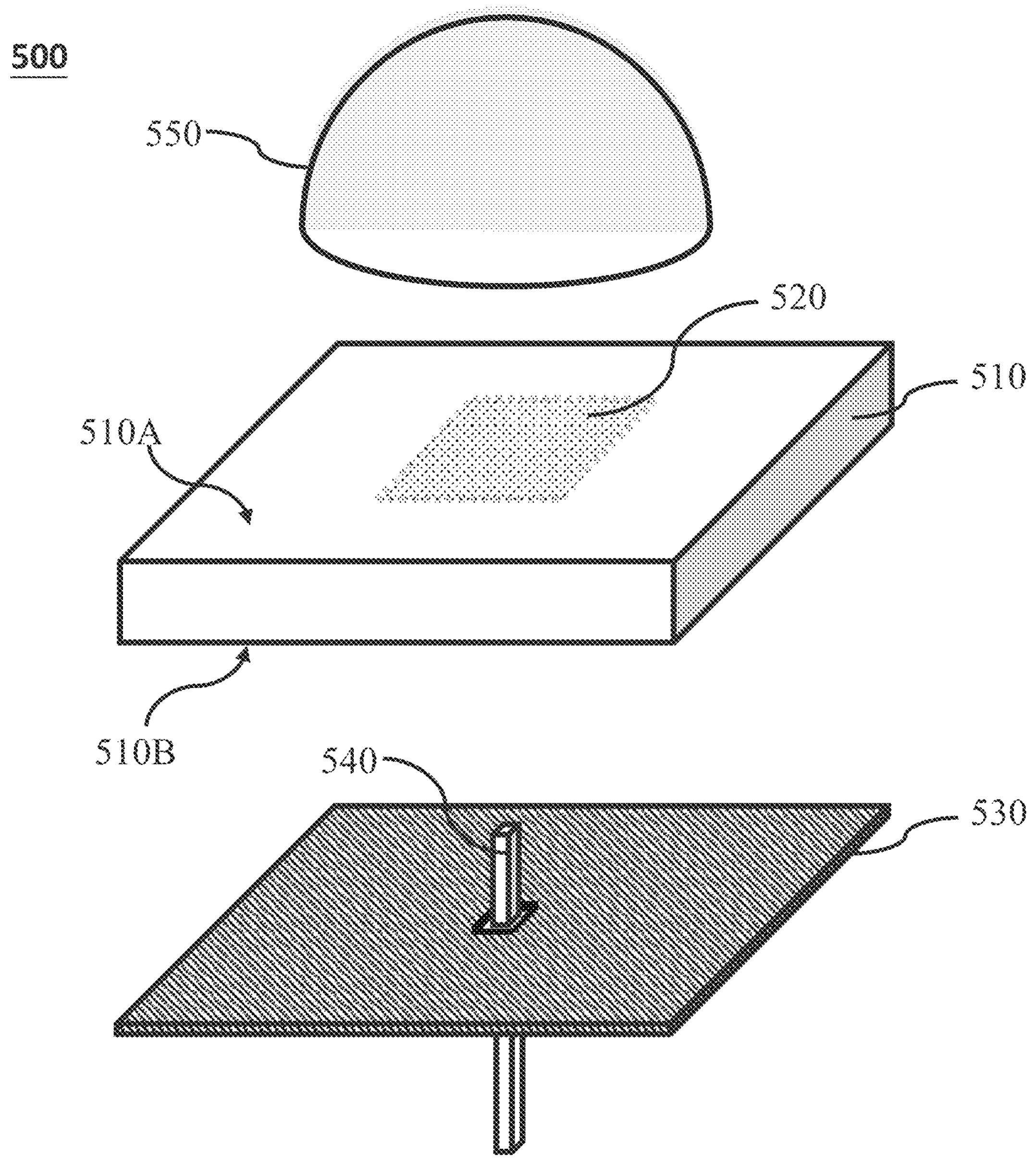
Figure 5C:
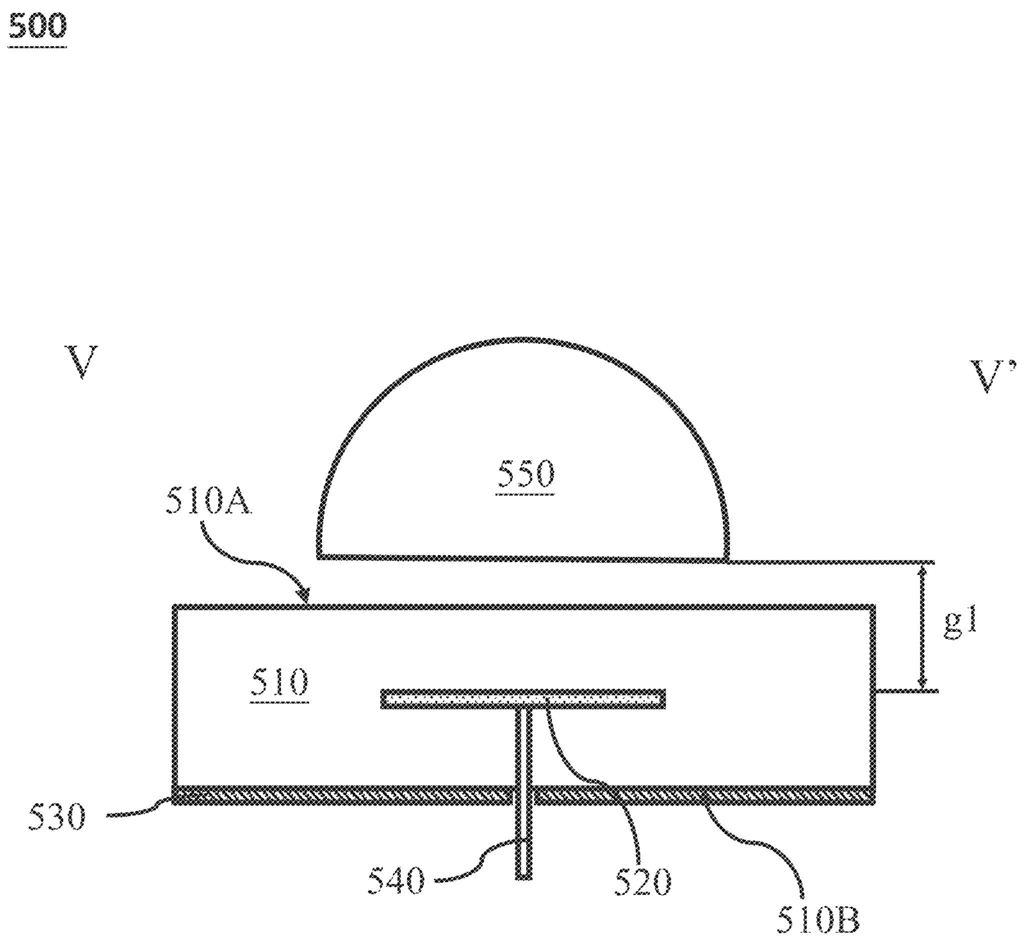

As the schematic perspective view, the exploded view and the cross-sectional view along with the cross-sectional line V-V' shown in FIGS. 5A~5C, the antenna assembly 500 equipped with a sub-wavelength structured enhancer comprises: an antenna supporting substrate 510 with a top surface 510A and a bottom surface 5108 opposite to each other; a first patch antenna 520 disposed inside of the antenna supporting substrate 510; a ground layer 530 disposed under the bottom surface 510B of the antenna supporting substrate 510 corresponding to the first patch antenna 520; a signal feeding line 540 disposed under the first patch antenna 520 and connected with the first patch antenna 520 by running through the ground layer 530 and part of the antenna supporting substrate 510 for transmitting satellite signals; and a sub-wavelength structured enhancer 550 disposed above the first patch antenna 520, wherein the sub-wavelength structured enhancer 550 is a solid structure and spaced with the first patch antenna 520 by an air gap g1 of 10 mm. The air gap g1 between the sub-wavelength structured enhancer 550 and the first patch antenna 520 of other embodiments according to this present invention can be selected in the range of 7 mm to 47 mm as demand.

Figure 5D:
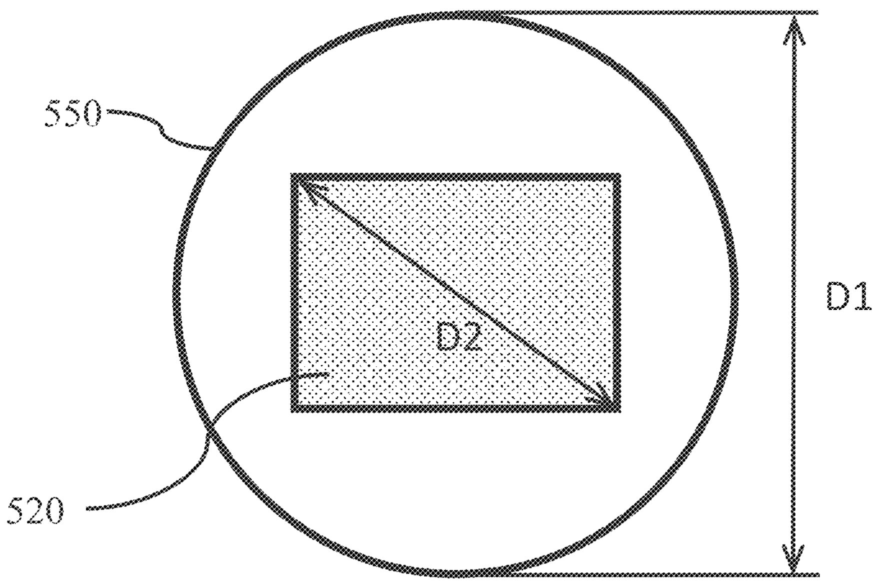

FIG. 5D is a vertical projection of the first patch antenna 520 and the sub-wavelength structured enhancer 550 of the antenna assembly 500 equipped with a sub-wavelength structured enhancer according to Embodiment 5 of this invention. As shown in FIG. 5D, the vertical projection of the first patch antenna 520 and the vertical projection of the sub-wavelength structured enhancer 550 overlap with each other, and the maximum 1D linear dimension D1 of the vertical projection of the sub-wavelength structured enhancer 550 is not greater than the wavelength of Ku band (25.0 mm), and the maximum 1D linear dimension D1 of the vertical projection of the sub-wavelength structured enhancer 550 is greater than or equal to the maximum 1D linear dimension D2 of the vertical projection of the first patch antenna 520, for example but not limited to the maximum 1D linear dimension D1 of the vertical projection of the sub-wavelength structured enhancer 550 is N-fold of the maximum 1D linear dimension D2 of the vertical projection of the first patch antenna 520, wherein 1≤N≤ratio of [(wavelength of Ku band)/(the maximum 1D linear dimension D2 of the vertical projection of the first patch antenna 520)] to make the satellite signals be diffracted when passing through the sub-wavelength structured enhancer 550. The maximum 1D linear dimension D2 of the vertical projection of the first patch antenna 520 of this present Embodiment 4 is 6 mm, and the wavelength of Ku band is 24 mm, therefore N is in the ranging between 1 and 4 and the maximum 1D linear dimension D1 of the vertical projection of the sub-wavelength structured enhancer 550 is in the ranging between 6 mm and 24 mm based on the calculation of the equation mentioned above. According to other embodiments of this present invention, a sub-wavelength structured enhancer 550 with a different maximum 1D linear dimension D1 and a first patch antenna 520 with a different maximum 1D linear dimension D2 can also be selected as demand.

The vertical projection of the first patch antenna 520 of this present Embodiment 5 is a rectangle shape. However, other vertical projections for example but not limited to a concave shape, a circular shape, a polygonal shape or a petal shape of the first patch antenna 520 can also be selected as demand in other embodiments according to this present invention.

The sub-wavelength structured enhancer 550 of this present Embodiment 5 is made of a non-metallic material, for example but not limited to plastic, glass or ceramic. Moreover, the sub-wavelength structured enhancer 550 of this present Embodiment 5 has a structure of solid hemisphere. Other sub-wavelength structured enhancer 550 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 6

This present Embodiment 6 discloses an antenna assembly 600 equipped with a sub-wavelength structured enhancer as shown in FIGS. 6A~6D.

Figure 6A:
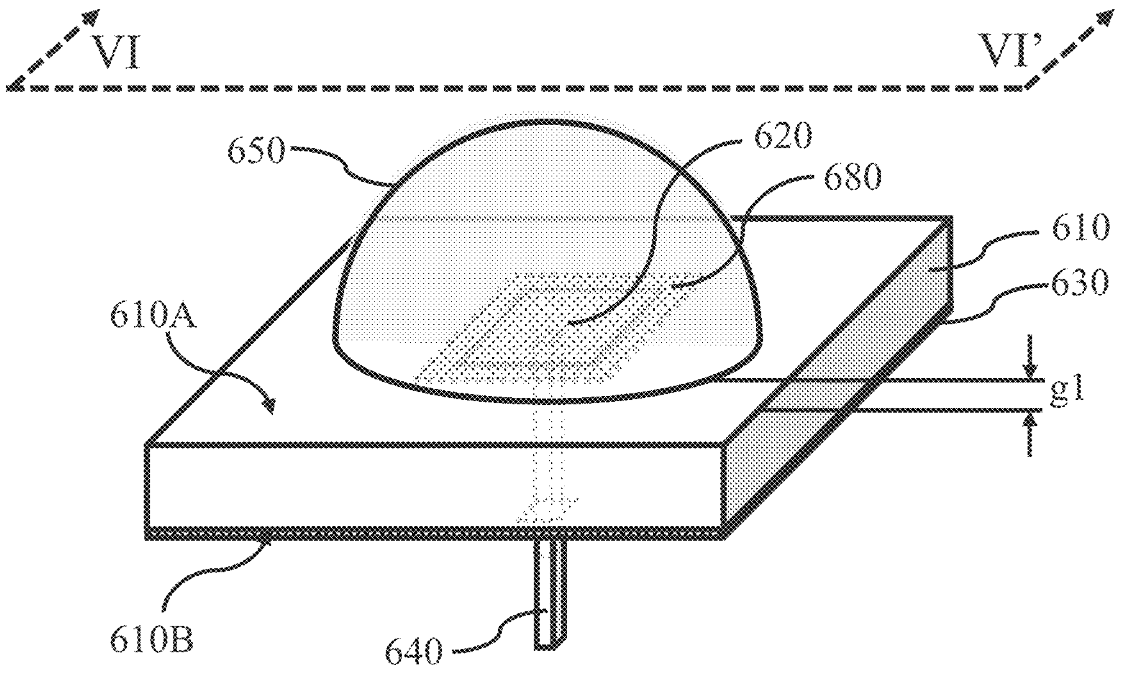
FIGS. 6A~6D are a schematic perspective view, an exploded view, a cross-sectional view along with the cross-sectional line VI-VI' and a vertical projection of an antenna assembly equipped with a sub-wavelength structured enhancer according to Embodiment 6 of this invention.
Figure 6B:
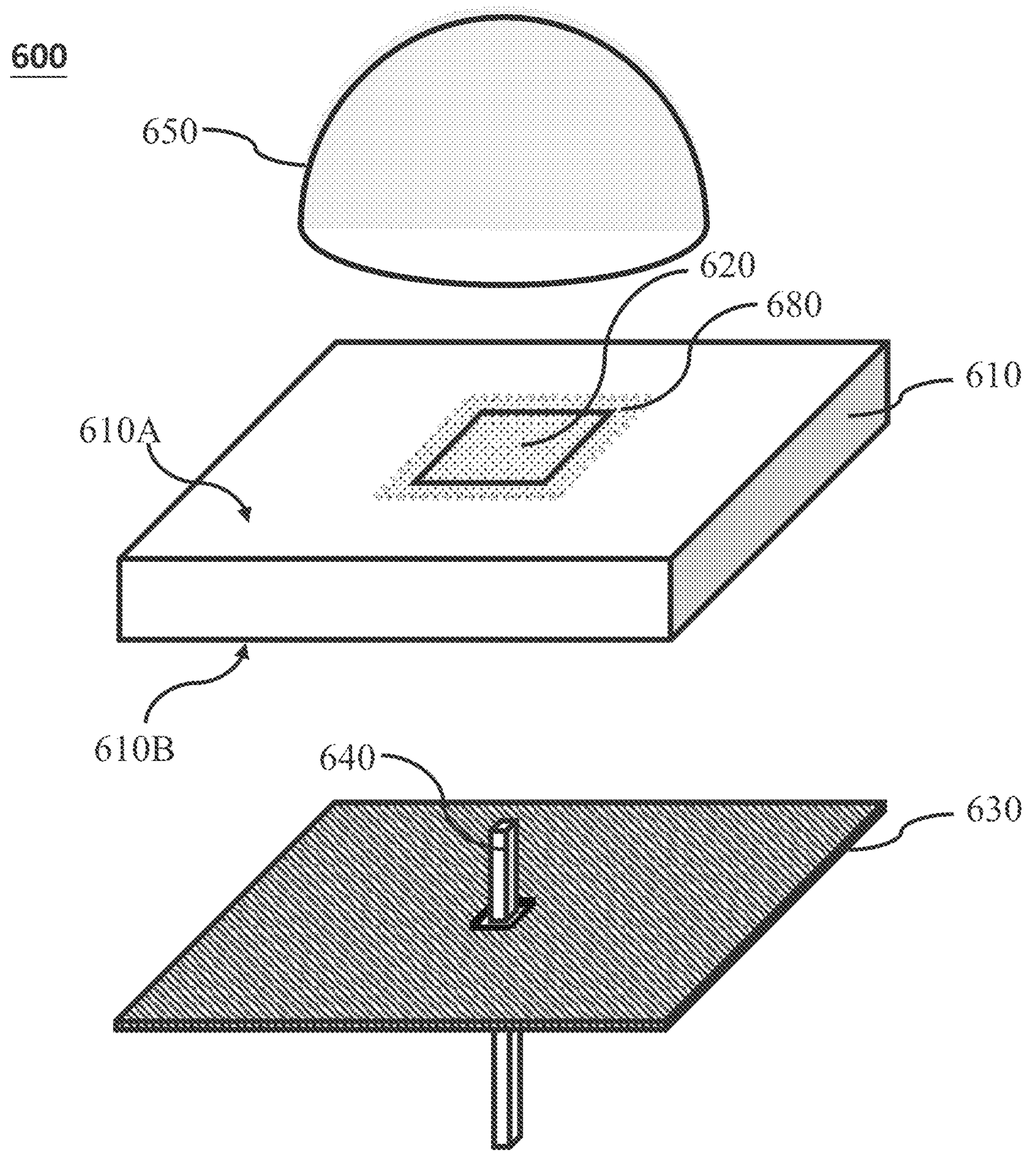
Figure 6C:
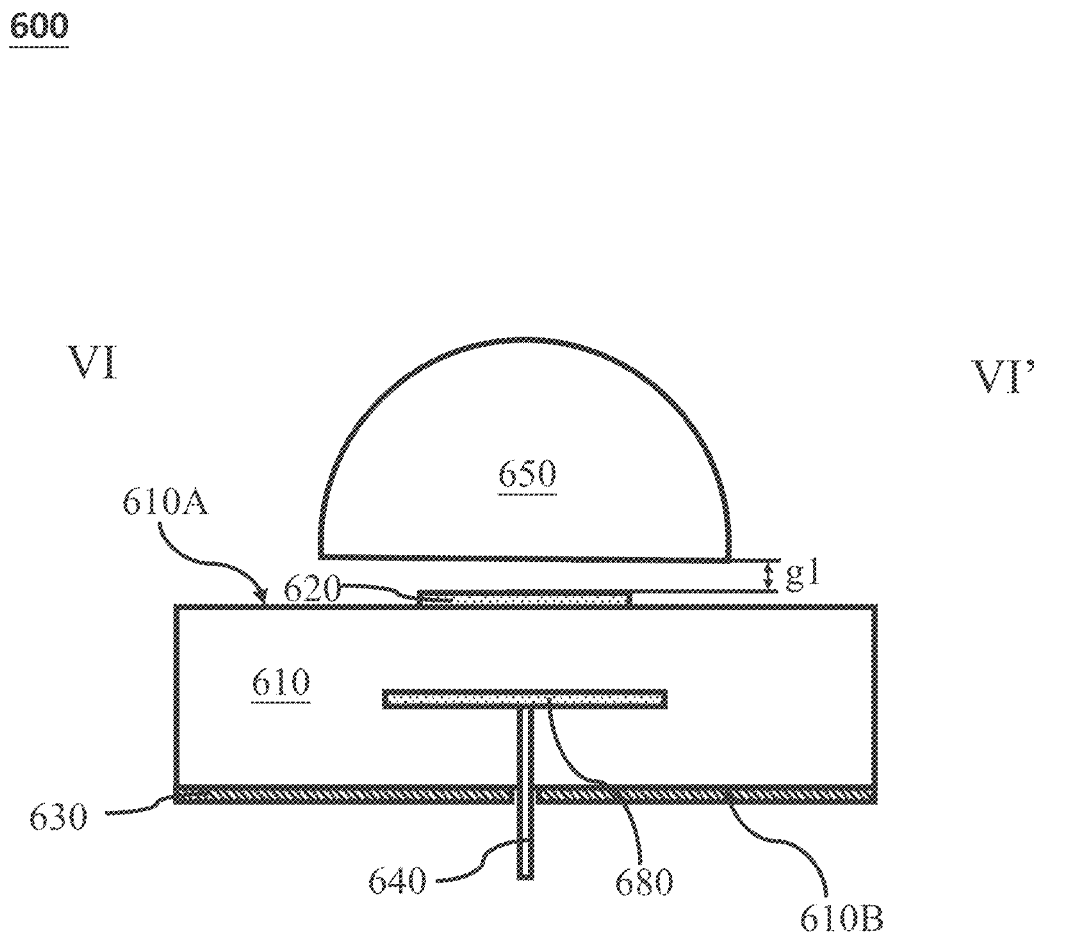

As the schematic perspective view, the exploded view and the cross-sectional view along with the cross-sectional line VI-VI' shown in FIGS. 6A~6C, the antenna assembly 600 equipped with a sub-wavelength structured enhancer comprises: an antenna supporting substrate 610 with a top surface 610A and a bottom surface 610B opposite to each other; a first patch antenna disposed on the first surface 610A of the antenna supporting substrate 610; a second patch antenna 680 disposed inside of the antenna supporting substrate 610; a ground layer 630 disposed under the bottom surface 610B of the antenna supporting substrate 610 corresponding to the first patch antenna 620 and the second patch antenna 680; a signal feeding line 640 disposed under the second patch antenna 680 and connected with the second patch antenna 680 by running through the ground layer 630 and part of the antenna supporting substrate 610 for transmitting satellite signals; and a sub-wavelength structured enhancer 650 disposed above the first patch antenna 620, wherein the sub-wavelength structured enhancer 650 is a solid structure and spaced with the first patch antenna 620 by an air gap g1 of 10 mm. The air gap g1 between the sub-wavelength structured enhancer 650 and the first patch antenna 620 of other embodiments according to this present invention can be selected in the range of 7 mm to 47 mm as demand.

Figure 6D:
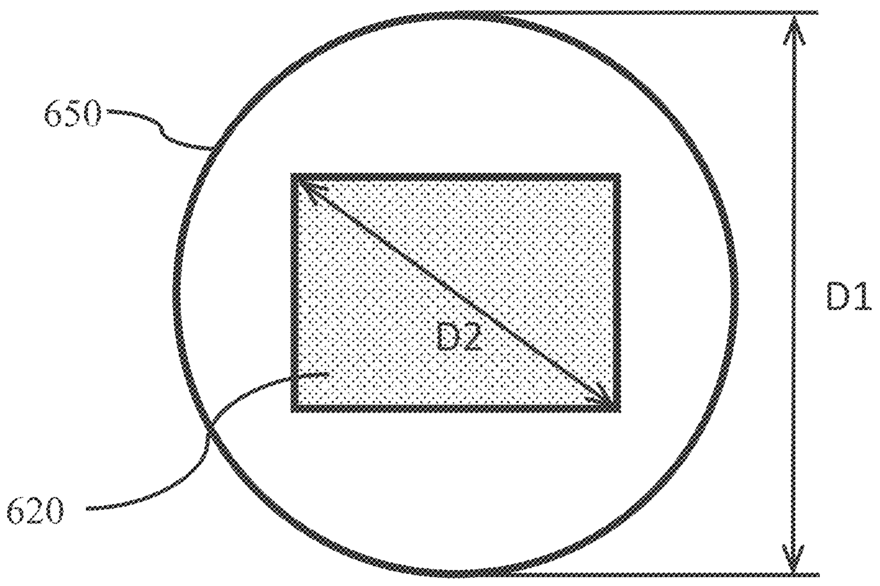

FIG. 6D is a vertical projection of the first patch antenna 620 and the sub-wavelength structured enhancer 650 of the antenna assembly 600 equipped with a sub-wavelength structured enhancer according to Embodiment 6 of this invention. As shown in FIG. 6D, the vertical projection of the first patch antenna 620 and the vertical projection of the sub-wavelength structured enhancer 650 overlap with each other, and the maximum 1D linear dimension D1 of the vertical projection of the sub-wavelength structured enhancer 650 is not greater than the wavelength of Ku band (25.0 mm), and the maximum 1D linear dimension D1 of the vertical projection of the sub-wavelength structured enhancer 650 is greater than or equal to the maximum 1D linear dimension D2 of the vertical projection of the first patch antenna 620, for example but not limited to the maximum 1D linear dimension D1 of the vertical projection of the sub-wavelength structured enhancer 650 is N-fold of the maximum 1D linear dimension D2 of the vertical projection of the first patch antenna 620, wherein 1≤N≤ratio of [(wavelength of Ku band)/(the maximum 1D linear dimension D2 of the vertical projection of the first patch antenna 620)] to make the satellite signals be diffracted when passing through the sub-wavelength structured enhancer 650. The maximum 1D linear dimension D2 of the vertical projection of the first patch antenna 620 of this present Embodiment 4 is 6 mm, and the wavelength of Ku band is 24 mm, therefore N is in the ranging between 1 and 4 and the maximum 1D linear dimension D1 of the vertical projection of the sub-wavelength structured enhancer 650 is in the ranging between 6 mm and 24 mm based on the calculation of the equation mentioned above. According to other embodiments of this present invention, a sub-wavelength structured enhancer 650 with a different maximum 1D linear dimension D1 and a first patch antenna 620 with a different maximum 1D linear dimension D2 can also be selected as demand.

The vertical projection of the first patch antenna 620 of this present Embodiment 6 is a rectangle shape. However, other vertical projections for example but not limited to a concave shape, a circular shape, a polygonal shape or a petal shape of the first patch antenna 620 can also be selected as demand in other embodiments according to this present invention.

The vertical projection of the second patch antenna 620 of this present Embodiment 6 is a rectangle shape. However, other vertical projections for example but not limited to a concave shape, a circular shape, a polygonal shape or a petal shape of the second patch antenna 680 can also be selected as demand in other embodiments according to this present invention.

The sub-wavelength structured enhancer 650 of this present Embodiment 6 is made of a non-metallic material, for example but not limited to plastic, glass or ceramic. Moreover, the sub-wavelength structured enhancer 650 of this present Embodiment 6 has a structure of solid hemisphere. Other sub-wavelength structured enhancer 650 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 7

This present Embodiment 7 discloses an antenna assembly 700 equipped with a sub-wavelength structured enhancer as shown in FIGS. 7A~7D.

Figure 7A:
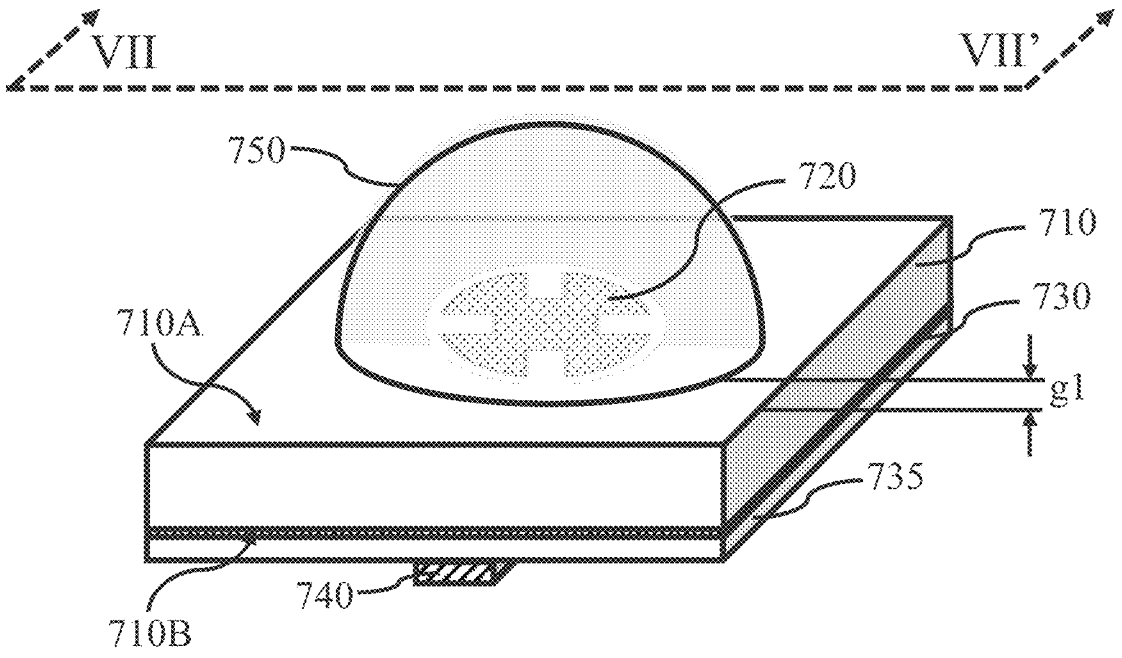
FIGS. 7A~7D are a schematic perspective view, an exploded view, a cross-sectional view along with the cross-sectional line VII-VII' and a vertical projection of an antenna assembly equipped with a sub-wavelength structured enhancer according to Embodiment 7 of this invention.
Figure 7B:
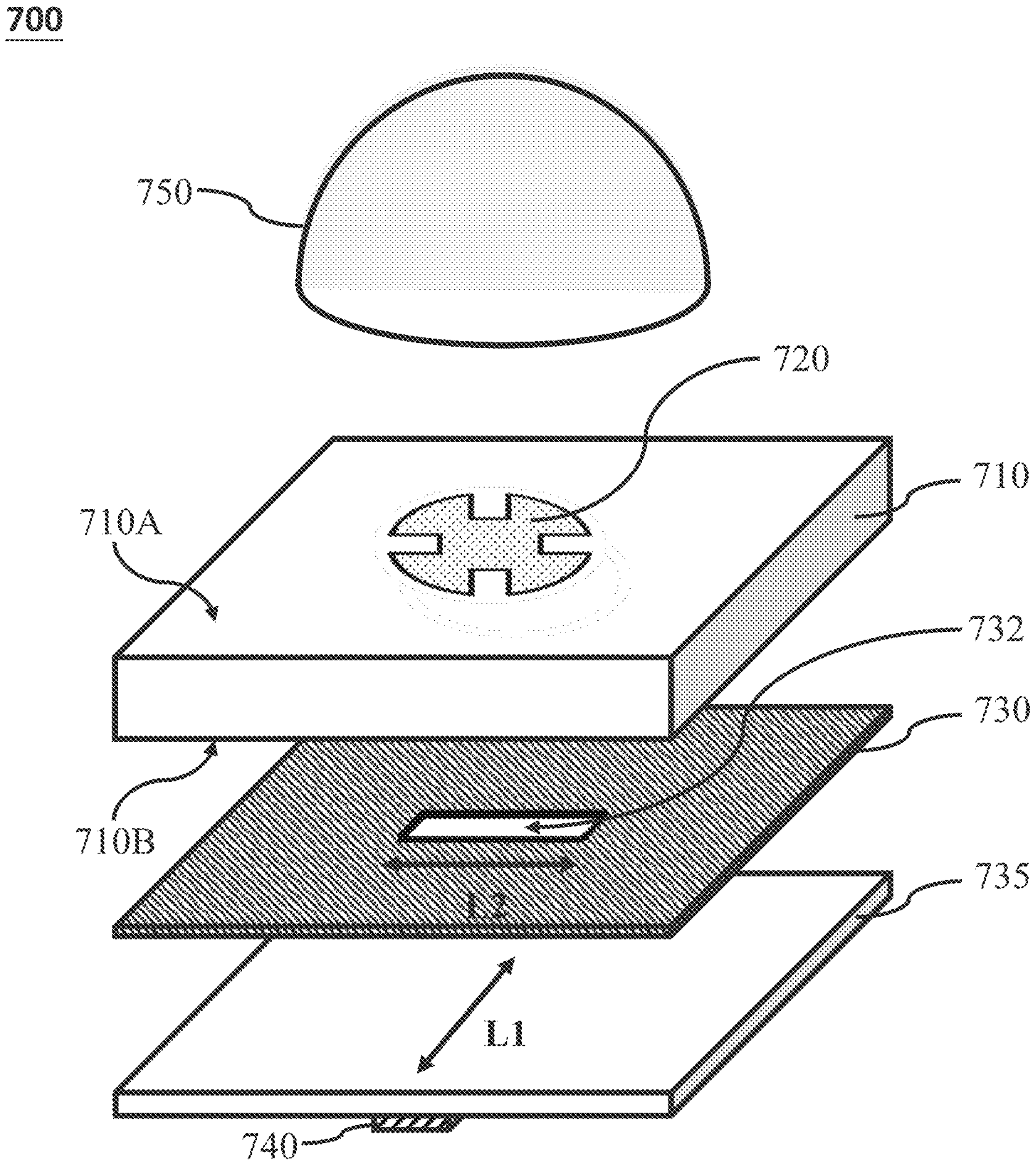
Figure 7C:
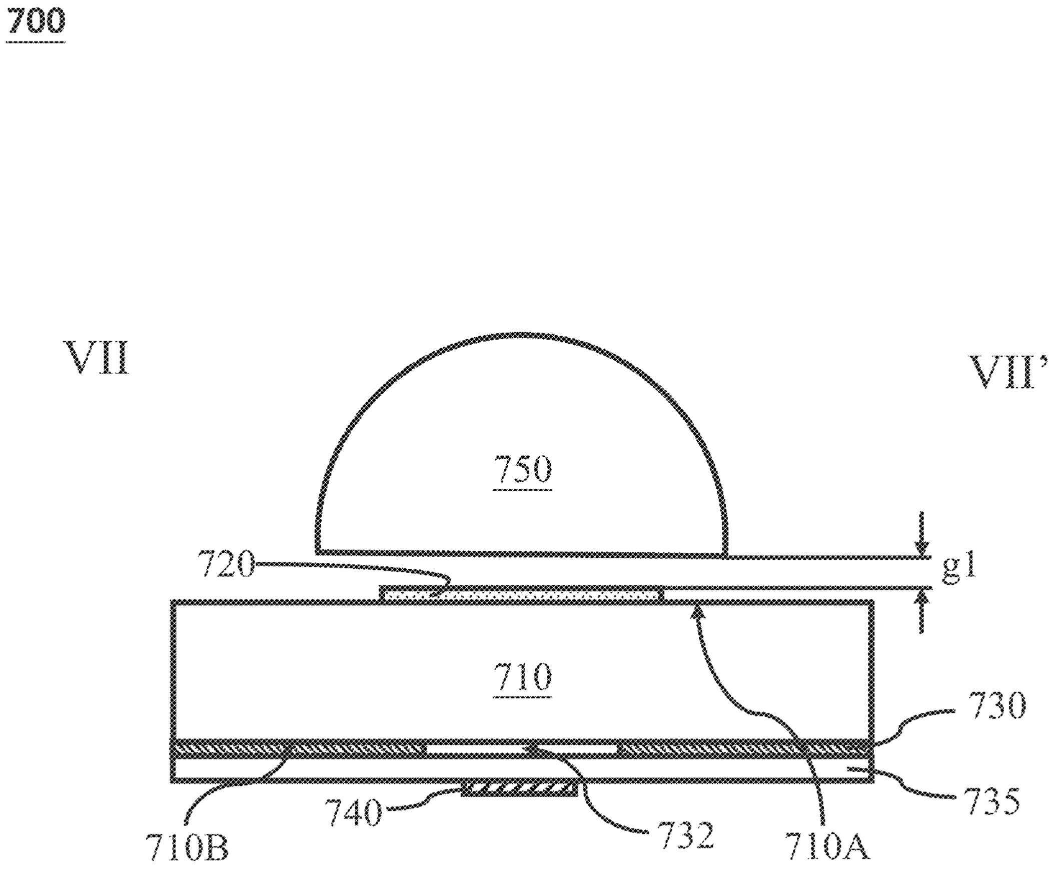

As the schematic perspective view, the exploded view and the cross-sectional view along with the cross-sectional line VII-VII' shown in FIGS. 7A~7C, the antenna assembly 700 equipped with a sub-wavelength structured enhancer comprises: an antenna supporting substrate 710 with a top surface 710A and a bottom surface 710B opposite to each other; a first patch antenna 720 disposed on the top surface 710A of the antenna supporting substrate 710; a ground layer 730 disposed under the bottom surface 710B of the antenna supporting substrate 710 corresponding to the first patch antenna 720; a signal feeding line 740 disposed under a side of the ground layer 730 opposite to the antenna supporting substrate 710 and spaced with the ground layer 730 by an insulating layer 735, wherein the ground layer 730 has a coupling slit 732 corresponding to the first patch antenna 720, and a vertical projection of a first long axis direction L1 of the signal feeding line 740 and a vertical projection of a second long axis direction L2 of the coupling slit 732 are substantially orthogonal to each other to transmit the satellite signals by coupling effect; and a sub-wavelength structured enhancer 750 disposed above the first patch antenna 720, wherein the sub-wavelength structured enhancer 750 is a solid structure and spaced with the first patch antenna 720 by an air gap g1 of 10 mm. The air gap g1 between the sub-wavelength structured enhancer 750 and the first patch antenna 720 of other embodiments according to this present invention can be selected in the range of 7 mm to 47 mm as demand.

Figure 7D:
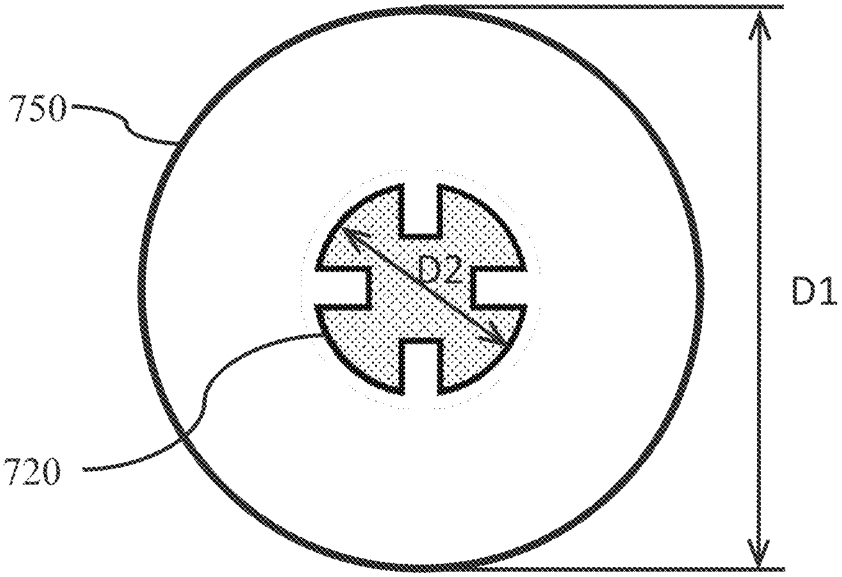

FIG. 7D is a vertical projection of the first patch antenna 720 and the sub-wavelength structured enhancer 750 of the antenna assembly 700 equipped with a sub-wavelength structured enhancer according to Embodiment 7 of this invention. As shown in FIG. 7D, the vertical projection of the first patch antenna 720 and the vertical projection of the sub-wavelength structured enhancer 750 overlap with each other, and the maximum 1D linear dimension D1 of the vertical projection of the sub-wavelength structured enhancer 750 is not greater than the wavelength of Ku band (25.0 mm), and the maximum 1D linear dimension D1 of the vertical projection of the sub-wavelength structured enhancer 750 is greater than or equal to the maximum 1D linear dimension D2 of the vertical projection of the first patch antenna 720, for example but not limited to the maximum 1D linear dimension D1 of the vertical projection of the sub-wavelength structured enhancer 750 is N-fold of the maximum 1D linear dimension D2 of the vertical projection of the first patch antenna 720, wherein 1≤N≤ratio of [(wavelength of Ku band)/(the maximum 1D linear dimension D2 of the vertical projection of the first patch antenna 720)] to make the satellite signals be diffracted when passing through the sub-wavelength structured enhancer 750. The maximum 1D linear dimension D2 of the vertical projection of the first patch antenna 720 of this present Embodiment 7 is 6 mm, and the wavelength of Ku band is 24 mm, therefore N is in the ranging between 1 and 4 and the maximum 1D linear dimension D1 of the vertical projection of the sub-wavelength structured enhancer 750 is in the ranging between 6 mm and 24 mm based on the calculation of the equation mentioned above. According to other embodiments of this present invention, a sub-wavelength structured enhancer 750 with a different maximum 1D linear dimension D1 and a first patch antenna 720 with a different maximum 1D linear dimension D2 can also be selected as demand.

The vertical projection of the first patch antenna 720 of this present Embodiment 7 is a petal shape. However, other vertical projections for example but not limited to a concave shape, a rectangle shape, a circular shape or a polygonal shape of the first patch antenna 720 can also be selected as demand in other embodiments according to this present invention.

The sub-wavelength structured enhancer 750 of this present Embodiment 7 is made of a non-metallic material, for example but not limited to plastic, glass or ceramic. Moreover, the sub-wavelength structured enhancer 750 of this present Embodiment 7 has a structure of solid hemisphere. Other sub-wavelength structured enhancer 750 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 8

This present Embodiment 8 discloses an antenna assembly 800 equipped with a sub-wavelength structured enhancer as shown in FIGS. 8A~8D.

Figure 8A:
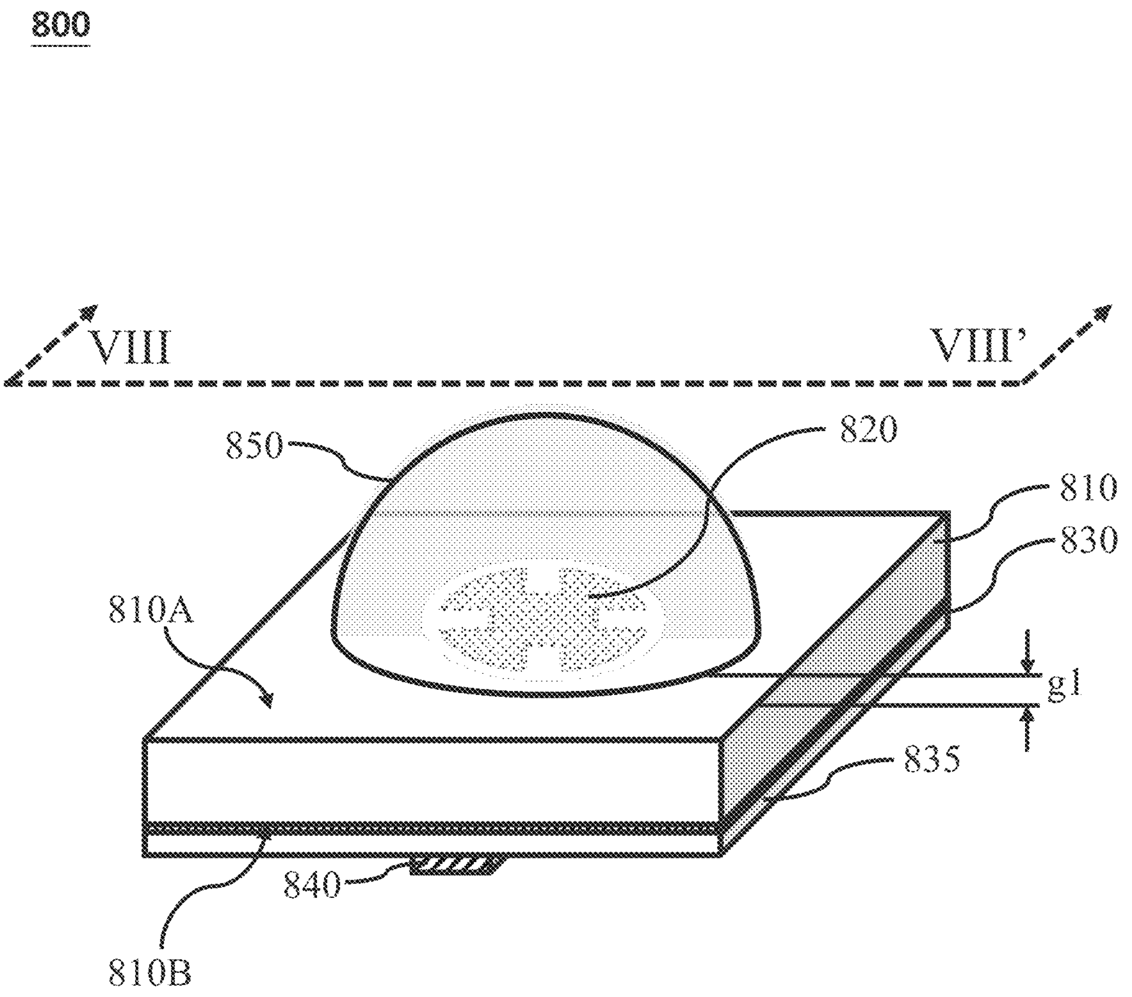
FIGS. 8A~8D are a schematic perspective view, an exploded view, a cross-sectional view along with the cross-sectional line VIII-VIII' and a vertical projection of an antenna assembly equipped with a sub-wavelength structured enhancer according to Embodiment 8 of this invention.
Figure 8B:
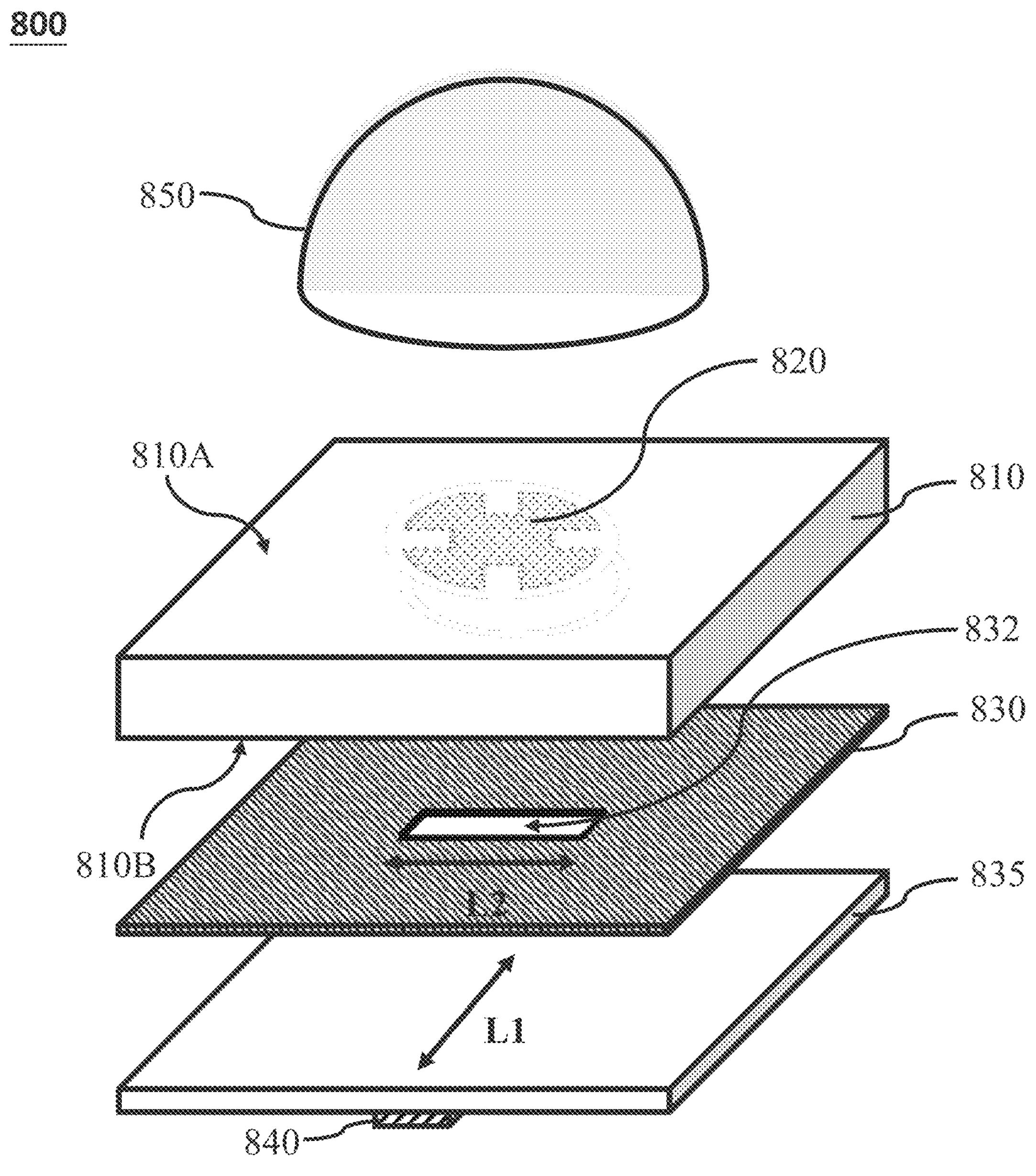
Figure 8C:
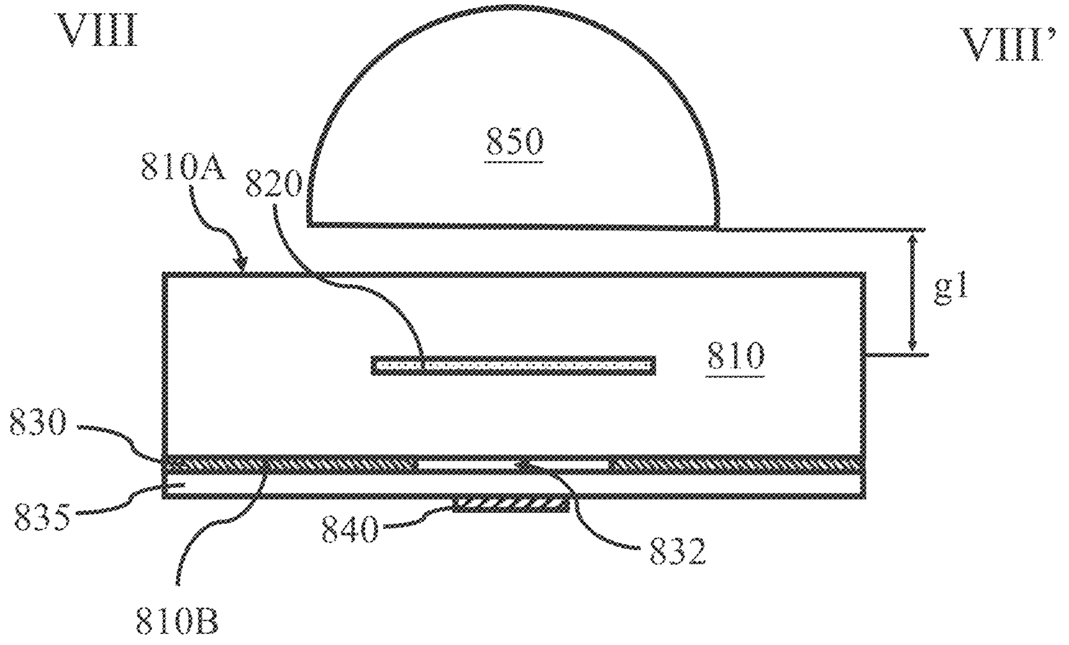

As the schematic perspective view, the exploded view and the cross-sectional view along with the cross-sectional line VIII-VIII' shown in FIGS. 8A-8C, the antenna assembly 800 equipped with a sub-wavelength structured enhancer comprises: an antenna supporting substrate 810 with a top surface 810A and a bottom surface 810B opposite to each other; a first patch antenna 820 disposed inside of the antenna supporting substrate 810; a ground layer 830 disposed under the bottom surface 810B of the antenna supporting substrate 810 corresponding to the first patch antenna 820; a signal feeding line 840 disposed under a side of the ground layer 830 opposite to the antenna supporting substrate 810 and spaced with the ground layer 830 by an insulating layer 835, wherein the ground layer 830 has a coupling slit 832 corresponding to the first patch antenna 820, and a vertical projection of a first long axis direction L1 of the signal feeding line 840 and a vertical projection of a second long axis direction L2 of the coupling slit 832 are substantially orthogonal to each other to transmit the satellite signals by coupling effect; and a sub-wavelength structured enhancer 850 disposed above the first patch antenna 820, wherein the sub-wavelength structured enhancer 850 is a solid structure and spaced with the first patch antenna 820 by an air gap g1 of 10 mm. The air gap g1 between the sub-wavelength structured enhancer 850 and the first patch antenna 820 of other embodiments according to this present invention can be selected in the range of 7 mm to 47 mm as demand.

Figure 8D:
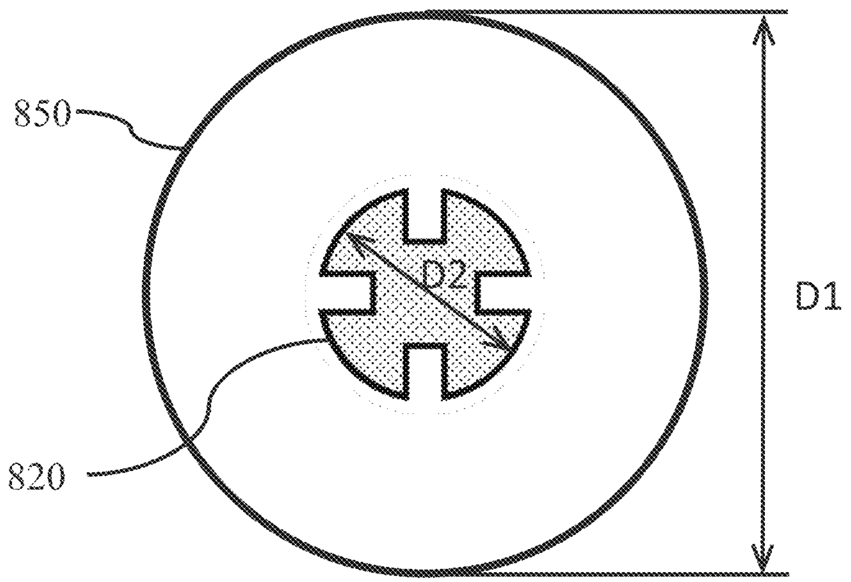

FIG. 8D is a vertical projection of the first patch antenna 820 and the sub-wavelength structured enhancer 850 of the antenna assembly 800 equipped with a sub-wavelength structured enhancer according to Embodiment 8 of this invention. As shown in FIG. 8D, the vertical projection of the first patch antenna 820 and the vertical projection of the sub-wavelength structured enhancer 850 overlap with each other, and the maximum 1D linear dimension D1 of the vertical projection of the sub-wavelength structured enhancer 850 is not greater than the wavelength of Ku band (25.0 mm), and the maximum 1D linear dimension D1 of the vertical projection of the sub-wavelength structured enhancer 850 is greater than or equal to the maximum 1D linear dimension D2 of the vertical projection of the first patch antenna 820, for example but not limited to the maximum 1D linear dimension D1 of the vertical projection of the sub-wavelength structured enhancer 850 is N-fold of the maximum 1D linear dimension D2 of the vertical projection of the first patch antenna 820, wherein 1≤N≤ratio of [(wavelength of Ku band)/(the maximum 1D linear dimension D2 of the vertical projection of the first patch antenna 820)] to make the satellite signals be diffracted when passing through the sub-wavelength structured enhancer 850. The maximum 1D linear dimension D2 of the vertical projection of the first patch antenna 820 of this present Embodiment 8 is 6 mm, and the wavelength of Ku band is 24 mm, therefore N is in the ranging between 1 and 4 and the maximum 1D linear dimension D1 of the vertical projection of the sub-wavelength structured enhancer 850 is in the ranging between 6 mm and 24 mm based on the calculation of the equation mentioned above. According to other embodiments of this present invention, a sub-wavelength structured enhancer 850 with a different maximum 1D linear dimension D1 and a first patch antenna 820 with a different maximum 1D linear dimension D2 can also be selected as demand.

The vertical projection of the first patch antenna 820 of this present Embodiment 8 is a petal shape. However, other vertical projections for example but not limited to a concave shape, a rectangle shape, a circular shape or a polygonal shape of the first patch antenna 820 can also be selected as demand in other embodiments according to this present invention.

The sub-wavelength structured enhancer 850 of this present Embodiment 8 is made of a non-metallic material, for example but not limited to plastic, glass or ceramic. Moreover, the sub-wavelength structured enhancer 850 of this present Embodiment 8 has a structure of solid hemisphere. Other sub-wavelength structured enhancer 850 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 9

This present Embodiment 9 discloses an antenna assembly 900 equipped with a sub-wavelength structured enhancer as shown in FIGS. 9A~9D.

Figure 9A:
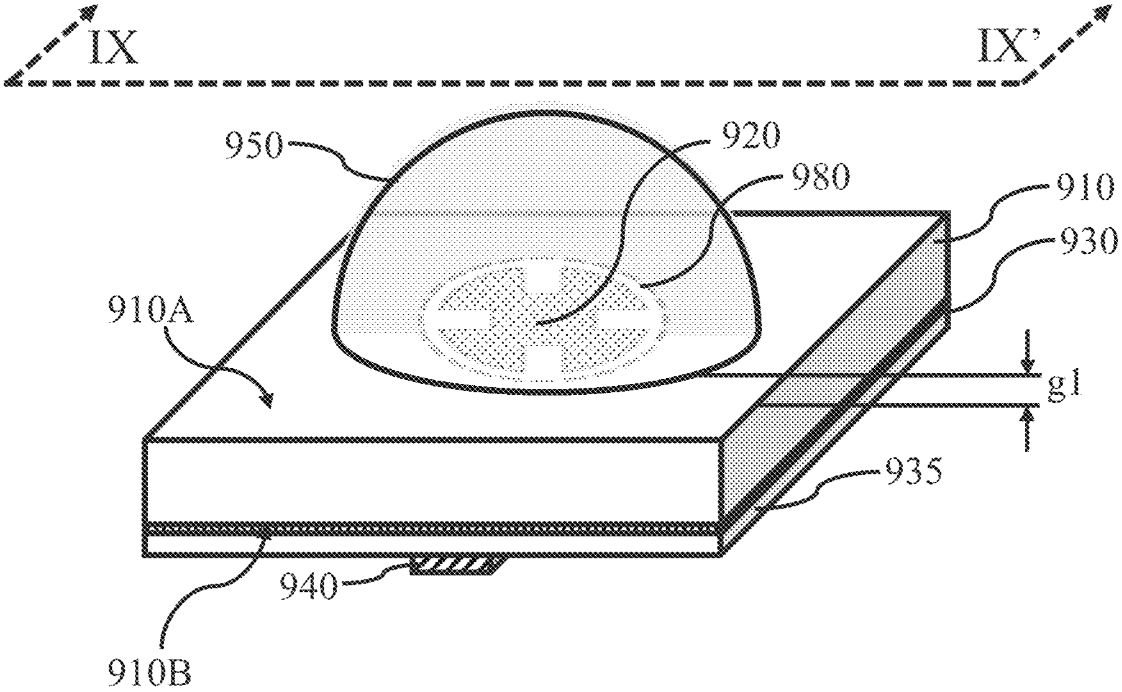
FIGS. 9A~9D are a schematic perspective view, an exploded view, a cross-sectional view along with the cross-sectional line IX-IX' and a vertical projection of an antenna assembly equipped with a sub-wavelength structured enhancer according to Embodiment 9 of this invention.
Figure 9B:
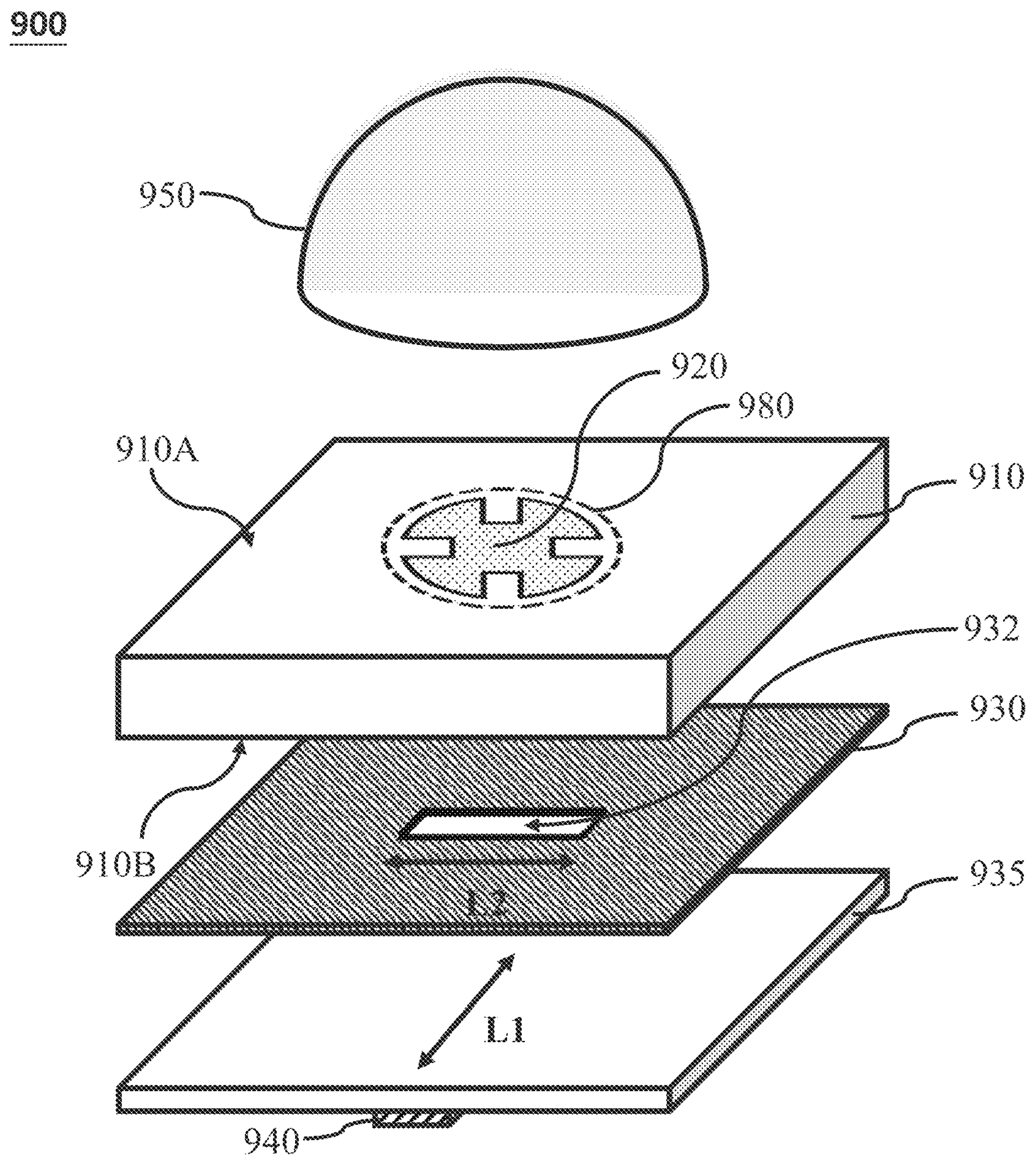
Figure 9C:
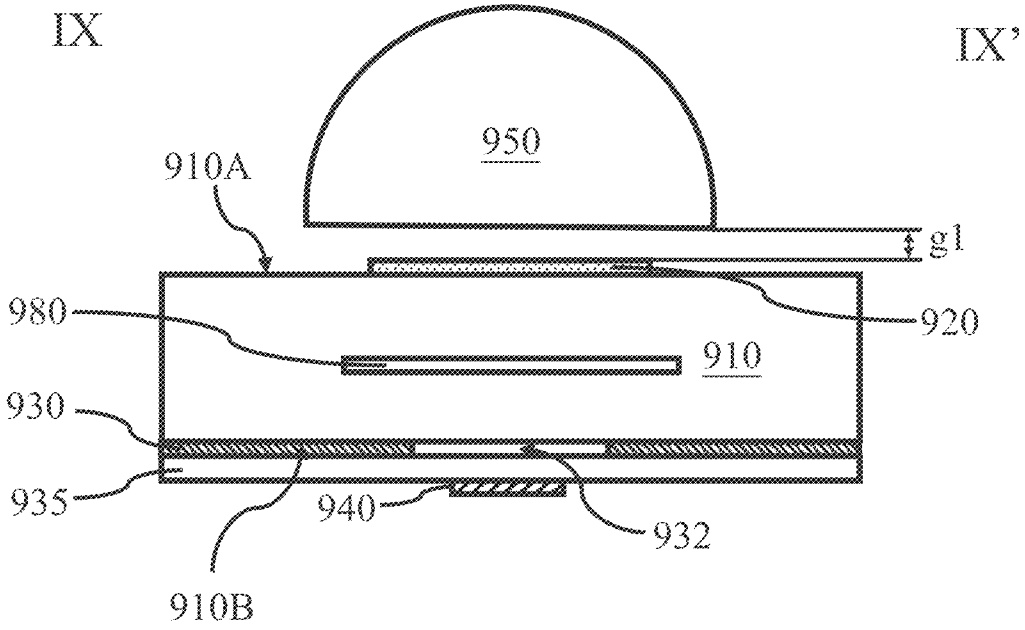

As the schematic perspective view, the exploded view and the cross-sectional view along with the cross-sectional line XI-XI' shown in FIGS. 9A~9C, the antenna assembly 800 equipped with a sub-wavelength structured enhancer comprises: an antenna supporting substrate 910 with a top surface 910A and a bottom surface 910B opposite to each other; a first patch antenna disposed on the top surface 910A of the antenna supporting substrate 910A; a second patch antenna 980 disposed inside of the antenna supporting substrate 910; a ground layer 930 disposed under the bottom surface 910B of the antenna supporting substrate 910 corresponding to the first patch antenna 920; a signal feeding line 940 disposed under a side of the ground layer 930 opposite to the antenna supporting substrate 910 and spaced with the ground layer 930 by an insulating layer 935, wherein the ground layer 930 has a coupling slit 932 corresponding to the first patch antenna 920, and a vertical projection of a first long axis direction L1 of the signal feeding line 940 and a vertical projection of a second long axis direction L2 of the coupling slit 932 are substantially orthogonal to each other to transmit the satellite signals by coupling effect; and a sub-wavelength structured enhancer 950 disposed above the first patch antenna 920, wherein the sub-wavelength structured enhancer 950 is a solid structure and spaced with the first patch antenna 920 by an air gap g1 of 10 mm. The air gap g1 between the sub-wavelength structured enhancer 950 and the first patch antenna 920 of other embodiments according to this present invention can be selected in the range of 7 mm to 47 mm as demand.

Figure 9D:
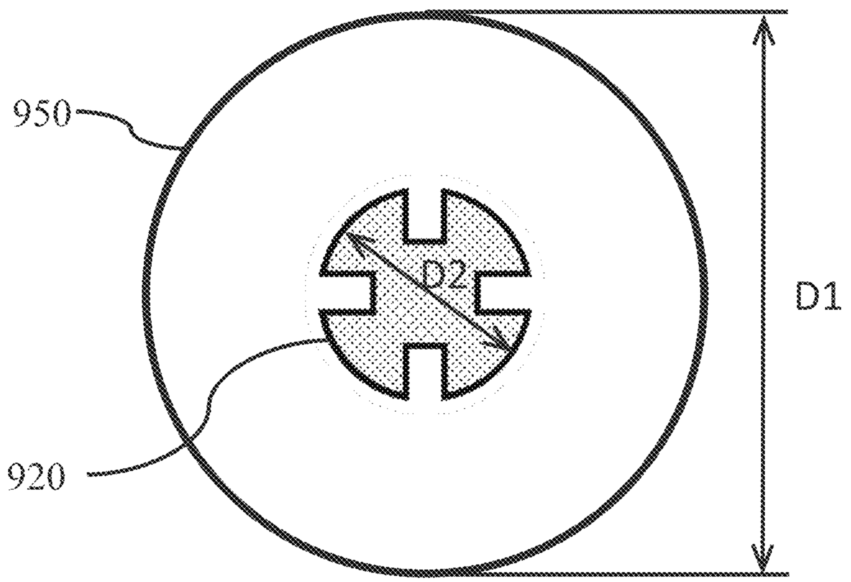

FIG. 9D is a vertical projection of the first patch antenna 920 and the sub-wavelength structured enhancer 950 of the antenna assembly 900 equipped with a sub-wavelength structured enhancer according to Embodiment 9 of this invention. As shown in FIG. 9D, the vertical projection of the first patch antenna 920 and the vertical projection of the sub-wavelength structured enhancer 950 overlap with each other, and the maximum 1D linear dimension D1 of the vertical projection of the sub-wavelength structured enhancer 950 is not greater than the wavelength of Ku band (25.0 mm), and the maximum 1D linear dimension D1 of the vertical projection of the sub-wavelength structured enhancer 950 is greater than or equal to the maximum 1D linear dimension D2 of the vertical projection of the first patch antenna 920, for example but not limited to the maximum 1D linear dimension D1 of the vertical projection of the sub-wavelength structured enhancer 950 is N-fold of the maximum 1D linear dimension D2 of the vertical projection of the first patch antenna 920, wherein 1≤N≤ratio of [(wavelength of Ku band)/(the maximum 1D linear dimension D2 of the vertical projection of the first patch antenna 920)] to make the satellite signals be diffracted when passing through the sub-wavelength structured enhancer 950. The maximum 1D linear dimension D2 of the vertical projection of the first patch antenna 920 of this present Embodiment 9 is 6 mm, and the wavelength of Ku band is 24 mm, therefore N is in the ranging between 1 and 4 and the maximum 1D linear dimension D1 of the vertical projection of the sub-wavelength structured enhancer 950 is in the ranging between 6 mm and 24 mm based on the calculation of the equation mentioned above. According to other embodiments of this present invention, a sub-wavelength structured enhancer 950 with a different maximum 1D linear dimension D1 and a first patch antenna 920 with a different maximum 1D linear dimension D2 can also be selected as demand.

The vertical projection of the first patch antenna 920 of this present Embodiment 9 is a petal shape. However, other vertical projections for example but not limited to a concave shape, a rectangle shape, a circular shape or a polygonal shape of the first patch antenna 920 can also be selected as demand in other embodiments according to this present invention.

The vertical projection of the second patch antenna 980 of this present Embodiment 9 is a circular shape. However, other vertical projections for example but not limited to a concave shape, a rectangle shape, a polygonal shape or a petal shape of the second patch antenna 980 can also be selected as demand in other embodiments according to this present invention.

The sub-wavelength structured enhancer 950 of this present Embodiment 9 is made of a non-metallic material, for example but not limited to plastic, glass or ceramic. Moreover, the sub-wavelength structured enhancer 950 of this present Embodiment 9 has a structure of solid hemisphere. Other sub-wavelength structured enhancer 950 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 10

This present Embodiment 10 discloses an antenna assembly 1000 equipped with a sub-wavelength structured enhancer as shown in FIGS. 10A~10D.

Figure 10A:
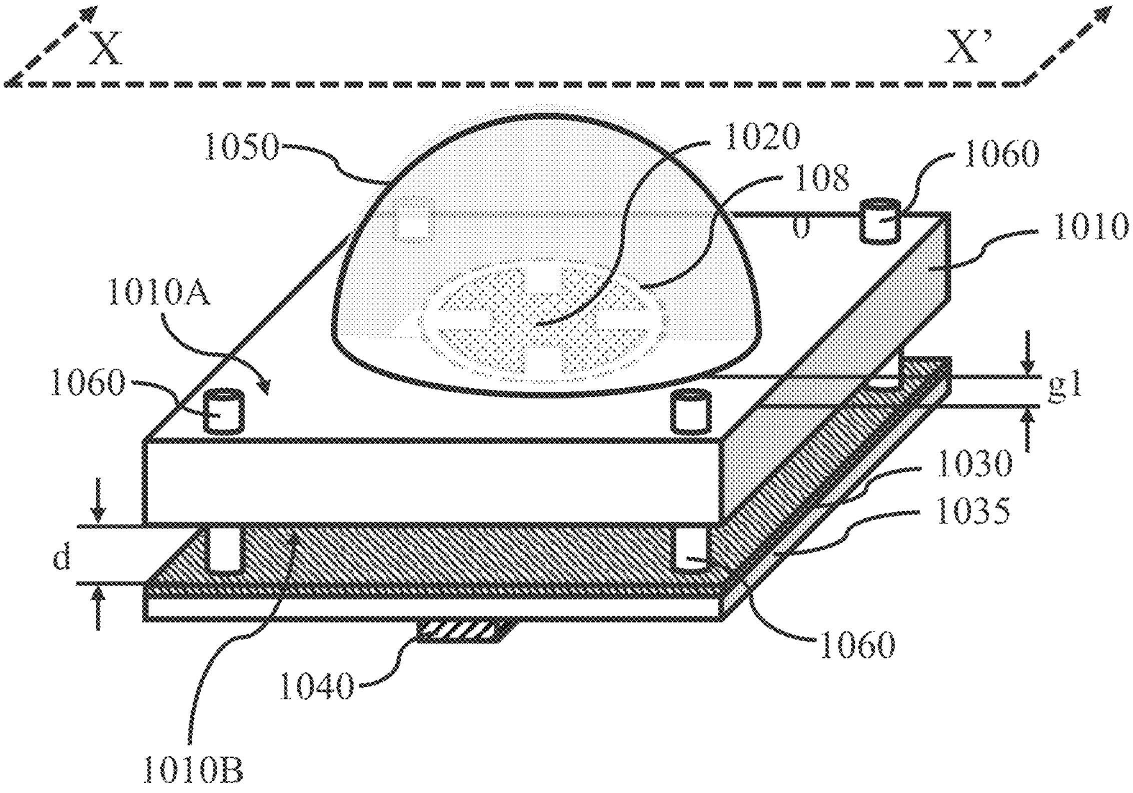
FIGS. 10A~10D are a schematic perspective view, an exploded view, a cross-sectional view along with the cross-sectional line X-X' and a vertical projection of an antenna assembly equipped with a sub-wavelength structured enhancer according to Embodiment 10 of this invention.
Figure 10B:
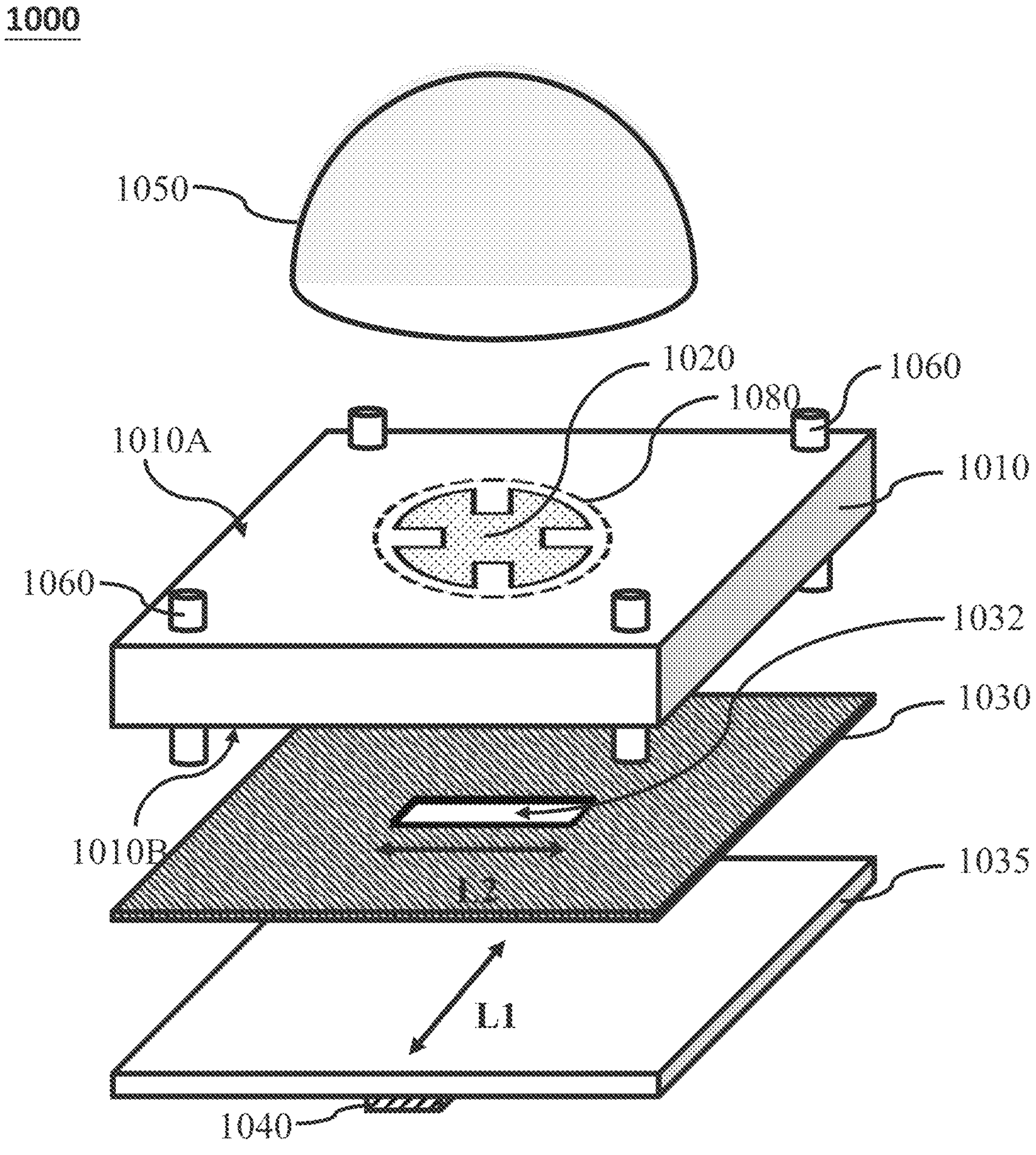
Figure 10C:
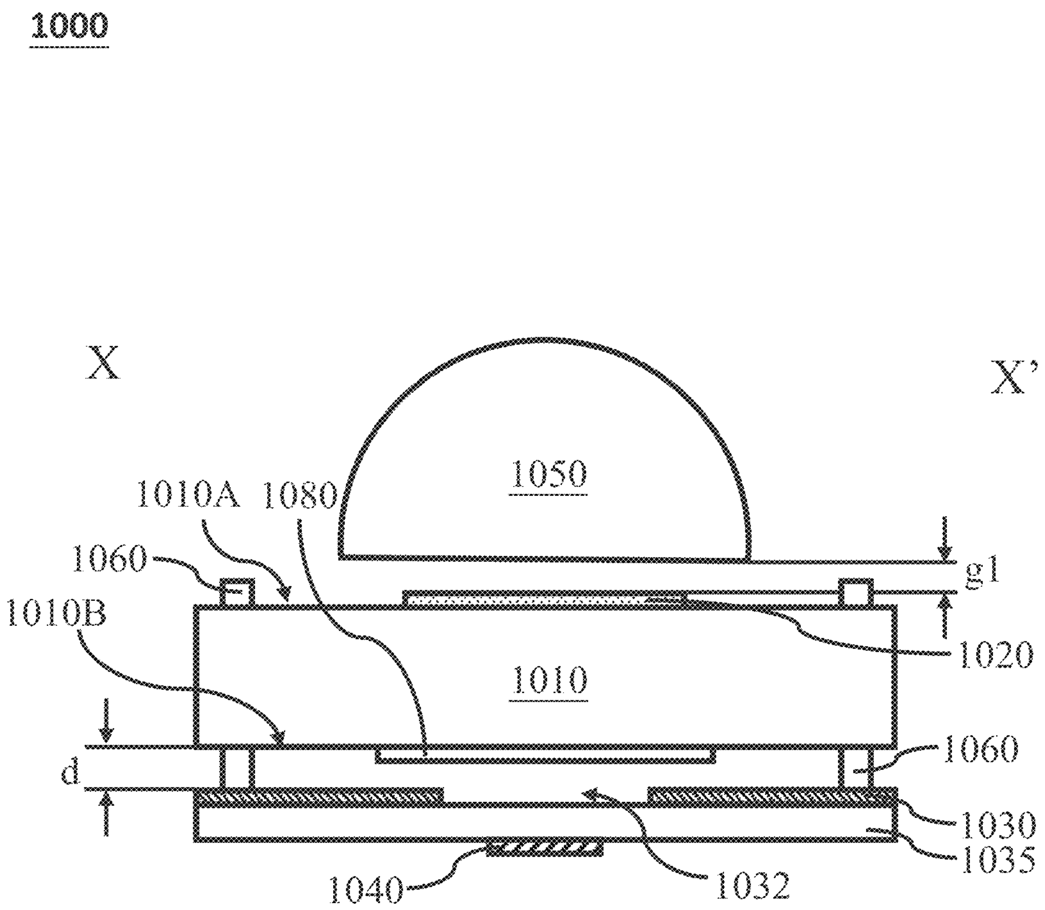

As the schematic perspective view, the exploded view and the cross-sectional view along with the cross-sectional line X-X' shown in FIGS. 10A~10C, the antenna assembly 1000 equipped with a sub-wavelength structured enhancer comprises: an antenna supporting substrate 1010 with a top surface 1010A and a bottom surface 1010B opposite to each other; a first patch antenna 1020 disposed on the top surface 1010A of the antenna supporting substrate 1010; a second patch antenna 1080 disposed on the bottom surface 1010B of the antenna supporting substrate 1010; a ground layer 1030 disposed under the bottom surface 1010B of the antenna supporting substrate 1010 corresponding to the first patch antenna 1020; A plurality of spacers 1060 are disposed between the antenna supporting substrate 1010 and the ground layer 1030 to maintain a distance d, (d>0), so as to avoid direct contact between the ground layer 1030 and the second patch antenna 1080 under the antenna supporting substrate 1010; a signal feeding line 1040 disposed under a side of the ground layer 1030 opposite to the antenna supporting substrate 1010 and spaced with the ground layer 1030 by an insulating layer 1035, wherein the ground layer 1030 has a coupling slit 1032 corresponding to the first patch antenna 1020, and a vertical projection of a first long axis direction L1 of the signal feeding line 1040 and a vertical projection of a second long axis direction L2 of the coupling slit 1032 are substantially orthogonal to each other to transmit the satellite signals by coupling effect; and a sub-wavelength structured enhancer 1050 disposed above the first patch antenna 1020, wherein the sub-wavelength structured enhancer 1050 is a solid structure and spaced with the first patch antenna 1020 by an air gap g1 of 10 mm. The air gap g1 between the sub-wavelength structured enhancer 1050 and the first patch antenna 1020 of other embodiments according to this present invention can be selected in the range of 7 mm to 47 mm as demand.

Figure 10D:
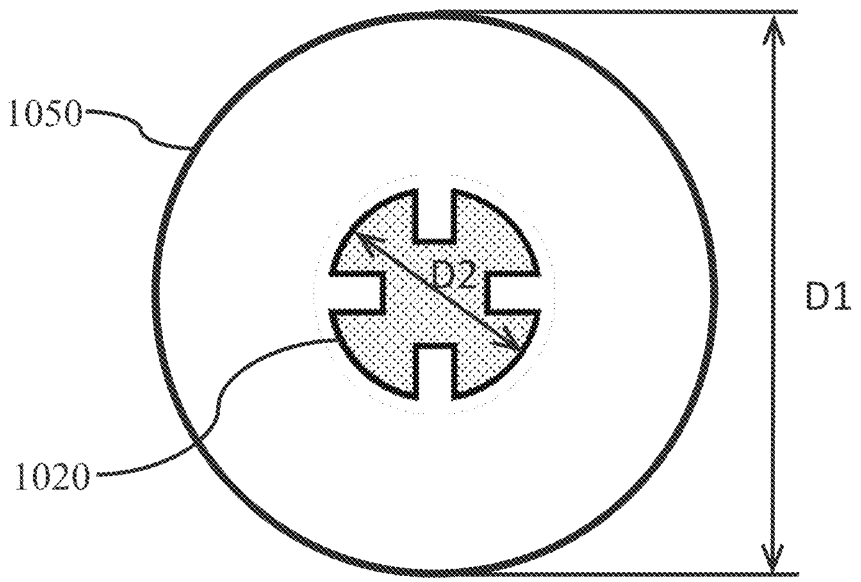

FIG. 10D is a vertical projection of the first patch antenna 1020 and the sub-wavelength structured enhancer 1050 of the antenna assembly 1000 equipped with a sub-wavelength structured enhancer according to Embodiment 10 of this invention. As shown in FIG. 10D, the vertical projection of the first patch antenna 1020 and the vertical projection of the sub-wavelength structured enhancer 1050 overlap with each other, and the maximum 1D linear dimension D1 of the vertical projection of the sub-wavelength structured enhancer 1050 is not greater than the wavelength of Ku band (25.0 mm), and the maximum 1D linear dimension D1 of the vertical projection of the sub-wavelength structured enhancer 1050 is greater than or equal to the maximum 1D linear dimension D2 of the vertical projection of the first patch antenna 1020, for example but not limited to the maximum 1D linear dimension D1 of the vertical projection of the sub-wavelength structured enhancer 1050 is N-fold of the maximum 1D linear dimension D2 of the vertical projection of the first patch antenna 1020, wherein 1≤N≤ratio of [(wavelength of Ku band)/(the maximum 1D linear dimension D2 of the vertical projection of the first patch antenna 1020)] to make the satellite signals be diffracted when passing through the sub-wavelength structured enhancer 1050. The maximum 1D linear dimension D2 of the vertical projection of the first patch antenna 1020 of this present Embodiment 10 is 6 mm, and the wavelength of Ku band is 24 mm, therefore N is in the ranging between 1 and 4 and the maximum 1D linear dimension D1 of the vertical projection of the sub-wavelength structured enhancer 1050 is in the ranging between 6 mm and 24 mm based on the calculation of the equation mentioned above. According to other embodiments of this present invention, a sub-wavelength structured enhancer 1050 with a different maximum 1D linear dimension D1 and a first patch antenna 1020 with a different maximum 1D linear dimension D2 can also be selected as demand.

The vertical projection of the first patch antenna 1020 of this present Embodiment 10 is a petal shape. However, other vertical projections for example but not limited to a concave shape, a rectangle shape, a circular shape or a polygonal shape of the first patch antenna 1020 can also be selected as demand in other embodiments according to this present invention.

The vertical projection of the second patch antenna 1080 of this present Embodiment 10 is a circular shape. However, other vertical projections for example but not limited to a concave shape, a rectangle shape, a polygonal shape or a petal shape of the second patch antenna 1080 can also be selected as demand in other embodiments according to this present invention.

The sub-wavelength structured enhancer 1050 of this present Embodiment 10 is made of a non-metallic material, for example but not limited to plastic, glass or ceramic. Moreover, the sub-wavelength structured enhancer 1050 of this present Embodiment 10 has a structure of solid hemisphere. Other sub-wavelength structured enhancer 1050 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 11

This present Embodiment 11 discloses an antenna assembly 1100 equipped with a sub-wavelength structured enhancer as shown in FIGS. 11A~11D.

Figure 11A:
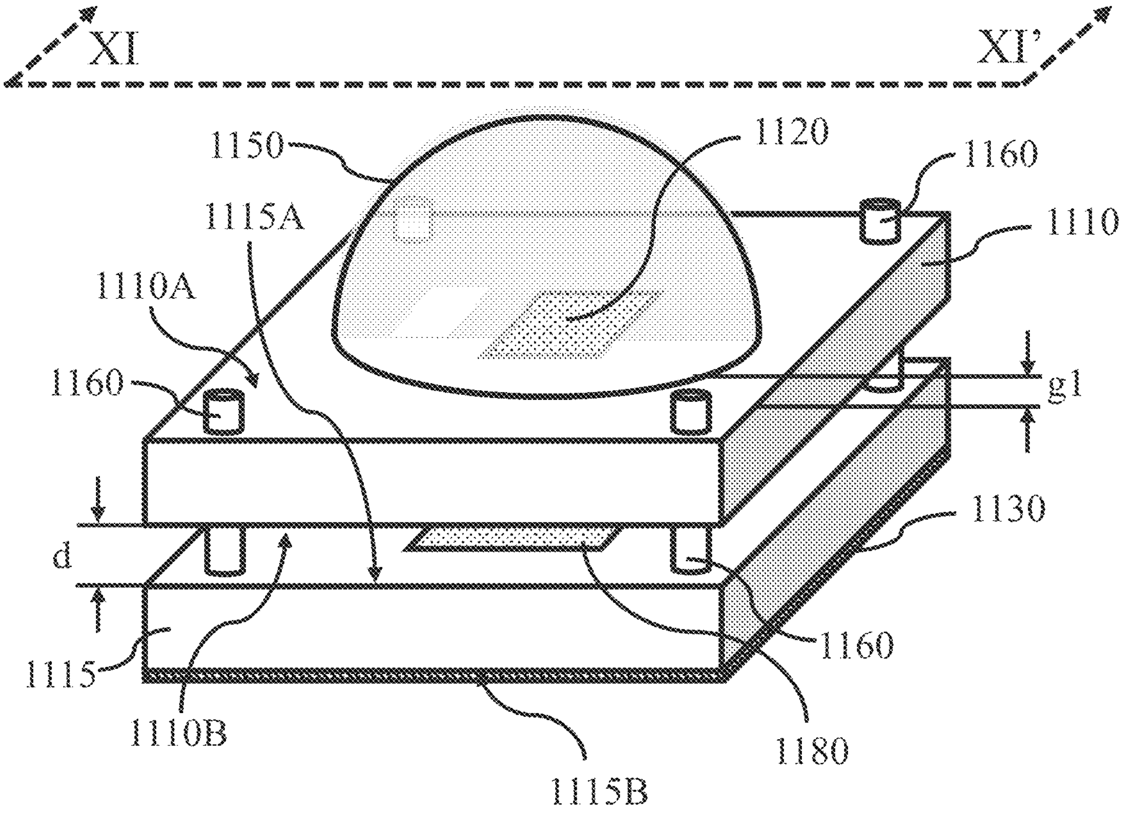
FIGS. 11A~11D are a schematic perspective view, an exploded view, a cross-sectional view along with the cross-sectional line XI-XI' and a vertical projection of an antenna assembly equipped with a sub-wavelength structured enhancer according to Embodiment 11 of this invention.
Figure 11B:
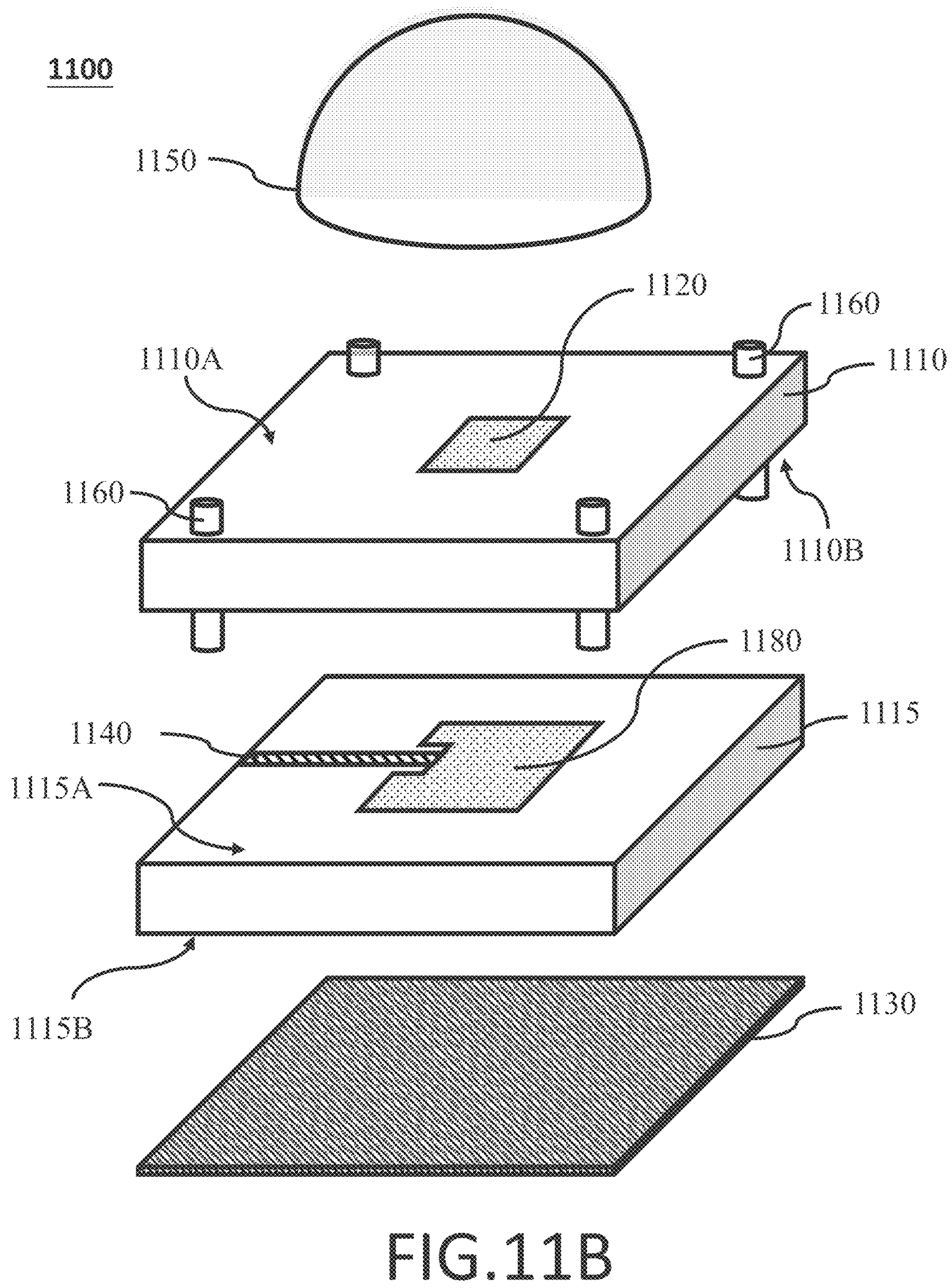
Figure 11C:
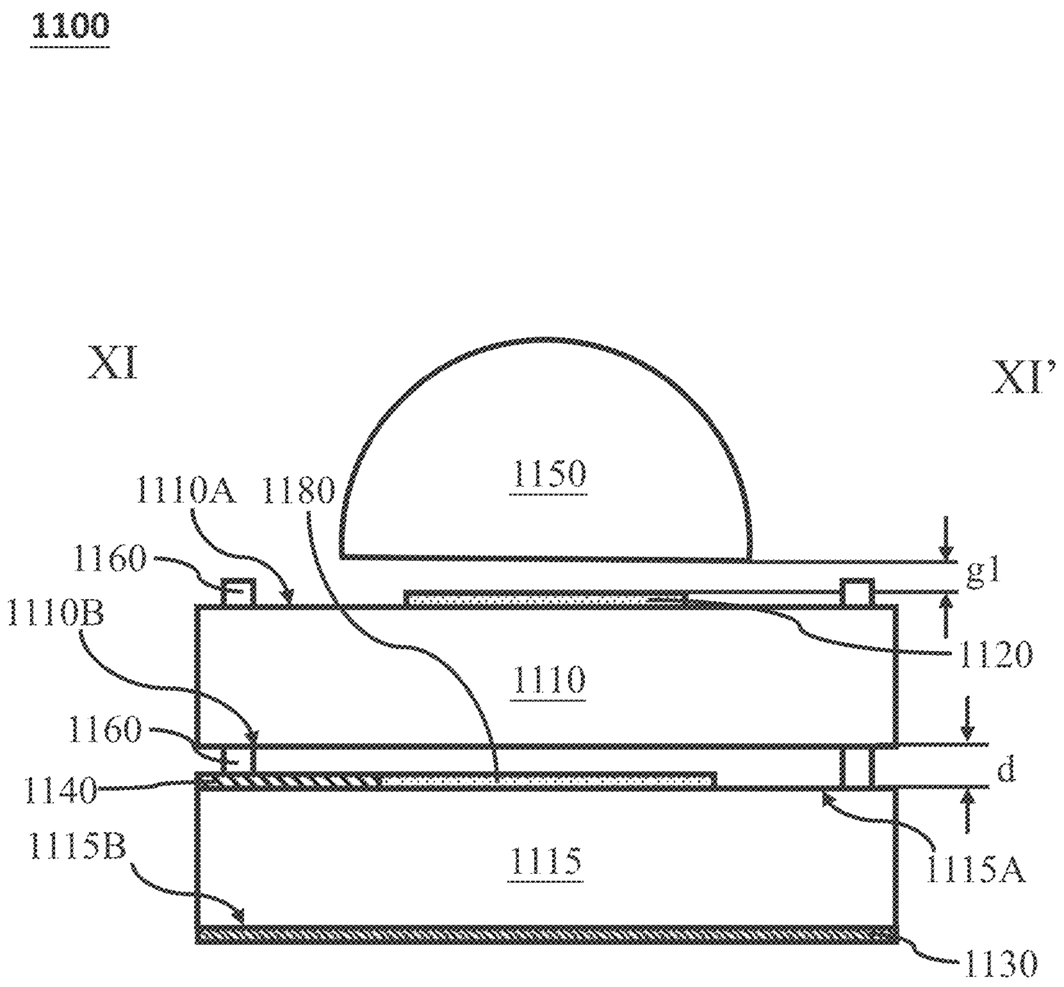

As the schematic perspective view, the exploded view and the cross-sectional view along with the cross-sectional line XI-XI' shown in FIGS. 11A~11C, the antenna assembly 1100 equipped with a sub-wavelength structured enhancer comprises: a first antenna supporting substrate 1110 with a first top surface 1110A and a first bottom substrate 1110B opposite to each other; a first patch antenna 1120 disposed on the first top surface 1110A; a second antenna supporting substrate 1115 with a second top surface 1115A and a second bottom substrate 1115B opposite to each other, wherein the second antenna supporting substrate 1115 is disposed under the first antenna supporting substrate 1110 and spaced with the first antenna supporting substrate 1110 by a distance d (d>0) by a plurality of spacers 1160 therebetween, wherein the second top surface 1115A of the second antenna supporting substrate 1115 is facing to the first bottom surface 1110B of the first antenna supporting substrate 1110; a second patch antenna 1180 disposed on the second top surface 1115A of the second antenna supporting substrate 1115; a ground layer 1130 disposed under the second bottom surface 1115B of the second antenna supporting substrate 1115; a signal feeding line 1140 disposed on the second top surface 1115A of the second antenna supporting substrate 1115, and the signal feeling line 1140 is connected to the second patch antenna 1180 for transmitting satellite signals; and a sub-wavelength structured enhancer 1150 disposed above the first patch antenna 1120, wherein the sub-wavelength structured enhancer 1150 is a solid structure and spaced with the first patch antenna 1120 by an air gap g1 of 10 mm. The air gap g1 between the sub-wavelength structured enhancer 1150 and the first patch antenna 1120 of other embodiments according to this present invention can be selected in the range of 7 mm to 47 mm as demand.

Figure 11D:
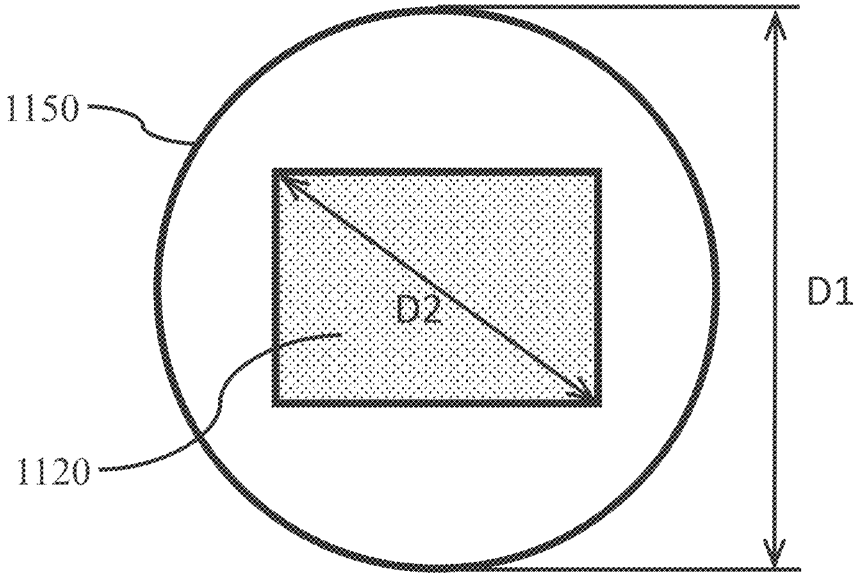

FIG. 11D is a vertical projection of the first patch antenna 1120 and the sub-wavelength structured enhancer 1150 of the antenna assembly 1100 equipped with a sub-wavelength structured enhancer according to Embodiment 11 of this invention. As shown in FIG. 11D, the vertical projection of the first patch antenna 1120 and the vertical projection of the sub-wavelength structured enhancer 1150 overlap with each other, and the maximum 1D linear dimension D1 of the vertical projection of the sub-wavelength structured enhancer 1150 is not greater than the wavelength of Ku band (25.0 mm), and the maximum 1D linear dimension D1 of the vertical projection of the sub-wavelength structured enhancer 1150 is greater than or equal to the maximum 1D linear dimension D2 of the vertical projection of the first patch antenna 1120, for example but not limited to the maximum 1D linear dimension D1 of the vertical projection of the sub-wavelength structured enhancer 1150 is N-fold of the maximum 1D linear dimension D2 of the vertical projection of the first patch antenna 1120, wherein 1≤N≤ratio of [(wavelength of Ku band)/(the maximum 1D linear dimension D2 of the vertical projection of the first patch antenna 1120)] to make the satellite signals be diffracted when passing through the sub-wavelength structured enhancer 1150. The maximum 1D linear dimension D2 of the vertical projection of the first patch antenna 1120 of this present Embodiment 11 is 6 mm, and the wavelength of Ku band is 24 mm, therefore N is in the ranging between 1 and 4 and the maximum 1D linear dimension D1 of the vertical projection of the sub-wavelength structured enhancer 1150 is in the ranging between 6 mm and 24 mm based on the calculation of the equation mentioned above. According to other embodiments of this present invention, a sub-wavelength structured enhancer 1150 with a different maximum 1D linear dimension D1 and a first patch antenna 1120 with a different maximum 1D linear dimension D2 can also be selected as demand.

The first patch antenna 1120 of this present Embodiment 11 is disposed on the first top surface 1110A of the first antenna supporting substrate 1110 and the second patch antenna 1180 of this present Embodiment 11 is disposed on the second top surface 1115A of the second antenna supporting substrate 1115. However, the first patch antenna 1120 of other embodiments can also alternatively be disposed on the first bottom surface 11108 of the first antenna supporting substrate 1110 (not shown) or inside of the first antenna supporting substrate 1110 (not shown), and the second patch antenna 1180 and the signal feeding line 1140 of other embodiments can also alternatively be disposed on a same or different surfaces inside of the second antenna supporting substrate 1115 and connected with each other (not shown) as demand. Moreover, the vertical projection of the first patch antenna 1120 of this present Embodiment 11 is a rectangle shape. However, other vertical projections for example but not limited to a concave shape, a circular shape, a polygonal shape or a petal shape of the first patch antenna 1120 can also be selected as demand in other embodiments according to this present invention.

The vertical projection of the second patch antenna 1180 of this present Embodiment 11 is a concave shape. However, other vertical projections for example but not limited to a rectangle shape, a circular shape, a polygonal shape or a petal shape of the second patch antenna 1180 can also be selected as demand in other embodiments according to this present invention.

The sub-wavelength structured enhancer 1150 of this present Embodiment 11 is made of a non-metallic material, for example but not limited to plastic, glass or ceramic. Moreover, the sub-wavelength structured enhancer 1150 of this present Embodiment 11 has a structure of solid hemisphere. Other sub-wavelength structured enhancer 1150 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 12

This present Embodiment 12 discloses an antenna assembly 1200 equipped with a sub-wavelength structured enhancer as shown in FIGS. 12A-12D.

Figure 12A:
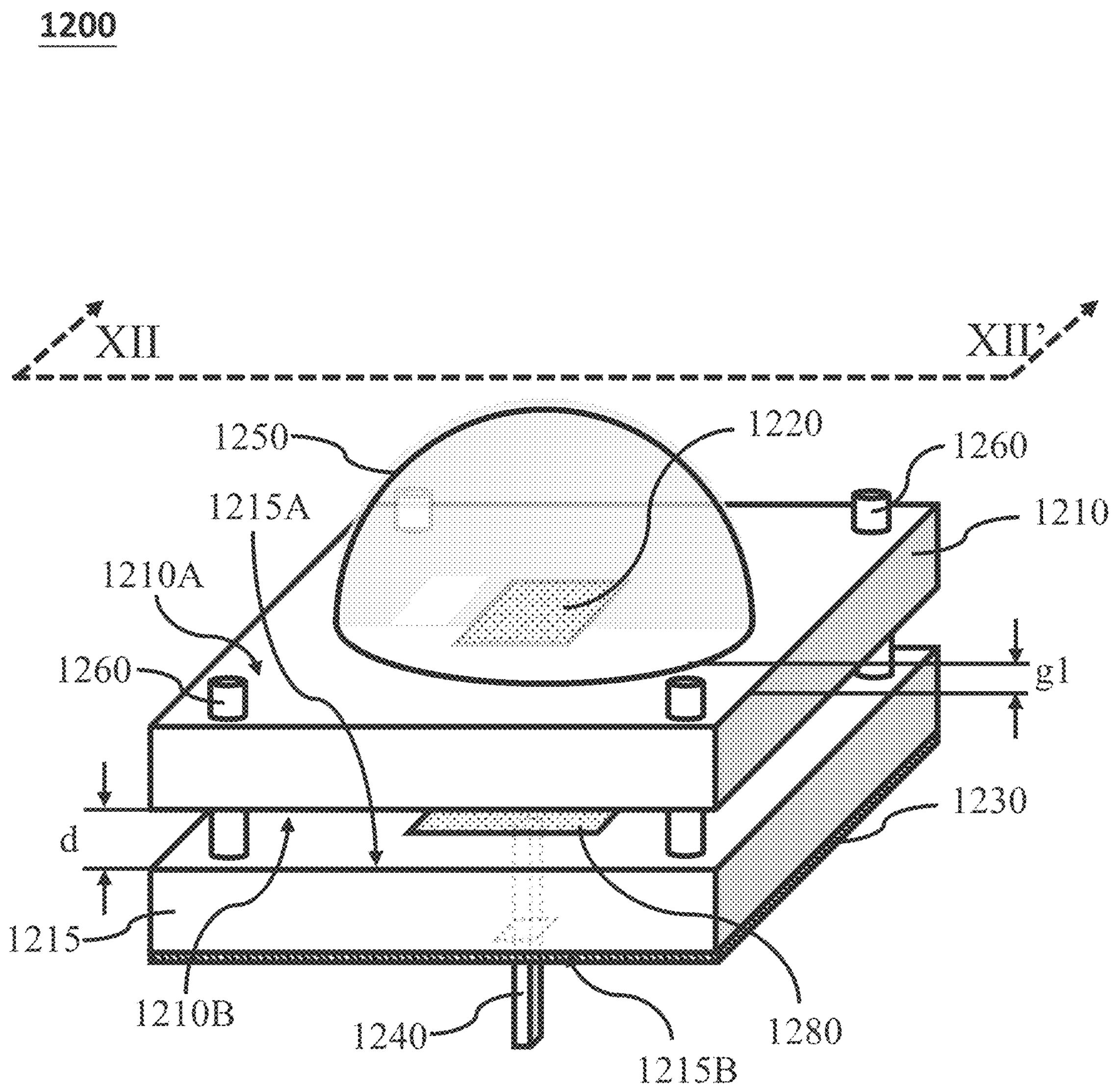
FIGS. 12A~12D are a schematic perspective view, an exploded view, a cross-sectional view along with the cross-sectional line XII-XII' and a vertical projection of an antenna assembly equipped with a sub-wavelength structured enhancer according to Embodiment 12 of this invention.
Figure 12B:
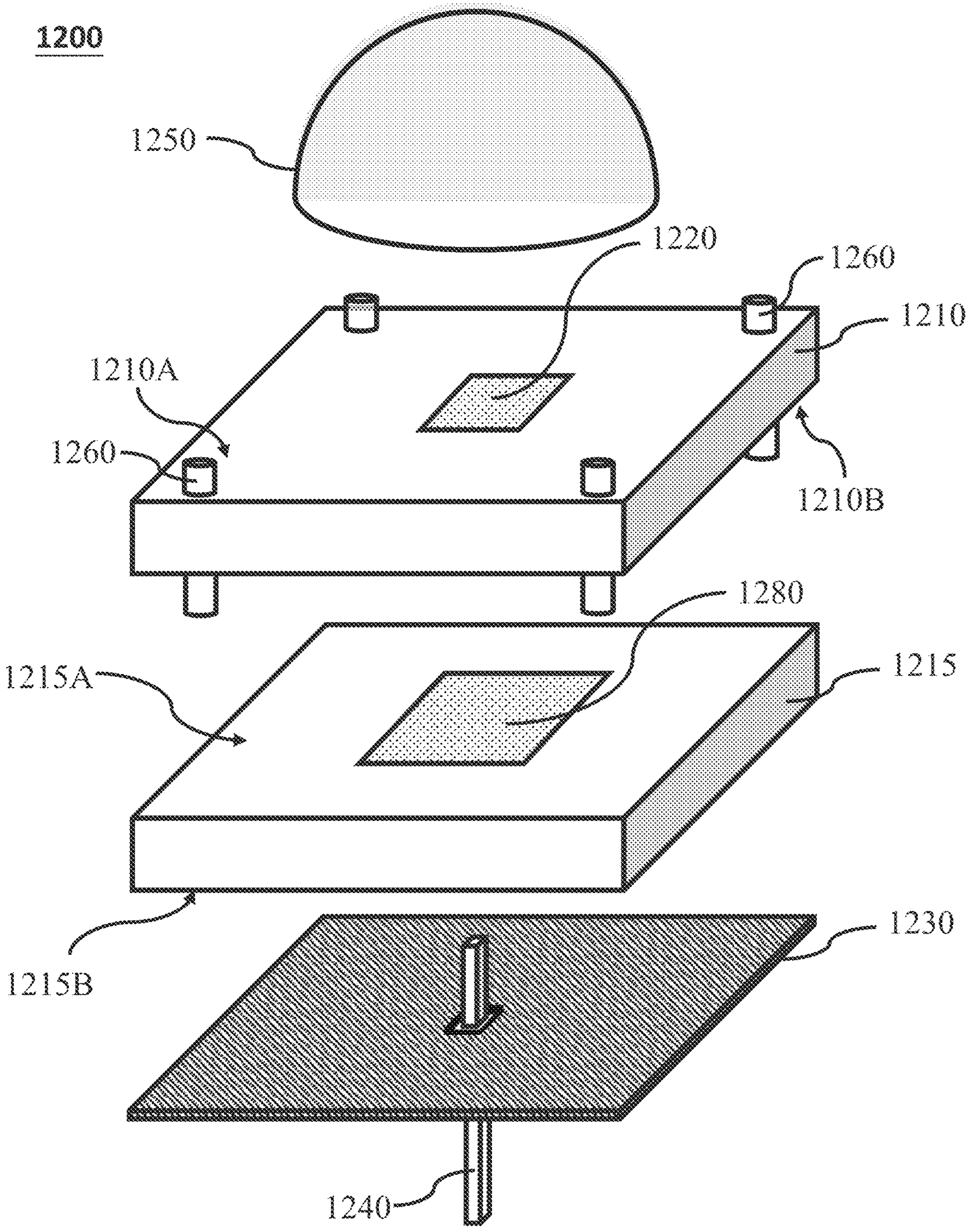
Figure 12C:
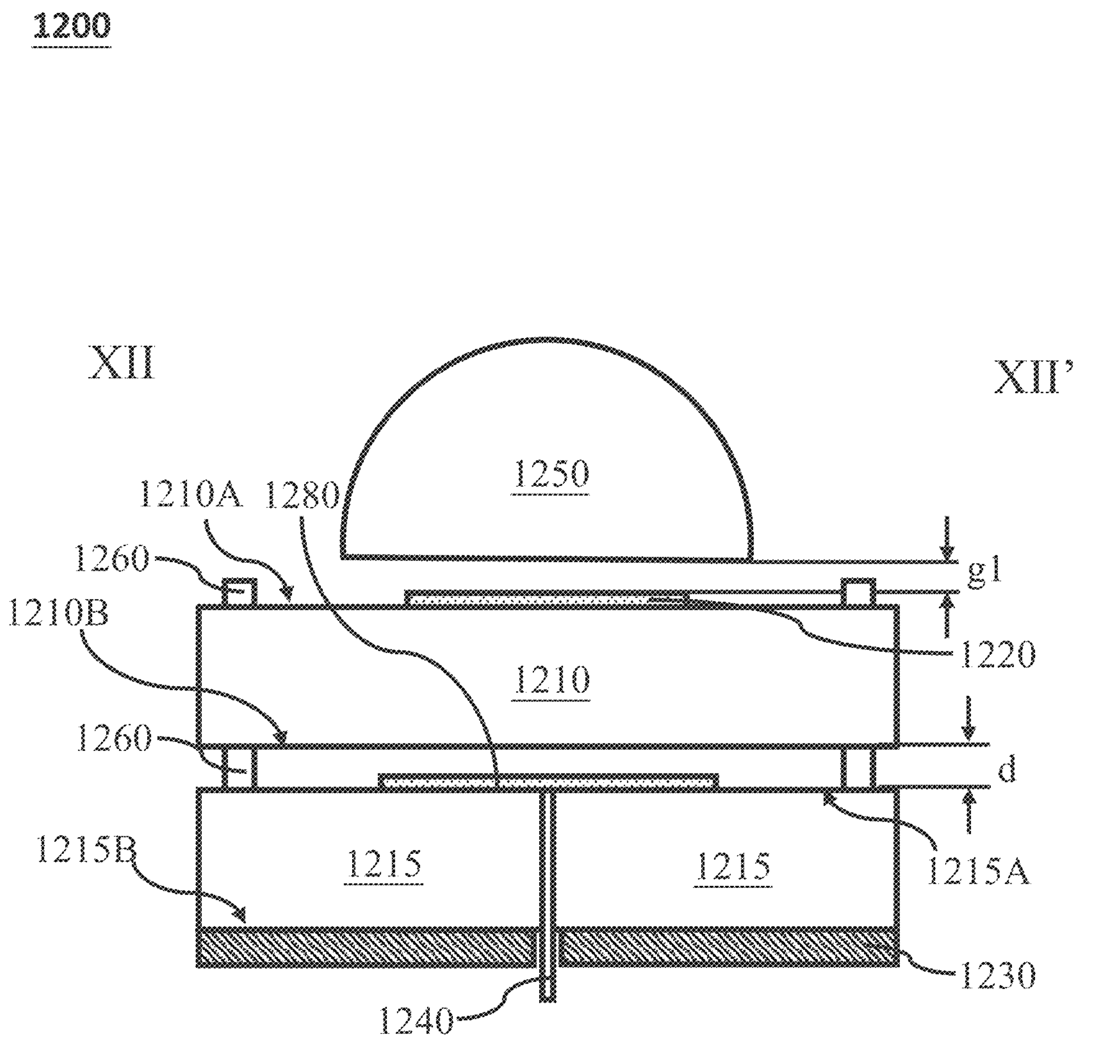

As the schematic perspective view, the exploded view and the cross-sectional view along with the cross-sectional line XII-XII' shown in FIGS. 12A-12C, the antenna assembly 1200 equipped with a sub-wavelength structured enhancer comprises: a first antenna supporting substrate 1210 with a first top surface 1210A and a first bottom substrate 1210B opposite to each other; a first patch antenna 1220 disposed on the first top surface 1210A; a second antenna supporting substrate 1215 with a second top surface 1215A and a second bottom substrate 1215B opposite to each other, wherein the second antenna supporting substrate 1215 is disposed under the first antenna supporting substrate 1210 and spaced with the first antenna supporting substrate 1210 by a distance d (d>0) by a plurality of spacers 1260 therebetween, wherein the second top surface 1215A of the second antenna supporting substrate 1215 is facing to the first bottom surface 1210B of the first antenna supporting substrate 1210; a second patch antenna 1280 disposed on the second top surface 1215A of the second antenna supporting substrate 1215; a ground layer 1230 disposed under the second bottom surface 1215B of the second antenna supporting substrate 1215; a signal feeding line 1240 disposed under the second patch antenna 1280 and connected with the second patch antenna 1280 by running through the ground layer 1230 and all of the second antenna supporting substrate 1215 for transmitting satellite signals; and a sub-wavelength structured enhancer 1250 disposed above the first patch antenna 1220, wherein the sub-wavelength structured enhancer 1250 is a solid structure and spaced with the first patch antenna 1220 by an air gap g1 of 10 mm. The air gap g1 between the sub-wavelength structured enhancer 1250 and the first patch antenna 1220 of other embodiments according to this present invention can be selected in the range of 7 mm to 47 mm as demand.

Figure 12D:
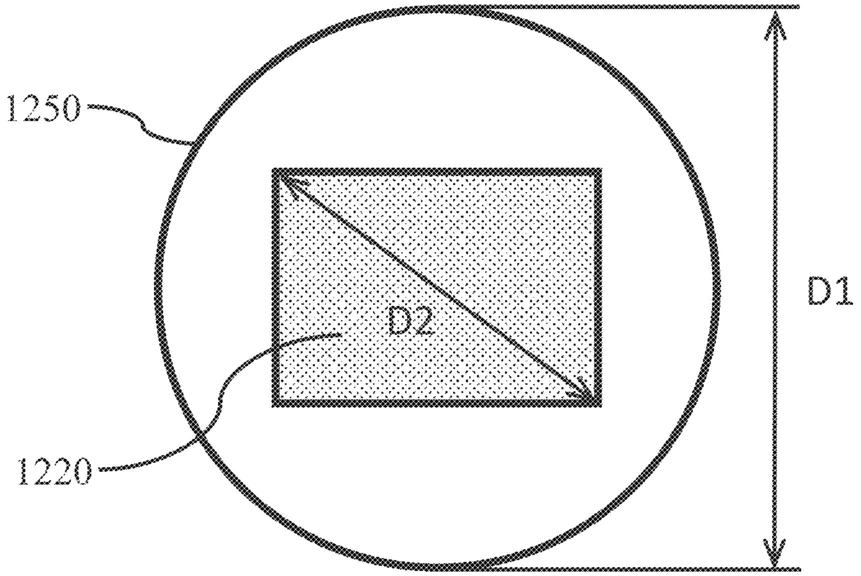

FIG. 12D is a vertical projection of the first patch antenna 1220 and the sub-wavelength structured enhancer 1250 of the antenna assembly 1200 equipped with a sub-wavelength structured enhancer according to Embodiment 12 of this invention. As shown in FIG. 12D, the vertical projection of the first patch antenna 1220 and the vertical projection of the sub-wavelength structured enhancer 1250 overlap with each other, and the maximum 1D linear dimension D1 of the vertical projection of the sub-wavelength structured enhancer 1250 is not greater than the wavelength of Ku band (25.0 mm), and the maximum 1D linear dimension D1 of the vertical projection of the sub-wavelength structured enhancer 1250 is greater than or equal to the maximum 1D linear dimension D2 of the vertical projection of the first patch antenna 1220, for example but not limited to the maximum 1D linear dimension D1 of the vertical projection of the sub-wavelength structured enhancer 1250 is N-fold of the maximum 1D linear dimension D2 of the vertical projection of the first patch antenna 1220, wherein 1≤N≤ratio of [(wavelength of Ku band)/(the maximum 1D linear dimension D2 of the vertical projection of the first patch antenna 1220)] to make the satellite signals be diffracted when passing through the sub-wavelength structured enhancer 1250. The maximum 1D linear dimension D2 of the vertical projection of the first patch antenna 1220 of this present Embodiment 12 is 6 mm, and the wavelength of Ku band is 24 mm, therefore N is in the ranging between 1 and 4 and the maximum 1D linear dimension D1 of the vertical projection of the sub-wavelength structured enhancer 1250 is in the ranging between 6 mm and 24 mm based on the calculation of the equation mentioned above. According to other embodiments of this present invention, a sub-wavelength structured enhancer 1250 with a different maximum 1D linear dimension D1 and a first patch antenna 1220 with a different maximum 1D linear dimension D2 can also be selected as demand.

The first patch antenna 1220 of this present Embodiment 12 is disposed on the first top surface 1210A of the first antenna supporting substrate 1210 and the second patch antenna 1280 of this present Embodiment 12 is disposed on the second top surface 1215A of the second antenna supporting substrate 1215. However, the first patch antenna 1220 of other embodiments can also alternatively be disposed on the first bottom surface 12108 of the first antenna supporting substrate 1210 (not shown) or inside of the first antenna supporting substrate 1210 (not shown), and the second patch antenna 1280 can also alternatively be disposed inside of the second antenna supporting substrate 1215 of other embodiments (not shown) as demand, and the signal feeding line 1240 is alternatively disposed under the second patch antenna 1280 and connected with the second patch antenna 1280 by running through the ground layer 1230 and part of the second antenna supporting substrate 1215 (not shown). Moreover, the vertical projection of the first patch antenna 1220 of this present Embodiment 12 is a rectangle shape. However, other vertical projections for example but not limited to a concave shape, a circular shape, a polygonal shape or a petal shape of the first patch antenna 1220 can also be selected as demand in other embodiments according to this present invention.

The vertical projection of the second patch antenna 1280 of this present Embodiment 12 is a rectangle shape. However, other vertical projections for example but not limited to a concave shape, a circular shape, a polygonal shape or a petal shape of the second patch antenna 1280 can also be selected as demand in other embodiments according to this present invention.

The sub-wavelength structured enhancer 1250 of this present Embodiment 12 is made of a non-metallic material, for example but not limited to plastic, glass or ceramic. Moreover, the sub-wavelength structured enhancer 1250 of this present Embodiment 12 has a structure of solid hemisphere. Other sub-wavelength structured enhancer 1250 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Embodiment 13

This present Embodiment 13 discloses an antenna assembly 1300 equipped with a sub-wavelength structured enhancer as shown in FIGS. 13A-13D.

Figure 13A:
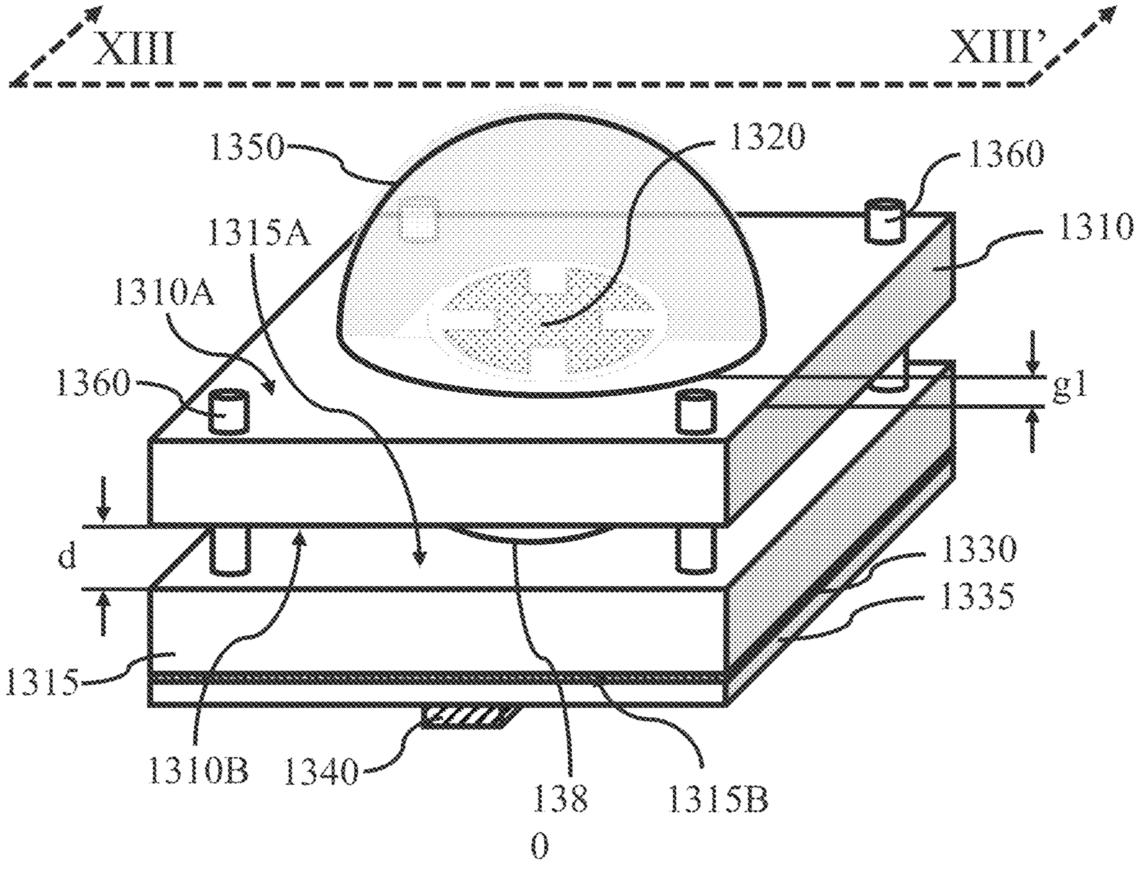
FIGS. 13A~13D are a schematic perspective view, an exploded view, a cross-sectional view along with the cross-sectional line XIII-XIII' and a vertical projection of an antenna assembly equipped with a sub-wavelength structured enhancer according to Embodiment 13 of this invention.
Figure 13B:
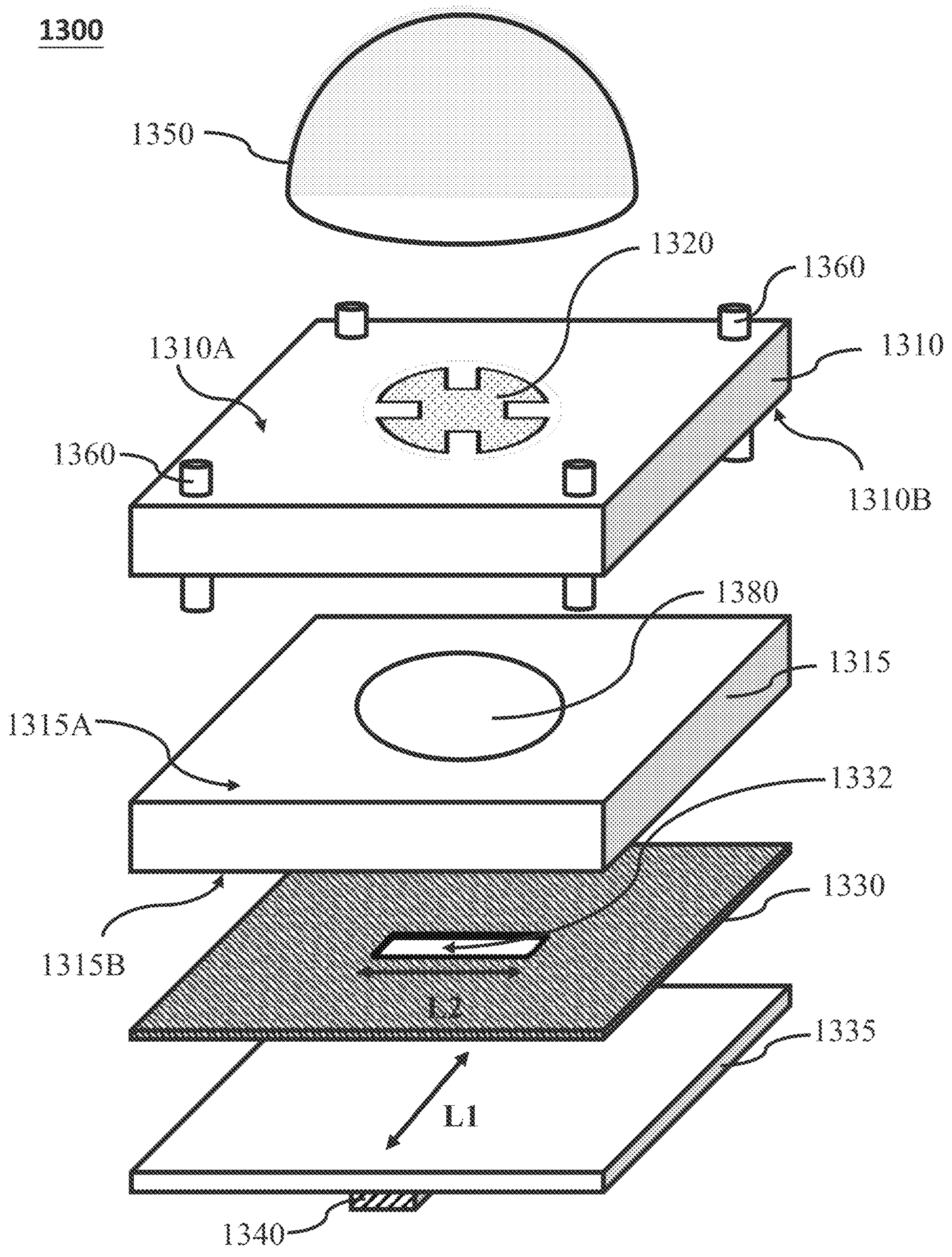
Figure 13C:
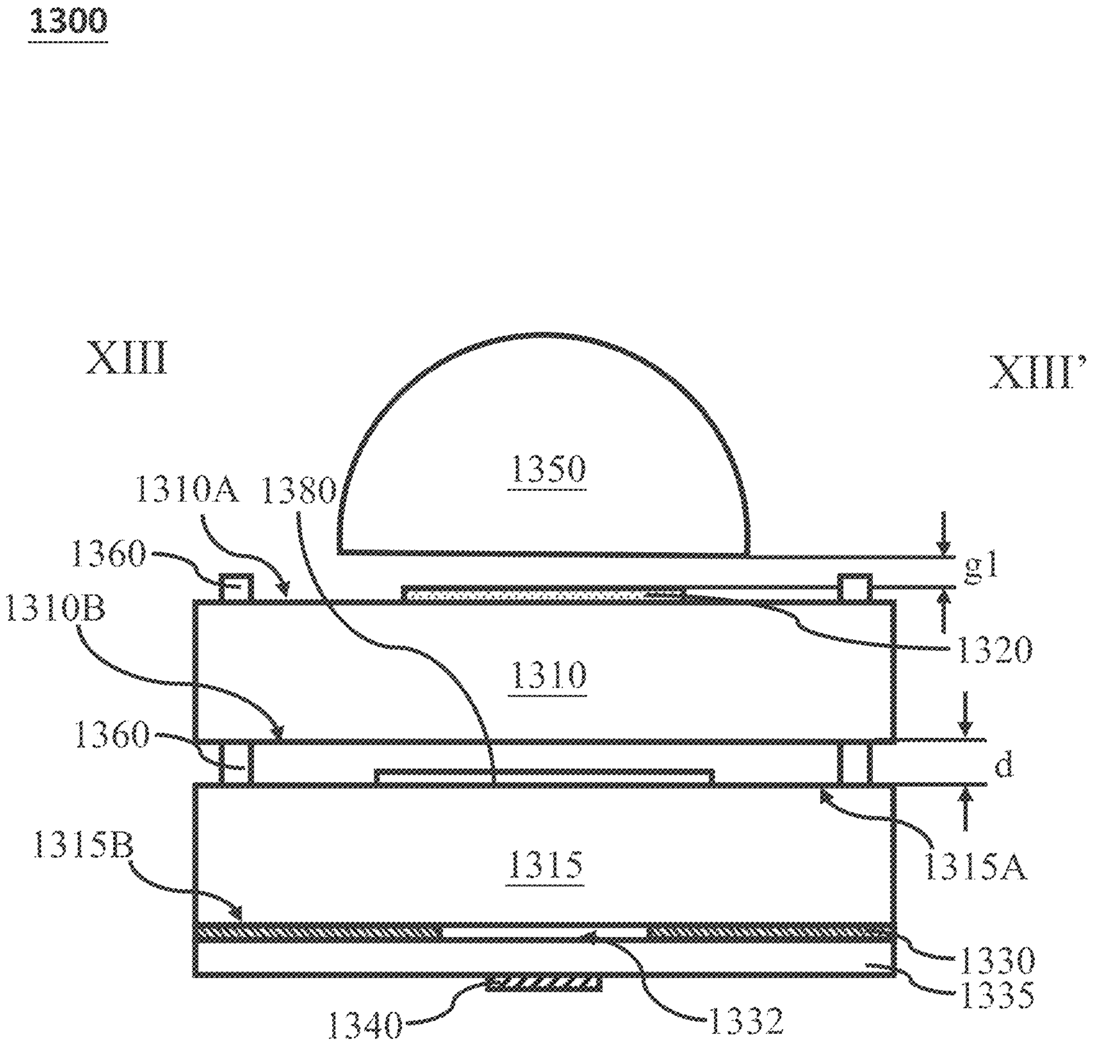

As the schematic perspective view, the exploded view and the cross-sectional view along with the cross-sectional line XIII-XIII' shown in FIGS. 13A-13C, the antenna assembly 1300 equipped with a sub-wavelength structured enhancer comprises: a first antenna supporting substrate 1310 with a first top surface 1310A and a first bottom substrate 1310B opposite to each other; a first patch antenna 1320 disposed on the first top surface 1310A; a second antenna supporting substrate 1315 with a second top surface 1315A and a second bottom substrate 1315B opposite to each other, wherein the second antenna supporting substrate 1315 is disposed under the first antenna supporting substrate 1310 and spaced with the first antenna supporting substrate 1310 by a distance d (d>0) by a plurality of spacers 1360 therebetween, wherein the second top surface 1315A of the second antenna supporting substrate 1315 is facing to the first bottom surface 1310B of the first antenna supporting substrate 1310; a second patch antenna 1380 disposed on the second top surface 1315A of the second antenna supporting substrate 1315; a ground layer 1330 disposed under the second bottom surface 1315B of the second antenna supporting substrate 1315; a signal feeding line 1340 disposed under a side of the ground layer 1330 opposite to the antenna supporting substrate 1315 and spaced with the ground layer 1330 by an insulating layer 1335, wherein the ground layer 1330 has a coupling slit 1332 corresponding to the first patch antenna 1320, and a vertical projection of a first long axis direction L1 of the signal feeding line 1340 and a vertical projection of a second long axis direction L2 of the coupling slit 1332 are substantially orthogonal to each other to transmit the satellite signals by coupling effect; and a sub-wavelength structured enhancer 1350 disposed above the first patch antenna 1320, wherein the sub-wavelength structured enhancer 1350 is a solid structure and spaced with the first patch antenna 1320 by an air gap g1 of 10 mm. The air gap g1 between the sub-wavelength structured enhancer 1350 and the first patch antenna 1320 of other embodiments according to this present invention can be selected in the range of 7 mm to 47 mm as demand.

Figure 13D:
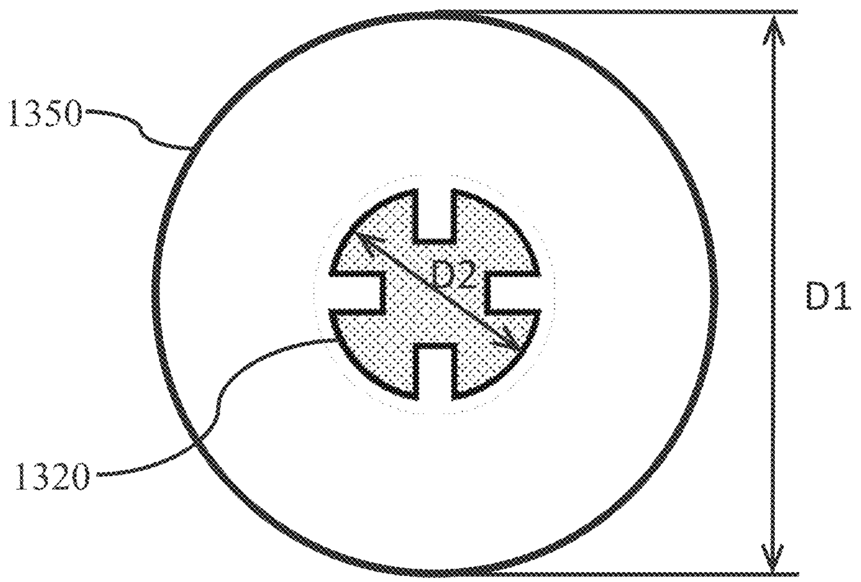

FIG. 13D is a vertical projection of the first patch antenna 1320 and the sub-wavelength structured enhancer 1350 of the antenna assembly 1300 equipped with a sub-wavelength structured enhancer according to Embodiment 13 of this invention. As shown in FIG. 13D, the vertical projection of the first patch antenna 1320 and the vertical projection of the sub-wavelength structured enhancer 1350 overlap with each other, and the maximum 1D linear dimension D1 of the vertical projection of the sub-wavelength structured enhancer 1350 is not greater than the wavelength of Ku band (25.0 mm), and the maximum 1D linear dimension D1 of the vertical projection of the sub-wavelength structured enhancer 1350 is greater than or equal to the maximum 1D linear dimension D2 of the vertical projection of the first patch antenna 1320, for example but not limited to the maximum 1D linear dimension D1 of the vertical projection of the sub-wavelength structured enhancer 1350 is N-fold of the maximum 1D linear dimension D2 of the vertical projection of the first patch antenna 1320, wherein 1≤N≤ratio of [(wavelength of Ku band)/(the maximum 1D linear dimension D2 of the vertical projection of the first patch antenna 1320)] to make the satellite signals be diffracted when passing through the sub-wavelength structured enhancer 1350. The maximum 1D linear dimension D2 of the vertical projection of the first patch antenna 1320 of this present Embodiment 13 is 6 mm, and the wavelength of Ku band is 24 mm, therefore N is in the ranging between 1 and 4 and the maximum 1D linear dimension D1 of the vertical projection of the sub-wavelength structured enhancer 1350 is in the ranging between 6 mm and 24 mm based on the calculation of the equation mentioned above. According to other embodiments of this present invention, a sub-wavelength structured enhancer 1350 with a different maximum 1D linear dimension D1 and a first patch antenna 1320 with a different maximum 1D linear dimension D2 can also be selected as demand.

The first patch antenna 1320 of this present Embodiment 13 is disposed on the first top surface 1310A of the first antenna supporting substrate 1310 and the second patch antenna 1380 of this present Embodiment 13 is disposed on the second top surface 1315A of the second antenna supporting substrate 1315. However, the first patch antenna 1320 of other embodiments can also alternatively be disposed on the first bottom surface 13108 of the first antenna supporting substrate 1310 (not shown) or inside of the first antenna supporting substrate 1310 (not shown), and the second patch antenna 1380 can also alternatively be disposed inside of the second antenna supporting substrate 1315 of other embodiments (not shown) as demand. Moreover, the vertical projection of the first patch antenna 1320 of this present Embodiment 13 is a rectangle shape. However, other vertical projections for example but not limited to a concave shape, a circular shape, a polygonal shape or a petal shape of the first patch antenna 1320 can also be selected as demand in other embodiments according to this present invention.

The vertical projection of the second patch antenna 1380 of this present Embodiment 13 is a circular shape. However, other vertical projections for example but not limited to a rectangle shape, a concave shape, a polygonal shape or a petal shape of the second patch antenna 1380 can also be selected as demand in other embodiments according to this present invention.

The sub-wavelength structured enhancer 1350 of this present Embodiment 13 is made of a non-metallic material, for example but not limited to plastic, glass or ceramic. Moreover, the sub-wavelength structured enhancer 1350 of this present Embodiment 13 has a structure of solid hemisphere. Other sub-wavelength structured enhancer 1350 has a polygonal bottom or a circular bottom can also be selected as demand, for example but not limited to a sub-wavelength structured enhancer 14A has a structure of solid sphere as shown in FIG. 14A, a sub-wavelength structured enhancer 14B has a structure of solid cylinder as shown in FIG. 14B, a sub-wavelength structured enhancer 14C has a structure of solid cone as shown in FIG. 14C, a sub-wavelength structured enhancer 14D has a structure of solid triangular pyramid as shown in FIG. 14D, or a sub-wavelength structured enhancer 14E has a structure of solid triangular prism.

Simulated and Measured Properties of the Antenna Assembly

Properties of the antenna assemblies according to this present invention were exemplarily expressed by simulating the electric field distribution of the antenna assembly equipped 1000 with a sub-wavelength structured enhancer by Lumerical FDTD under a radio wave of 11.7 GHz. The pictures of the electric field distribution are described as follows. The picture showing the electric field distribution of the antenna assembly 1000 equipped with a sub-wavelength structured enhancer according to Embodiment 10 of this invention, and pictures showing the electric field distribution of the first patch antenna 1020, the second patch antenna 1080, the ground layer 1030, and the signal feeding line 1040 of the antenna assembly 1000 equipped with a sub-wavelength structured enhancer according to Embodiment 10 of this invention are respectively shown in FIGS. 15A-15E. As shown in FIGS. 15A-15E, the radio waves of 11.7 GHz is focused on edges of the first patch antenna 1020, the second patch antenna 1080, the ground layer 1030, and the signal feeding line 1040 when passing through the sub-wavelength structured enhancer 1050 above the first patch antenna 1020. It demonstrates that the radio waves of 11.7 GHz is diffracted when passing through the sub-wavelength structured enhancer 1050.

Figure 15A:
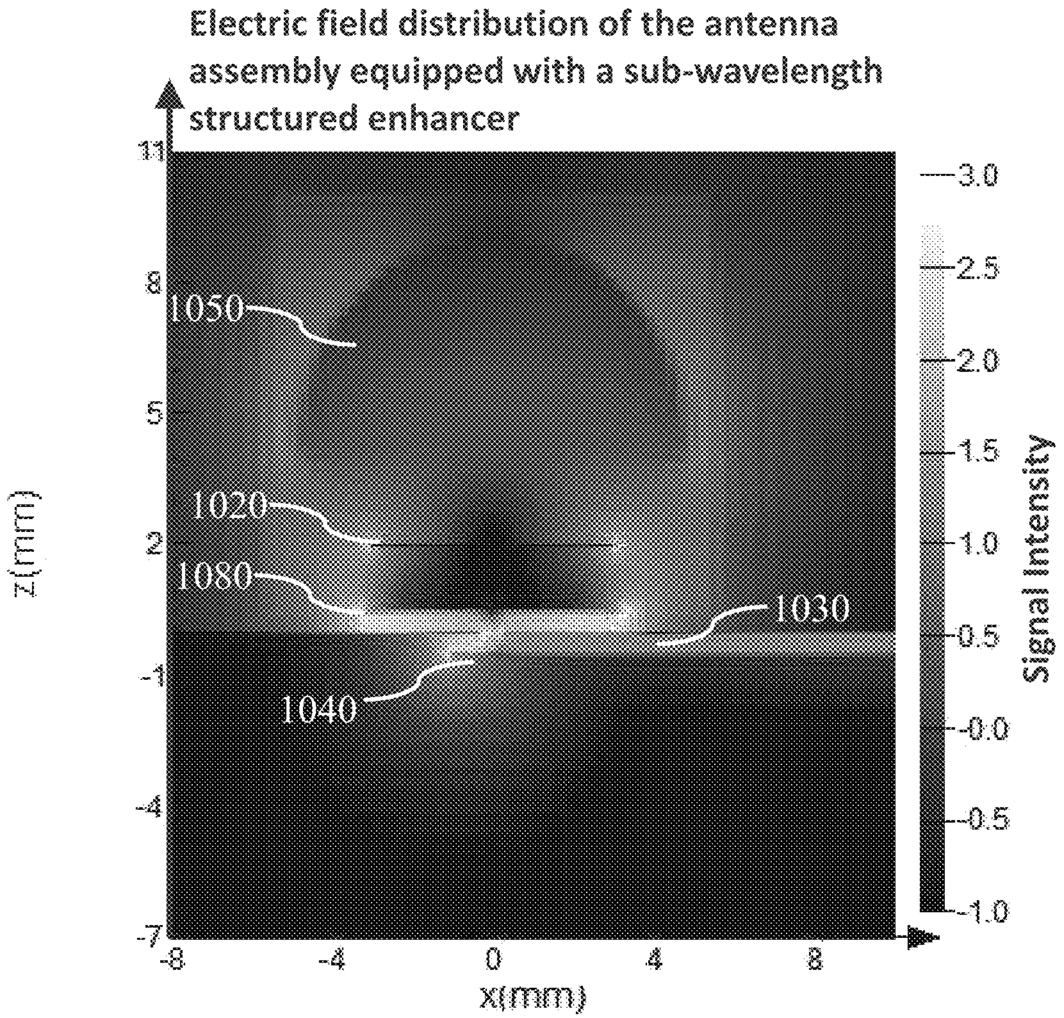
FIG. 15A is a picture showing the electric field distribution of the antenna assembly 1000 equipped with a sub-wavelength structured enhancer according to Embodiment 10 of this invention simulated under a radio wave of 11.7 GHz.
Figure 15B:
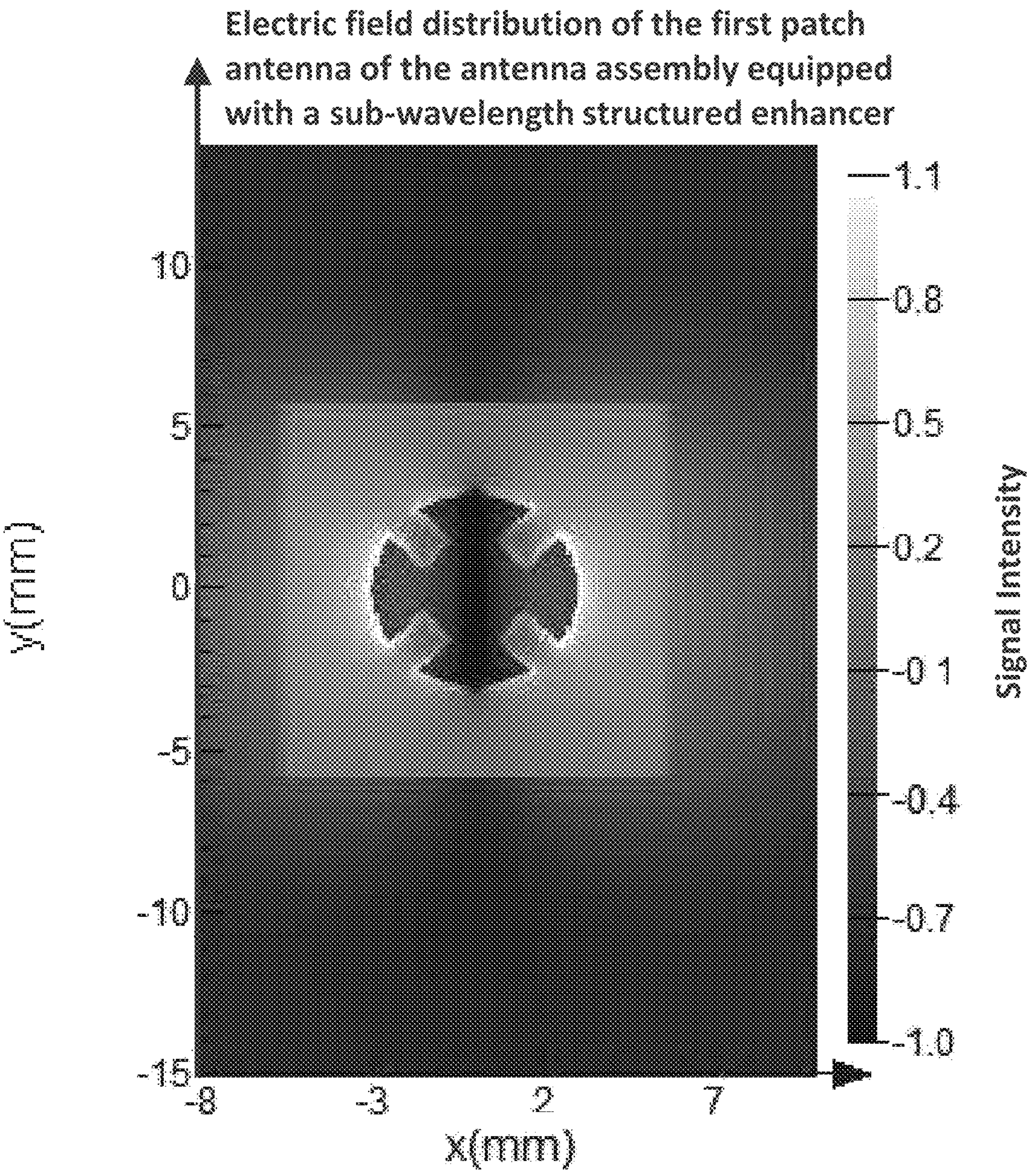
FIG. 15B is a picture showing the electric field distribution of the first patch antenna 1020 of the antenna assembly 1000 equipped with a sub-wavelength structured enhancer according to Embodiment 10 of this invention simulated under a radio wave of 11.7 GHz.
Figure 15C:
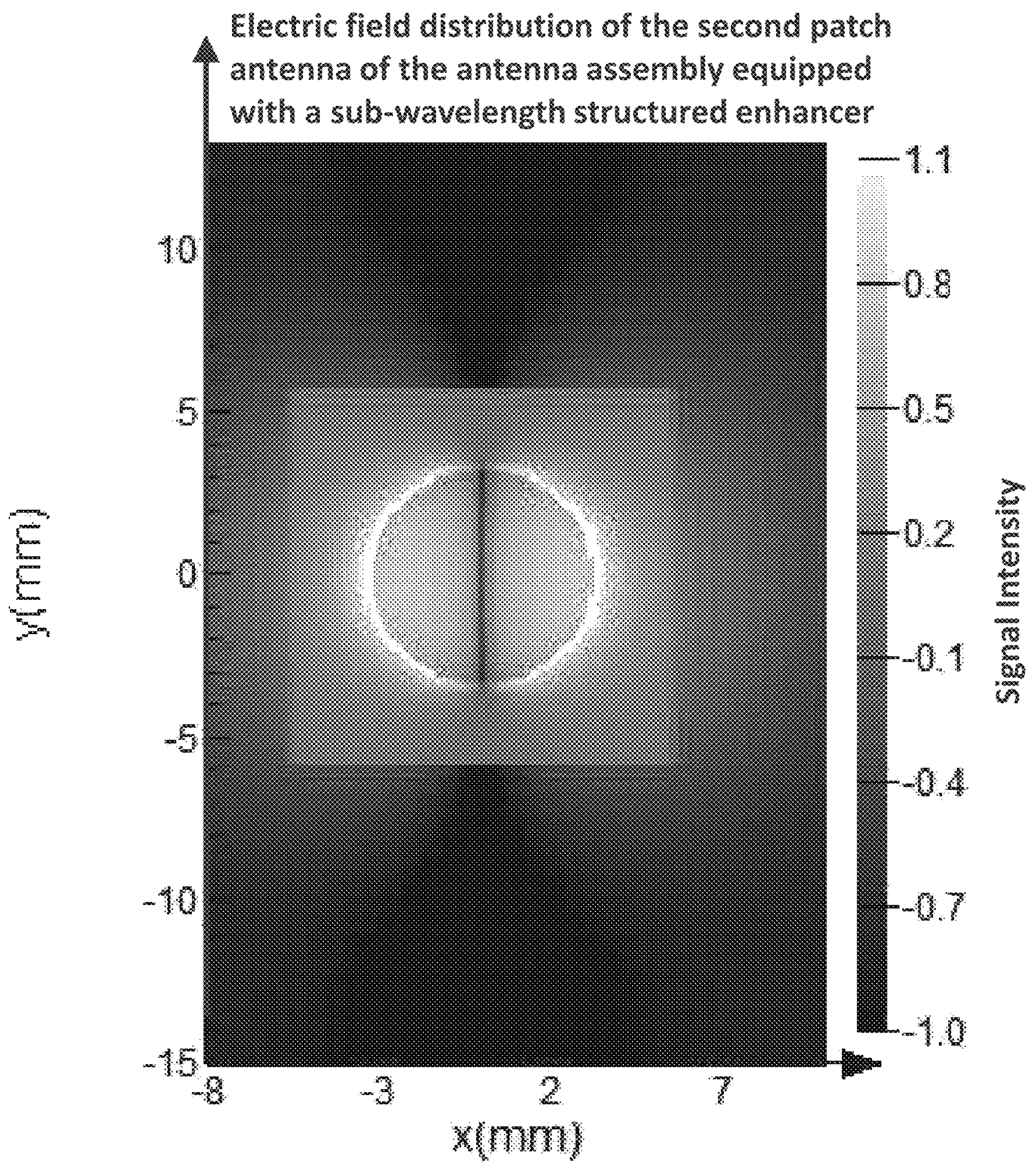
FIG. 15C is a picture showing the electric field distribution of the second patch antenna 1080 of the antenna assembly 1000 equipped with a sub-wavelength structured enhancer according to Embodiment 10 of this invention simulated under a radio wave of 11.7 GHz.
Figure 15D:
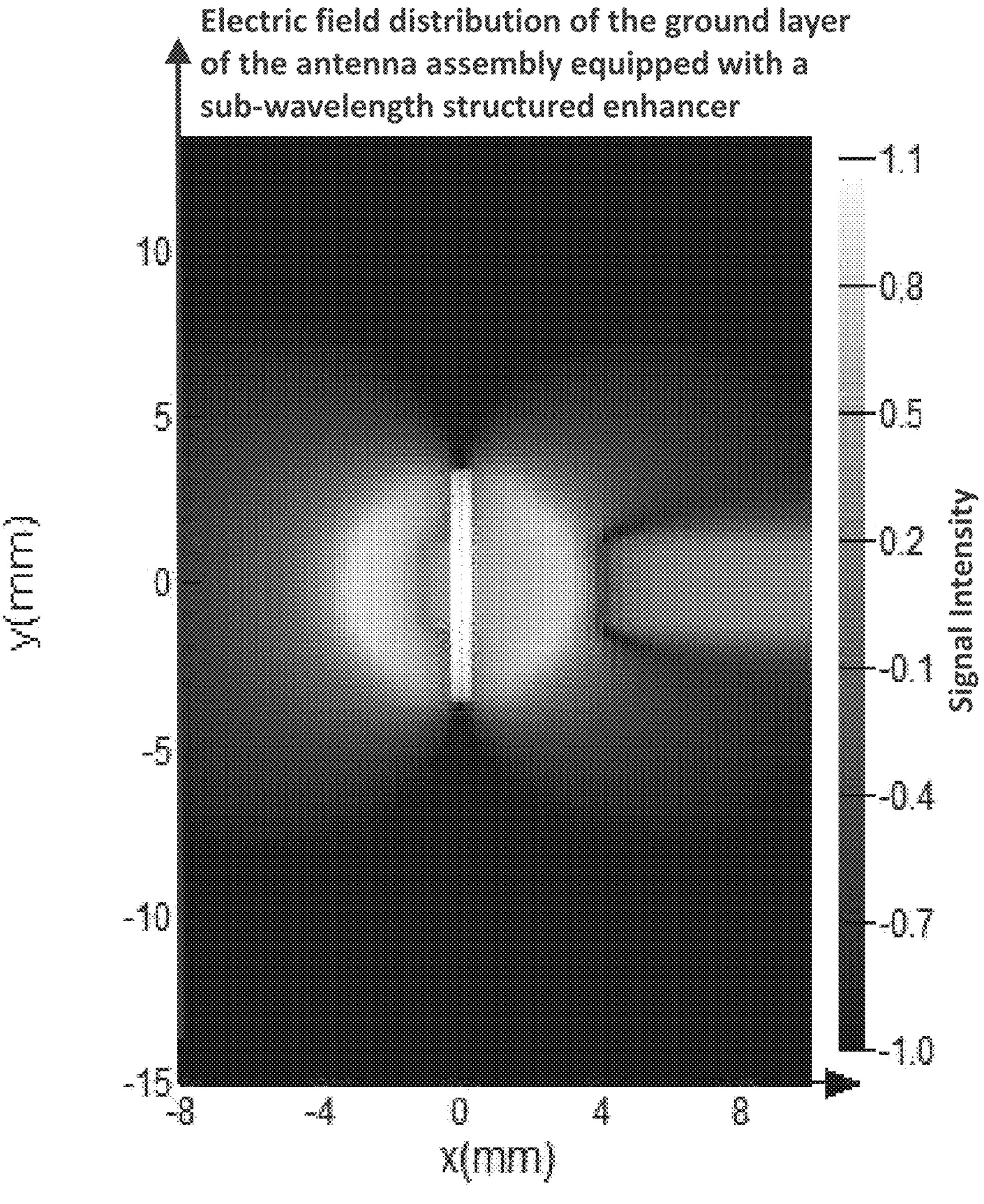
FIG. 15D is a picture showing the electric field distribution of the ground layer 1030 of the antenna assembly 1000 equipped with a sub-wavelength structured enhancer according to Embodiment 10 of this invention simulated under a radio wave of 11.7 GHz.
Figure 15E:
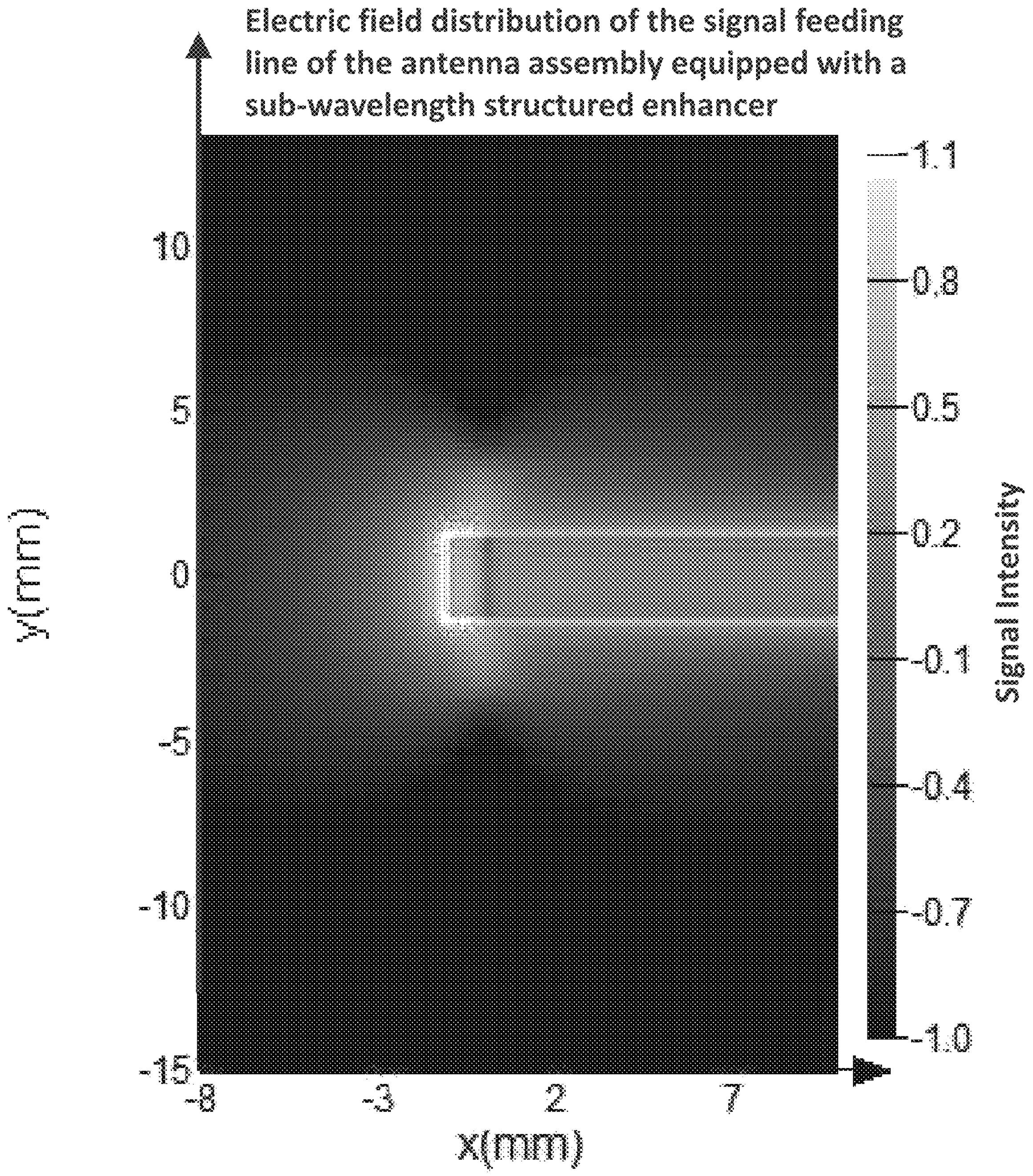
FIG. 15E is a picture showing the electric field distribution of the signal feeding line 1040 of the antenna assembly 1000 equipped with a sub-wavelength structured enhancer according to Embodiment 10 of this invention simulated under a radio wave of 11.7 GHz.
Figure 15F:
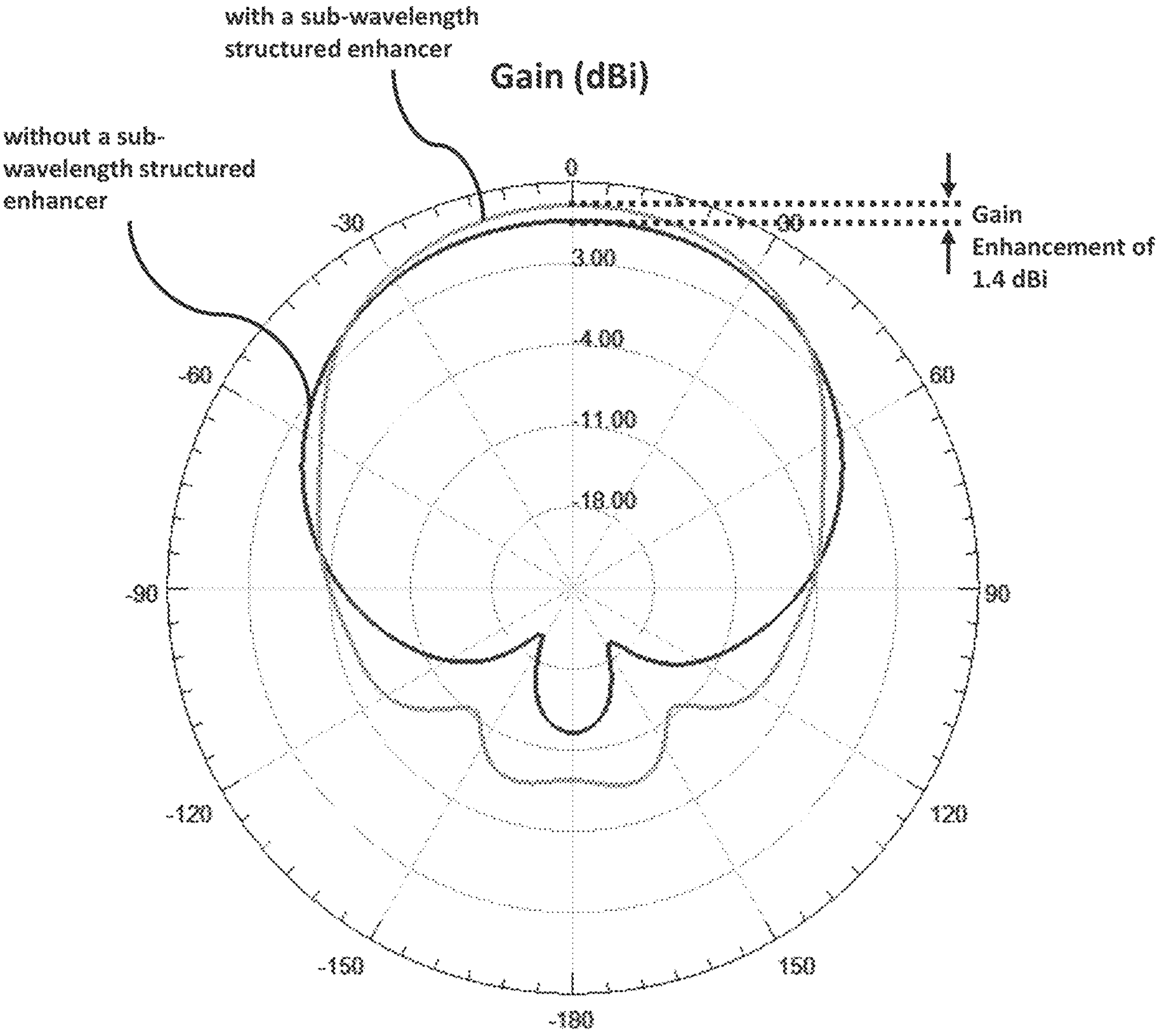
FIG. 15F is a diagram showing the gain of the antenna assembly 1000 equipped with a sub-wavelength structured enhancer according to Embodiment 10 of this invention and the gain of the conventional antenna assembly 1900 as shown in FIGS. 19A~19C simulated under a radio wave of 11.7 GHz.
Figure 15G:
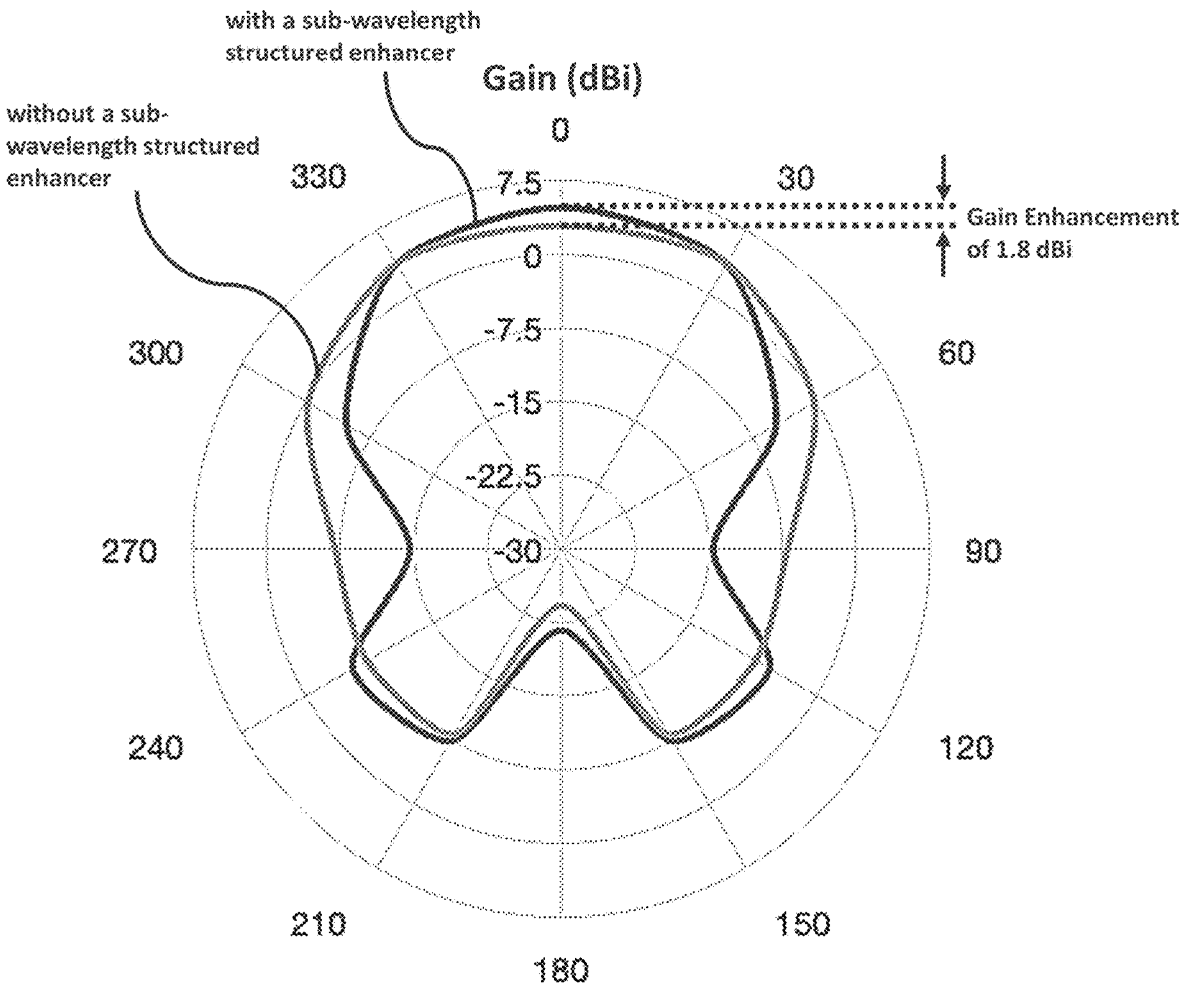
FIG. 15G is a diagram showing the gain of the antenna assembly 1000 equipped with a sub-wavelength structured enhancer according to Embodiment 10 of this invention and the gain of the conventional antenna assembly 1900 as shown in FIGS. 19A~19C measured under a radio wave of 11.7 GHz.
Figure 15H:
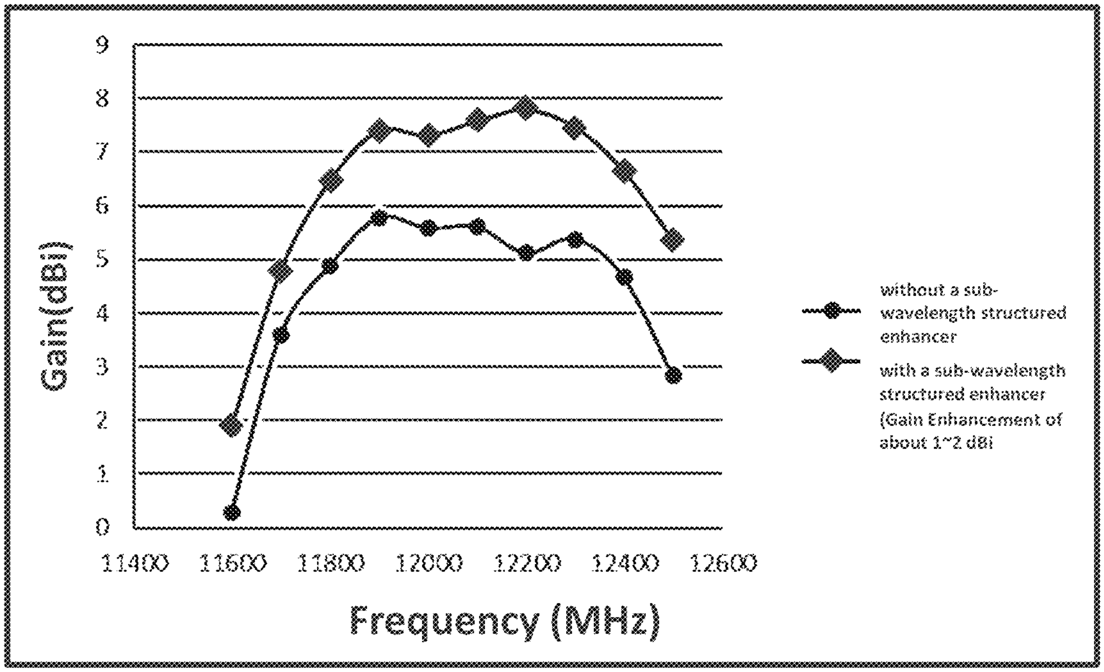
FIG. 15H is a diagram showing gains of the antenna assembly 1000 equipped with a sub-wavelength structured enhancer according to Embodiment 10 of this invention and gains of the conventional antenna assembly 1900 as shown in FIGS. 19A~19C measured under a radio wave of 11.7 GHz-12.5 GHz.
Figure 15I:
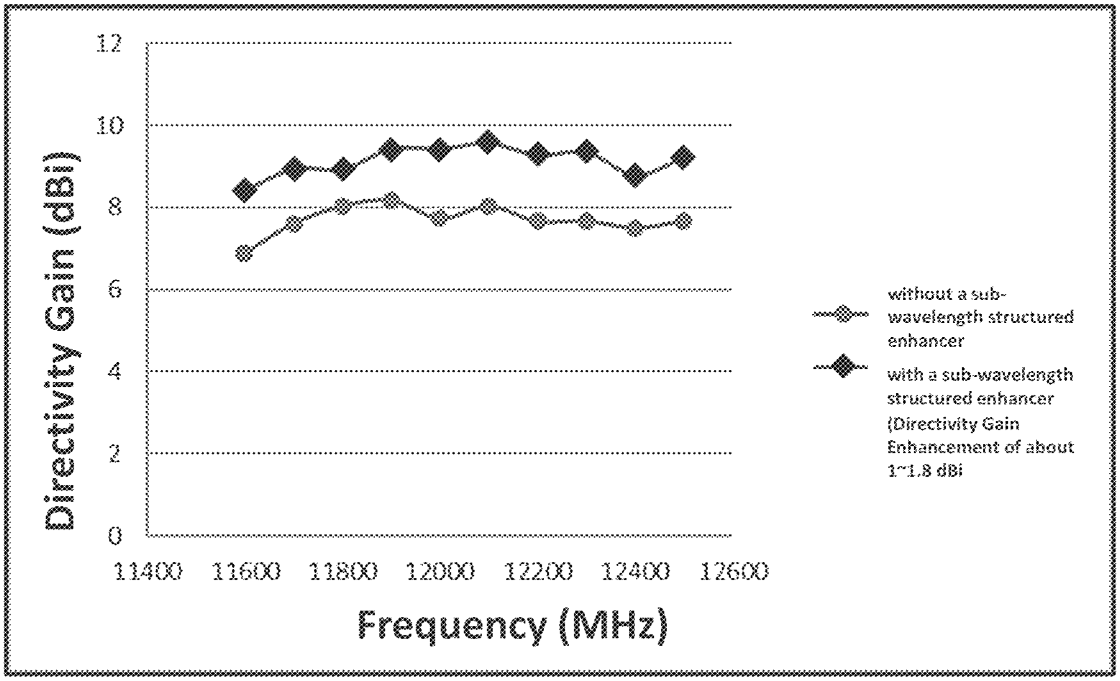
FIG. 15I is a diagram showing the directivity gains of the of the antenna assembly 1000 equipped with a sub-wavelength structured enhancer according to Embodiment 10 of this invention and directivity gains of the conventional antenna assembly 1900 as shown in FIGS. 19A~19C measured under a radio wave of between 11.7 GHz and 12.5 GHz.
Figure 19A:
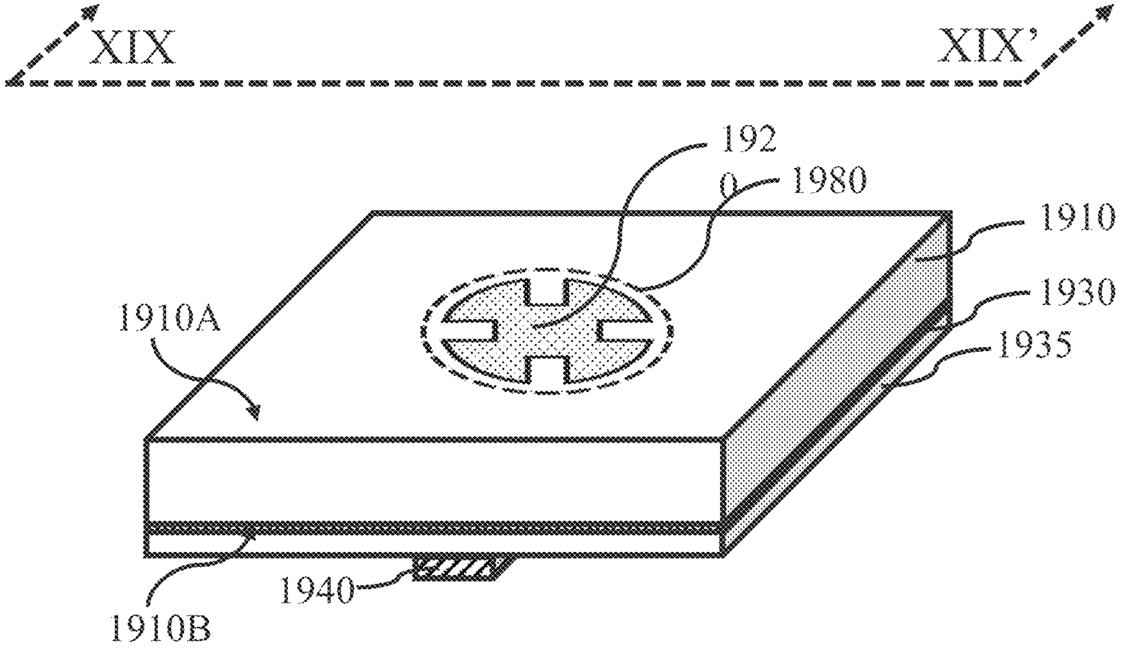
FIGS. 19A~19C are a schematic perspective view, an exploded view and a cross-sectional view along with the cross-sectional line XIX-XIX' of a conventional antenna assembly 1900.
Figure 19B:
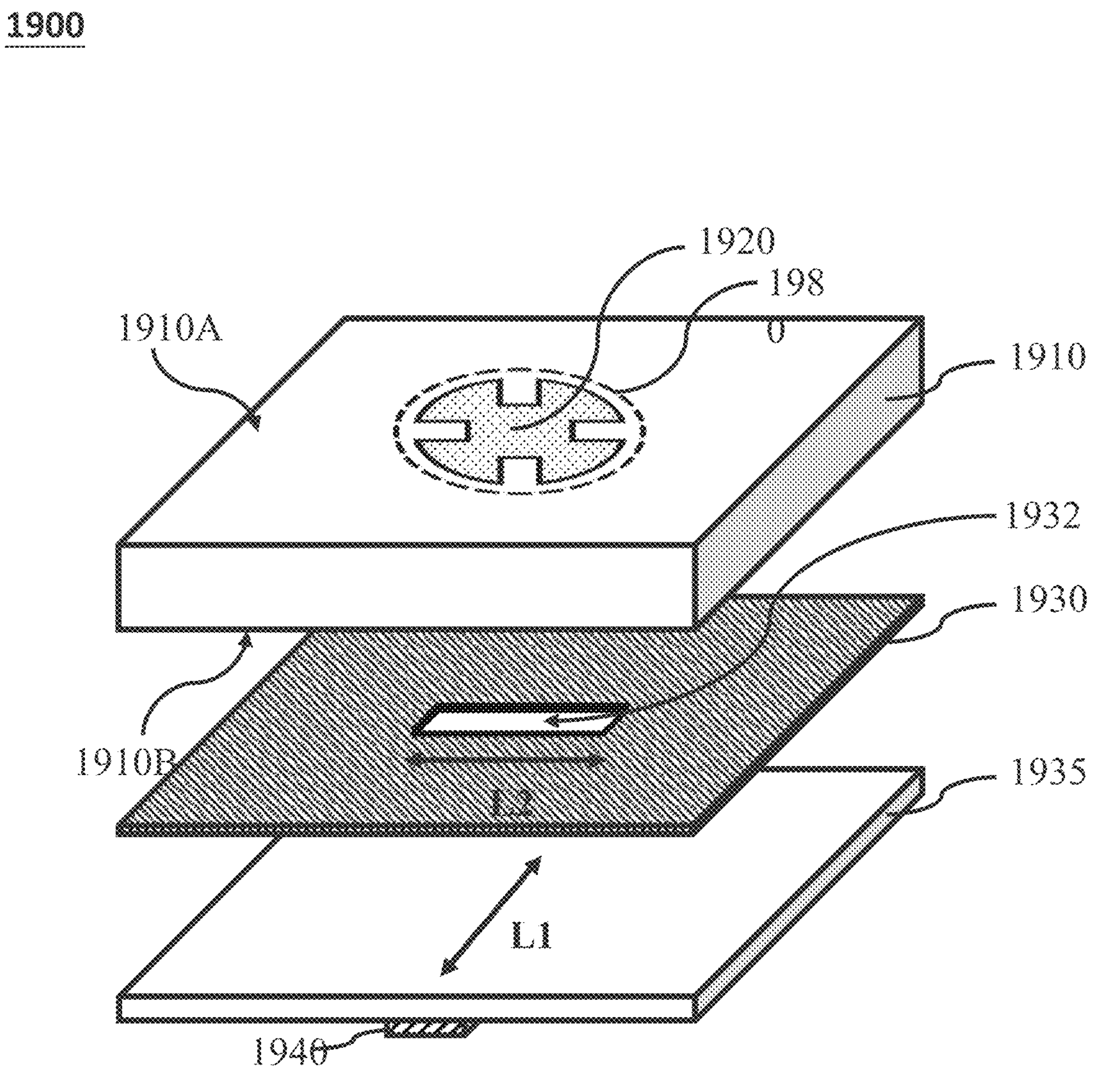
Figure 19C:
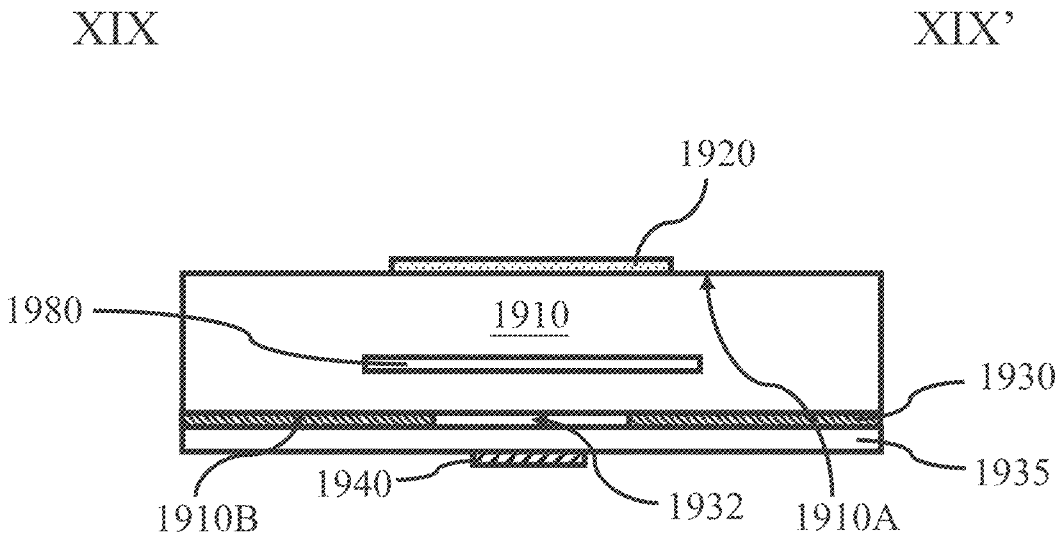
Figure 20:
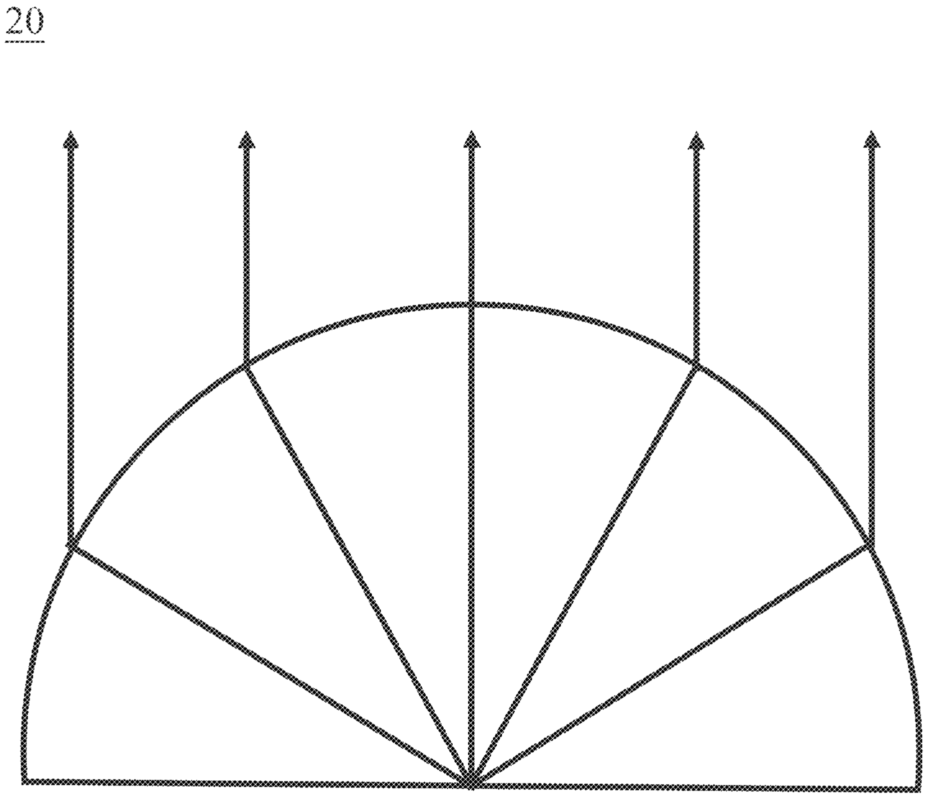
FIG. 20 is a cross-sectional view of a conventional sub-wavelength structured enhancer 20.
Figure 21:
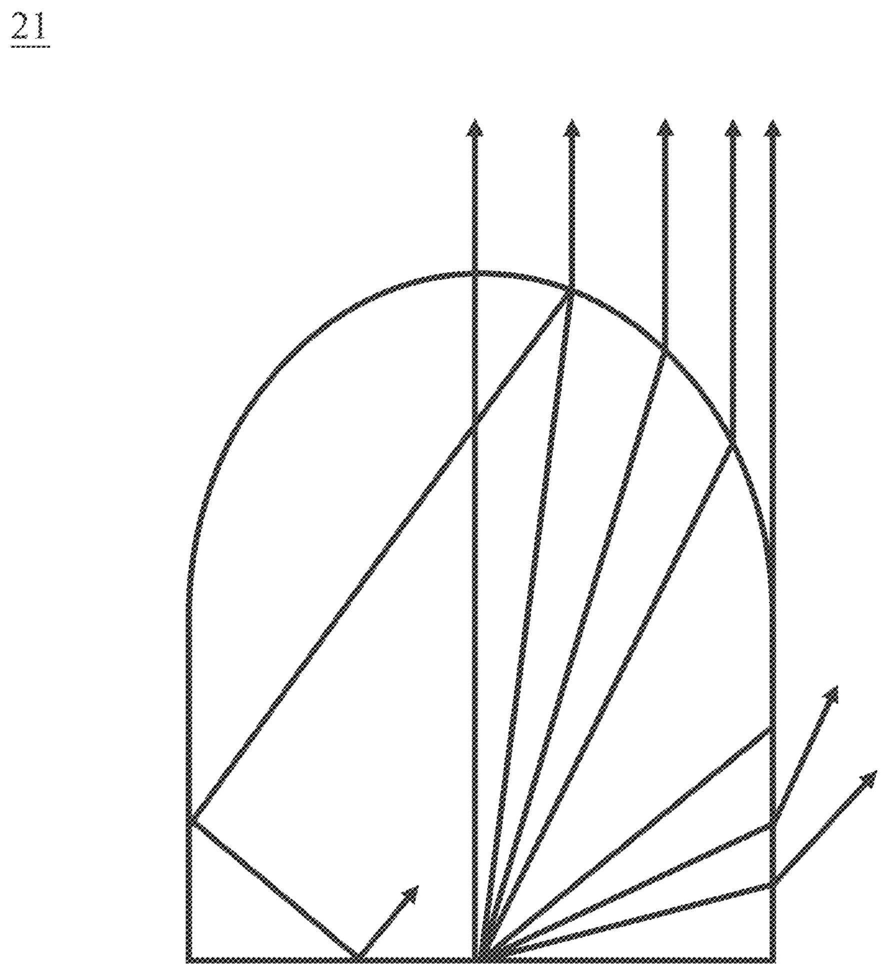
FIG. 21 is a cross-sectional view of another conventional sub-wavelength structured enhancer 21.
Figure 22:
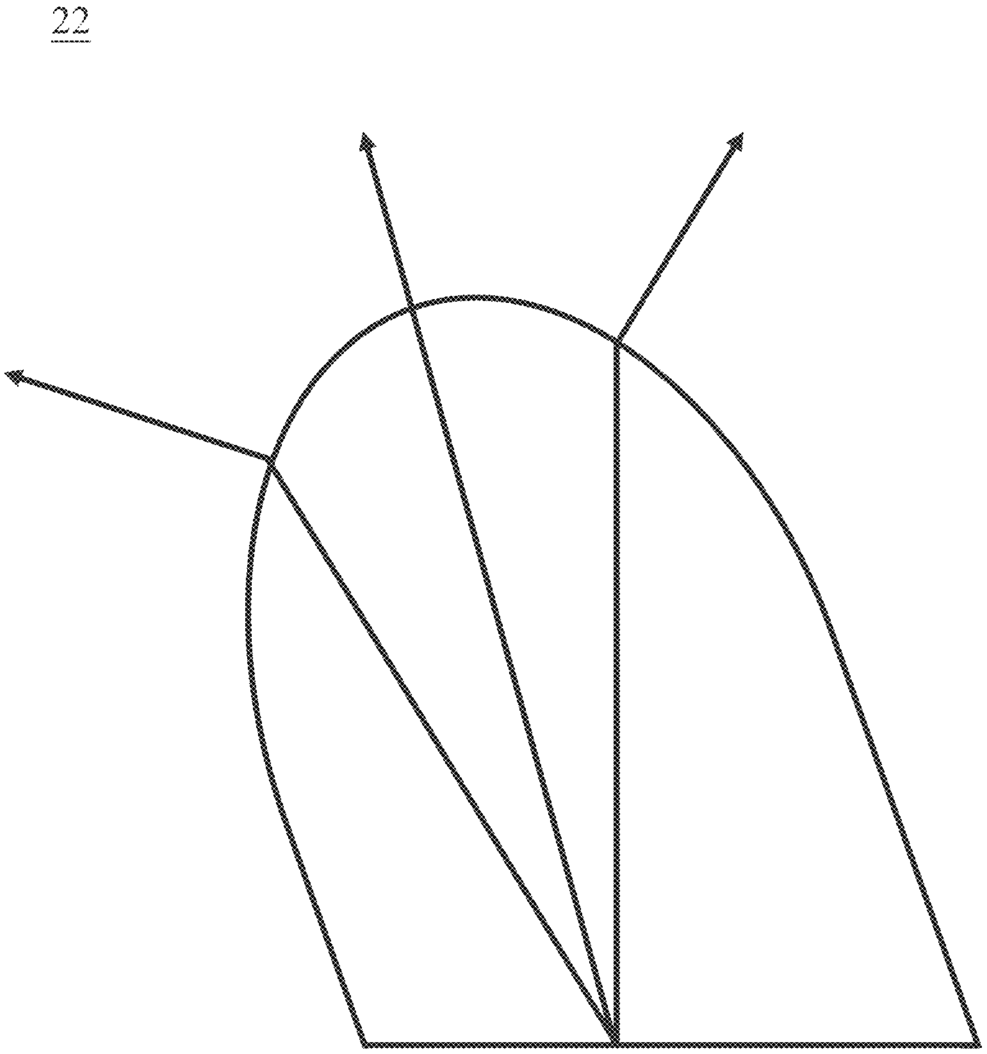
FIG. 22 is a cross-sectional view of another conventional sub-wavelength structured enhancer 22.

In order to compare the signal gain difference between the antenna assemblies according to this present invention and conventional antenna assemblies, the antenna assembly 1000 equipped with a sub-wavelength structured enhancer according to Embodiment 10 of this invention and a conventional antenna assembly 1900 as shown in FIGS. 19A~19C were measured and simulated. The signal gains of the antenna assembly 1000 equipped with a sub-wavelength structured enhancer according to Embodiment 10 of this invention and a conventional antenna assembly 1900 were simulated by HFSS (High Frequency Simulation Software) and measured by a Vector Network Analyzer under a radio wave of 11.7 GHz. As the diagram shown in FIG. 15F, comparing to the gain of the conventional antenna assembly 1900 as shown in FIGS. 19A~19C, the gain of the antenna assembly 1000 equipped with a sub-wavelength structured enhancer according to Embodiment 10 of this invention increases about 1.4 dBi when simulated under a radio wave of 11.7 GHz. As the diagram shown in FIG. 15G, comparing to the gain of the conventional antenna assembly 1900 as shown in FIGS. 19A~19C, the gain of the antenna assembly 1000 equipped with a sub-wavelength structured enhancer according to Embodiment 10 of this invention increases about 1.8 dBi when measured of 11.7 GHz. Moreover, as the diagram shown in FIG. 15H, comparing to the gains of the conventional antenna assembly 1900 as shown in FIGS. 19A~19C, the gains of the antenna assembly 1000 equipped with a sub-wavelength structured enhancer according to Embodiment 10 of this invention increase about 1~2 dBi when measured by a Vector Network Analyzer under a radio wave of between 11.7 GHz and 12.5 GHz. As the diagram shown in FIG. 15I, comparing to the directivity gains of the conventional antenna assembly 1900 as shown in FIGS. 19A~19C, the directivity gains of the antenna assembly 1000 equipped with a sub-wavelength structured enhancer according to Embodiment 10 of this invention increase about 1~1.8 dBi when measured by a Vector Network Analyzer under a radio wave of between 11.7 and 12.5 GHz.

Figure 15J:
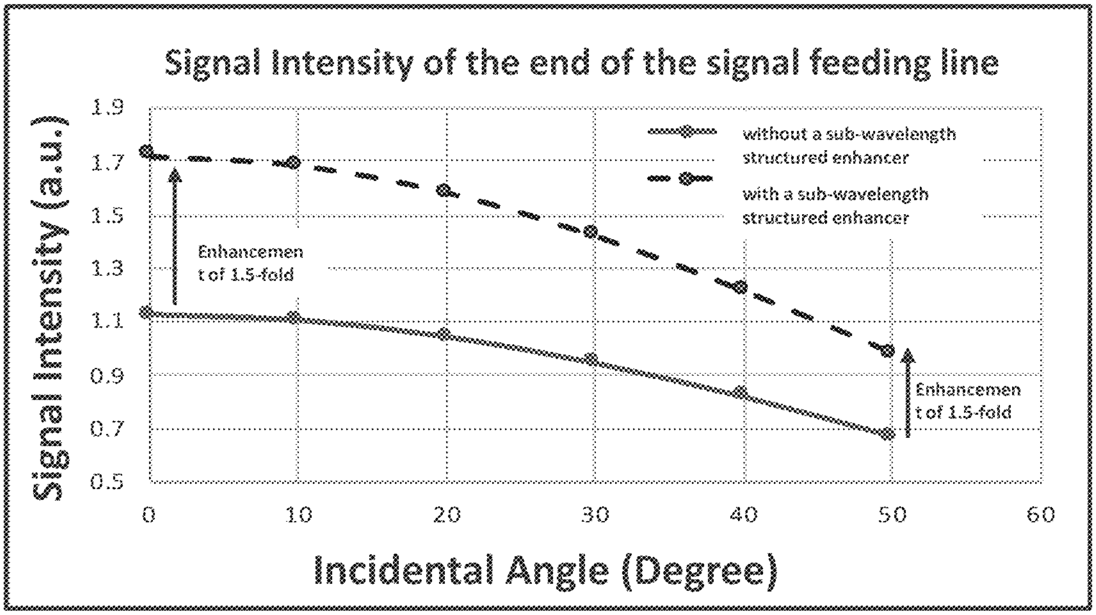
FIG. 15J is a diagram showing the signal intensities obtained from the end of the signal feeding line of the antenna assembly 1000 equipped with a sub-wavelength structured enhancer according to Embodiment 10 of this invention and signal intensities obtained from the end of the signal feeding line of the conventional antenna assembly 1900 as shown in FIGS. 19A~19C measured under a radio wave of 11.7 GHz and at an incidental angle of ranging between 0° and 50°.

In order to compare the signal gain difference between the antenna assemblies according to this present invention and conventional antenna assemblies at different incidental angles of radio waves, the antenna assembly 1000 equipped with a sub-wavelength structured enhancer according to Embodiment 10 of this invention and a conventional antenna assembly 1900 as shown in FIGS. 19A~19C were simulated by HFSS (High Frequency Simulation Software) under a radio waves of 11.7 GHz at an incidental angle between 0° and 50° relative to the normal line (not shown) of the top surface 1020A of the first patch antenna 1020 of the antenna assembly 1000 and the normal line (not shown) of the top surface 1920A of the first patch antenna 1920 of the conventional antenna assembly 1900 to simulate the signal intensity change of the end of the signal feeding line 1040 of the antenna assembly 1000 and the signal intensity change of the end of the signal feeding line 1940 of the conventional antenna assembly 1900. As shown in FIG. 15J, the signal intensity of the end of the signal feeding line 1040 of the antenna assembly 1000 is 1.5-fold of the signal intensity of the end of the signal feeding line 1940 of the conventional antenna assembly 1900 when simulated under a radio wave of 11.7 GHz at an incidental angle between 0° and 50°.

Figure 15K:
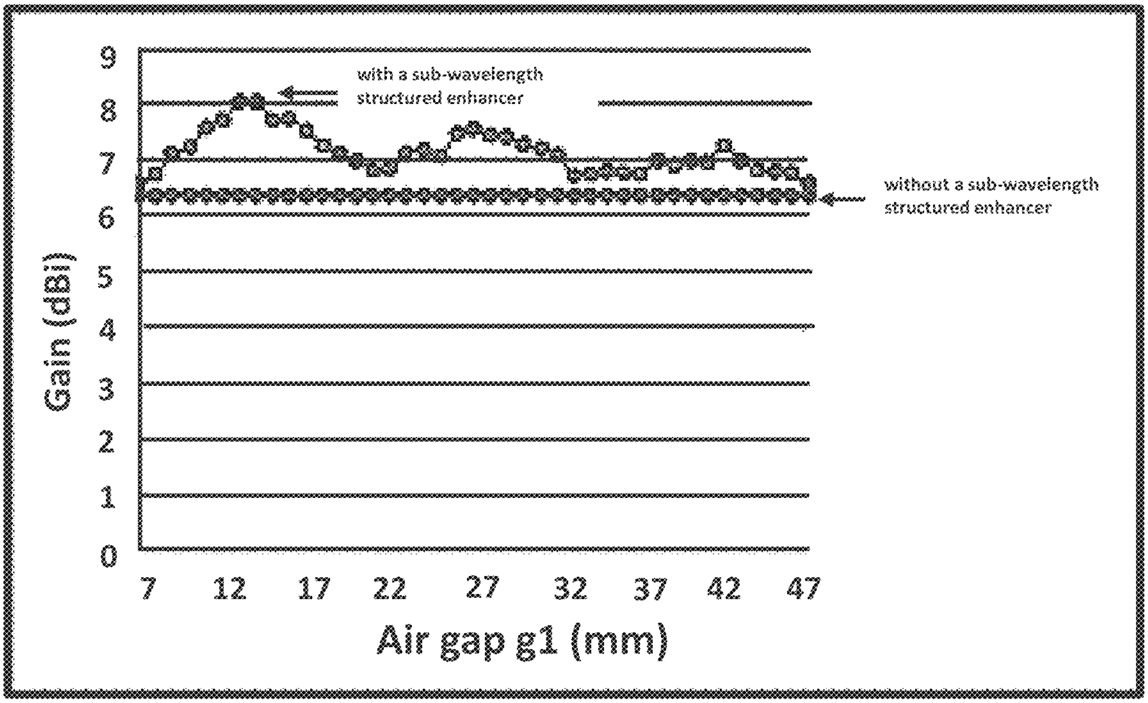
FIG. 15K is a diagram showing gains of the antenna assembly 1000 equipped with a sub-wavelength structured enhancer according to Embodiment 10 of this invention with different air gaps g1 ranging between 7 mm and 47 mm spaced between the sub-wavelength structured enhancer and the first patch antenna simulated under a radio waves of 11.7 GHz, and gains of the conventional antenna assembly 1900 without a sub-wavelength structured enhancer as shown in FIGS. 19A~19C simulated under a radio wave of 11.7 GHz.
Figure 16:
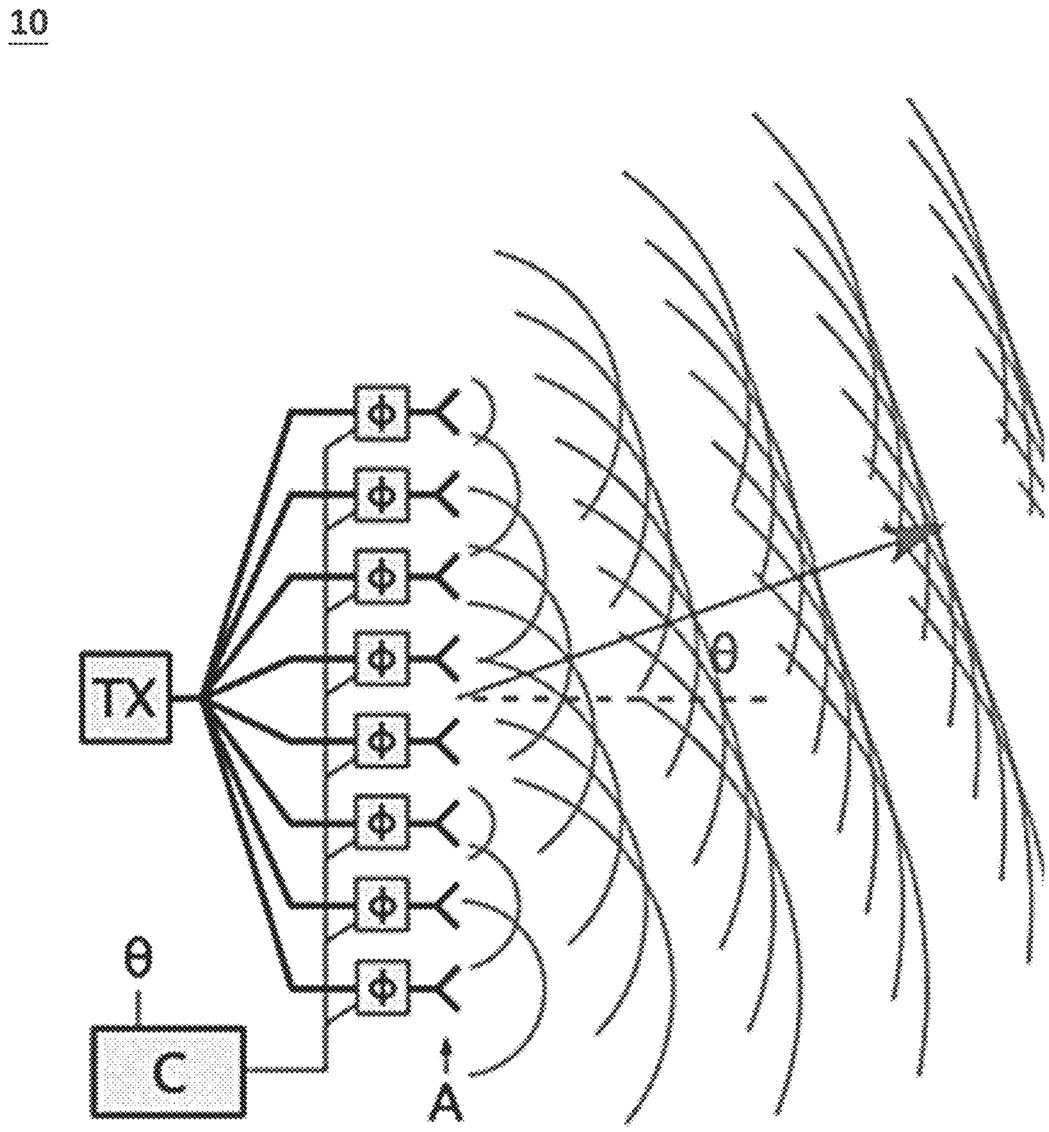
FIG. 16 is an operation schematic diagram of a conventional phased array antenna 10.
Figure 17A:
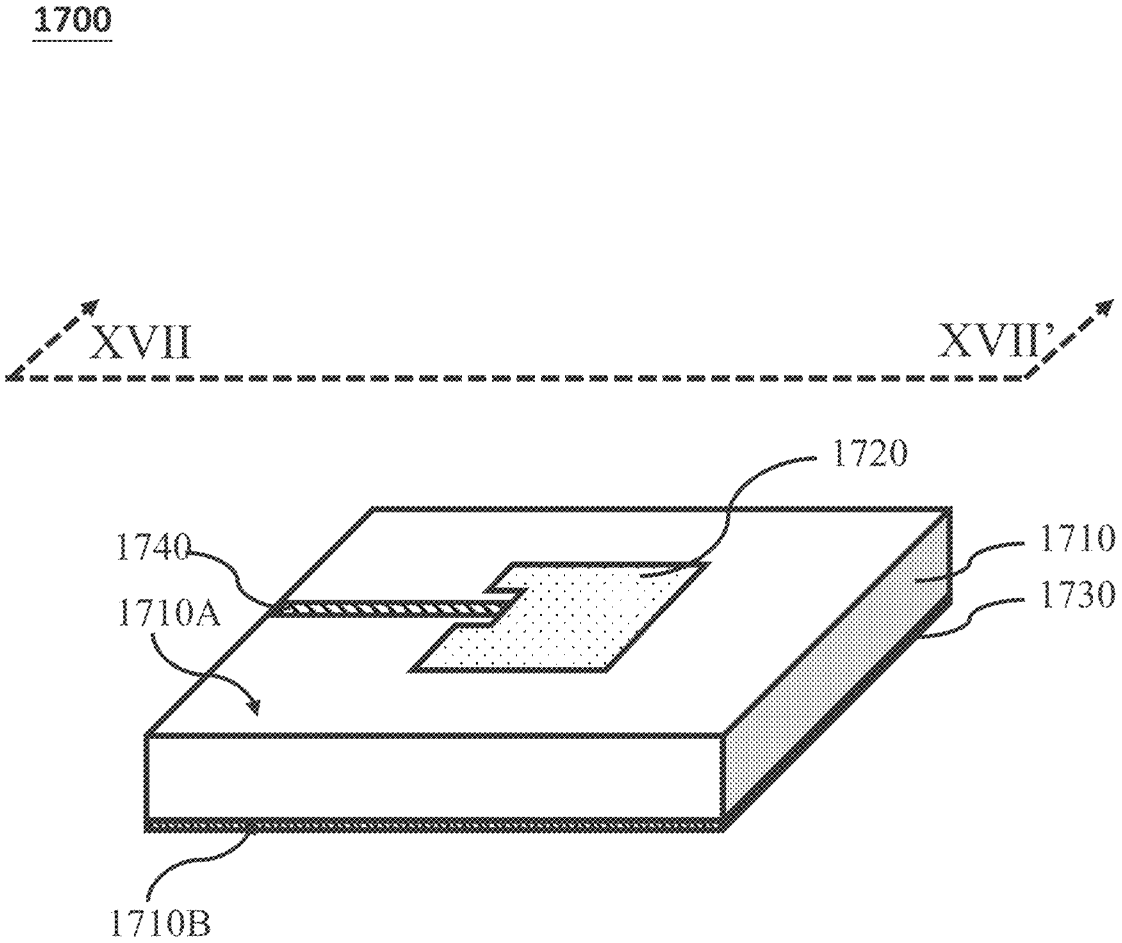
FIGS. 17A~17C are a schematic perspective view, an exploded view and a cross-sectional view along with the cross-sectional line XVII-XVII' of a conventional antenna assembly 1700.
Figure 17B:
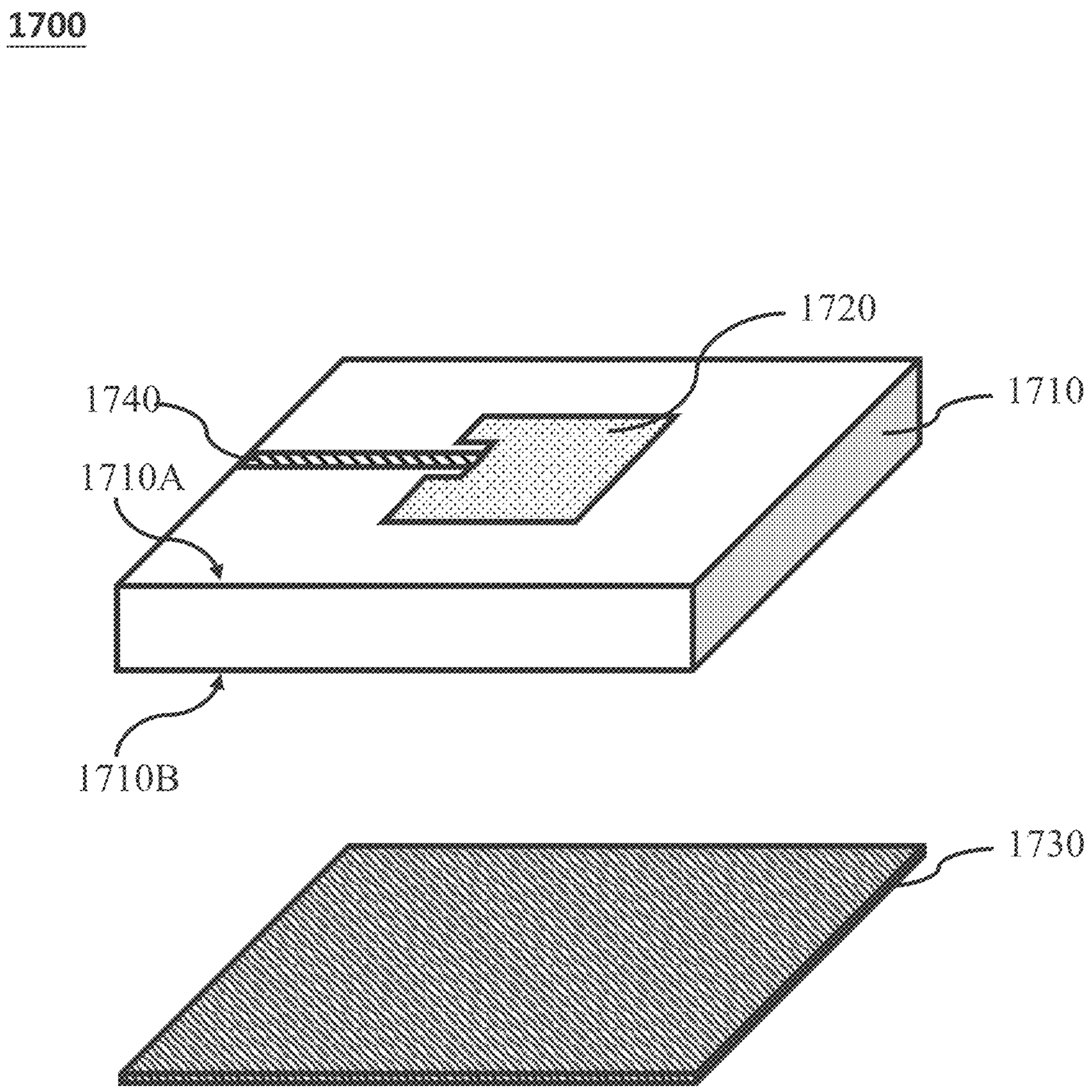
Figure 17C:
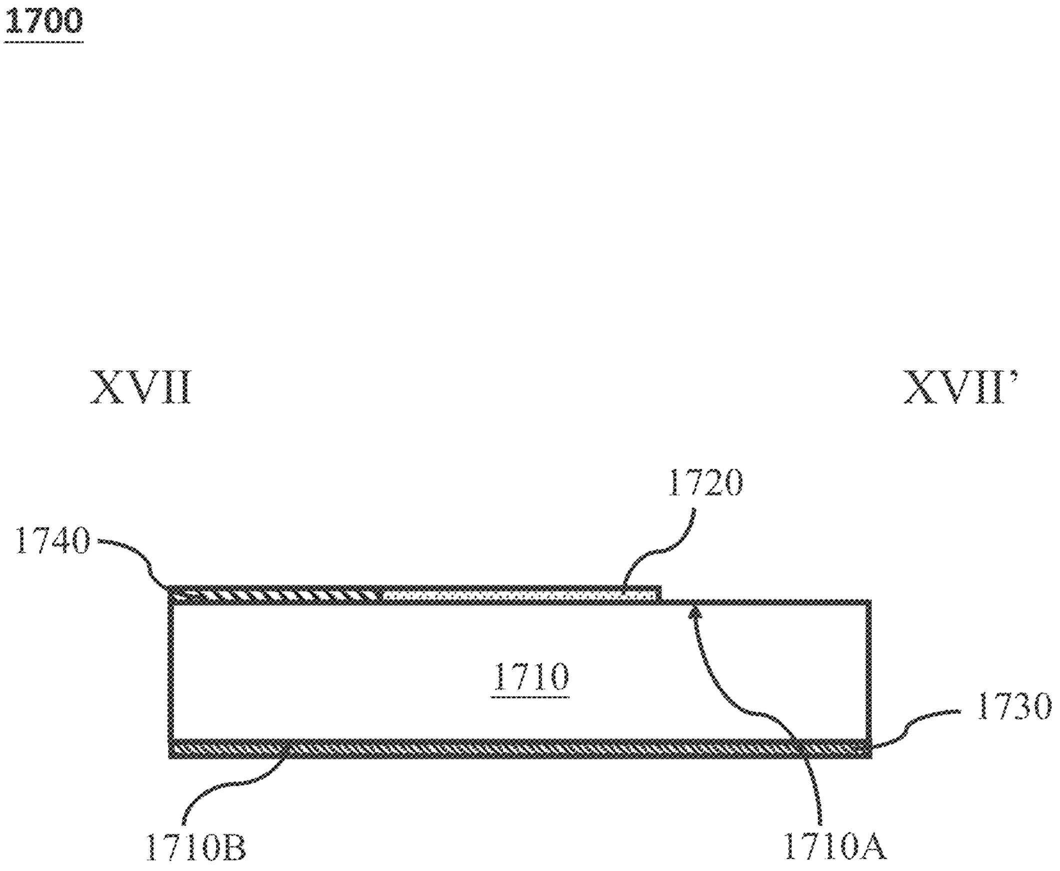
Figure 18A:
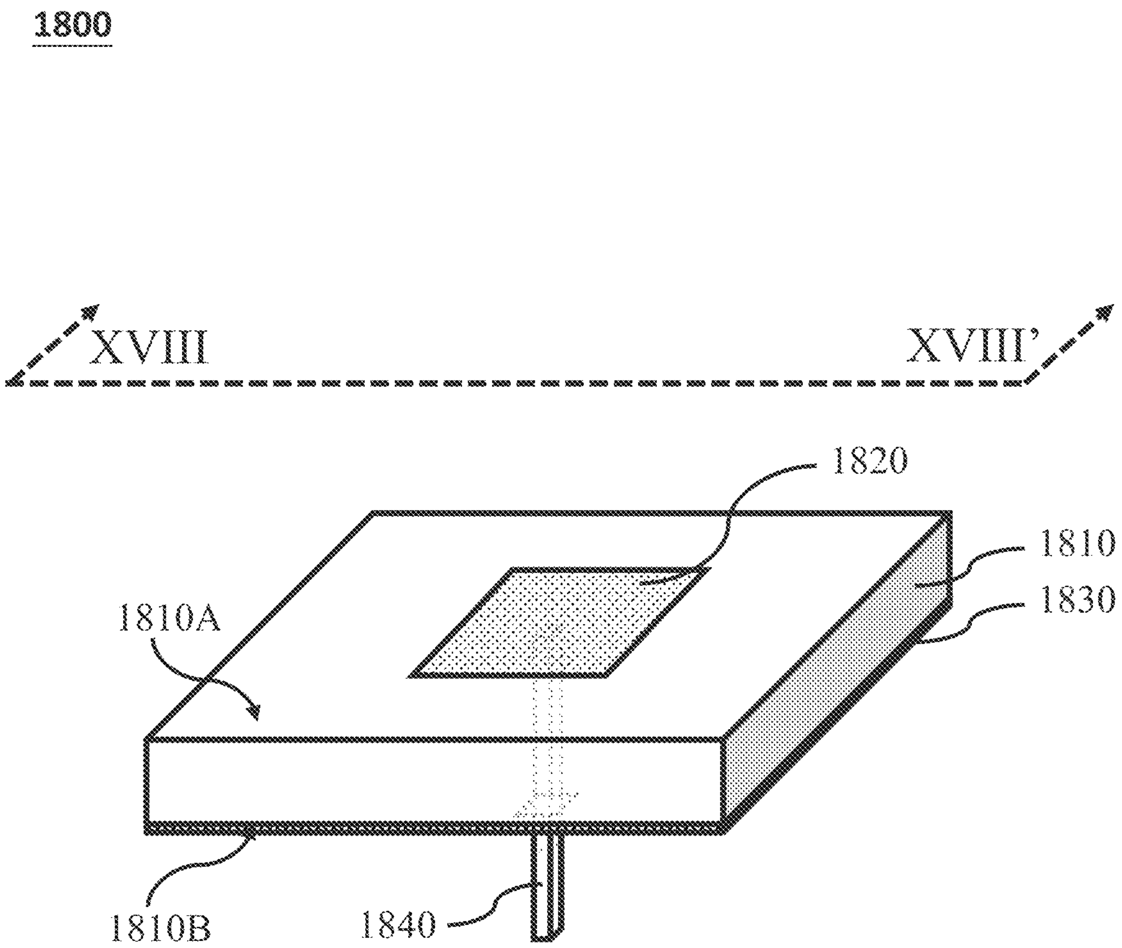
FIGS. 18A~18C are a schematic perspective view, an exploded view and a cross-sectional view along with the cross-sectional line XVIII-XVIII' of a conventional antenna assembly 1800.
Figure 18B:
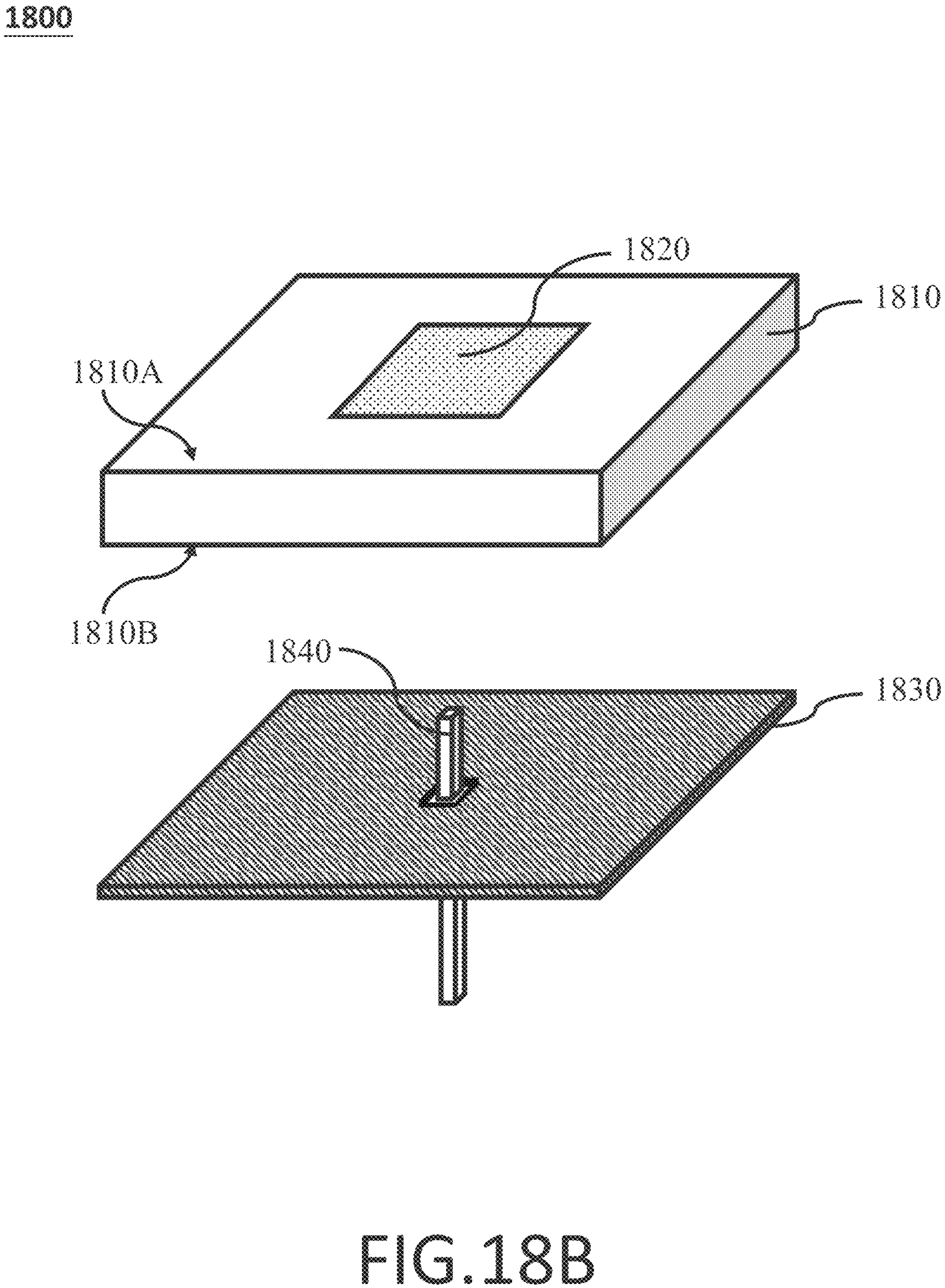
Figure 18C:
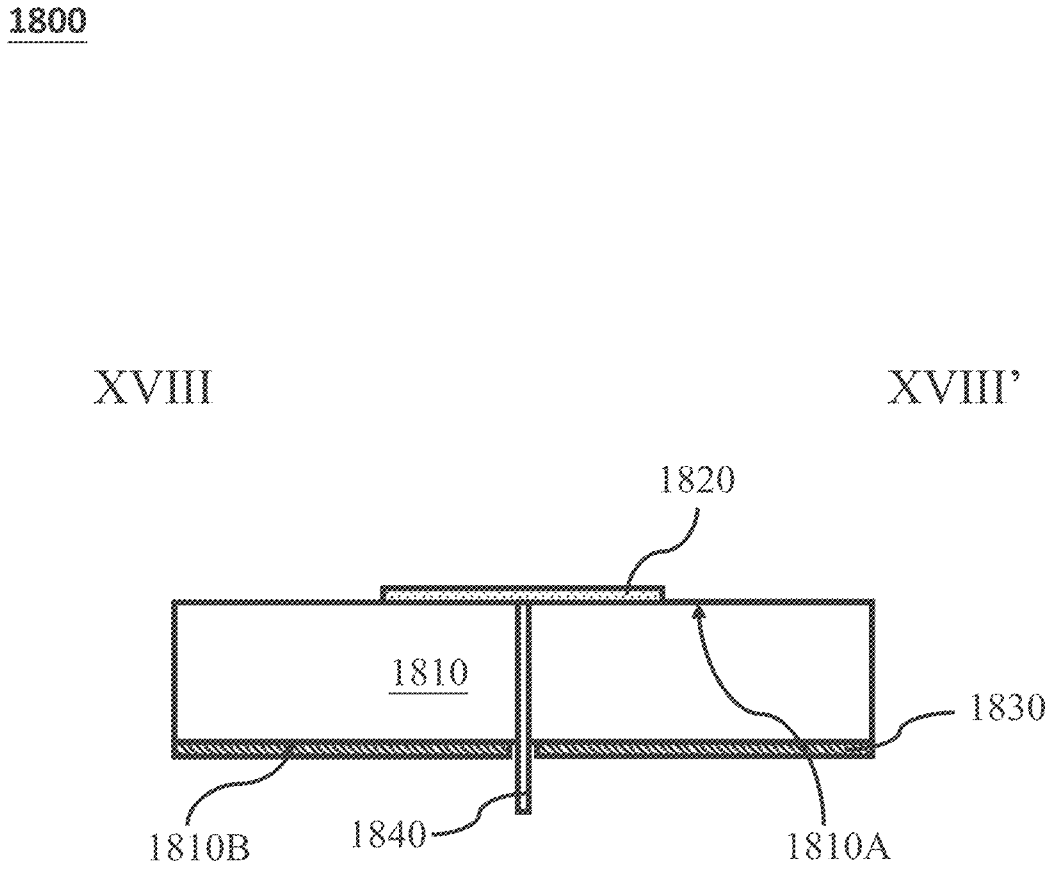

Furthermore, in order to compare the signal gain difference between the antenna assemblies according to this present invention under different air gaps g1 ranging between 7 mm and 47 mm spaced between the sub-wavelength structured enhancer and the first patch antenna, the antenna assembly 1000 equipped with a sub-wavelength structured enhancer according to Embodiment 10 of this invention and a conventional antenna assembly 1900 as shown in FIGS. 19A~19C were simulated by HFSS (High Frequency Simulation Software) under a radio waves of 11.7 GHz. As shown in FIG. 15K, the gains of the antenna assembly 1000 equipped with a sub-wavelength structured enhancer according to Embodiment 10 of this invention vary with different air gaps g1 ranging between 7 mm and 47 mm spaced between the sub-wavelength structured enhancer 1050 and the first patch antenna 1020 and are all higher than the gains of the conventional antenna assembly 1900 without a sub-wavelength structured enhancer as shown in FIGS. 19A~19C when simulated under a radio waves of 11.7 GHz. The antenna assembly 1000 equipped with a sub-wavelength structured enhancer according to Embodiment 10 of this invention has a maximum gain when the air gap g1 spaced between the sub-wavelength structured enhancer 1050 and the first patch antenna 1020 is 13 mm.

To sum up, the antenna assembly equipped with a sub-wavelength structured enhancer according to this present invention can make the radio waves be diffracted when passing through the sub-wavelength structured enhancer thereof and combined (superimposed) to generate a standing wave thereafter. Comparing to the conventional antenna assembly, the antenna assembly equipped with a sub-wavelength structured enhancer according to this present invention has 1-2 dBi gain enhancement when measured of 11.7 GHz, and 1~1.8 dBi directivity gain enhancement when simulated under a radio wave of 11.7 GHz, and 1.5-fold enhancement of the signal intensity when simulated under a radio wave of 11.7 GHz at an incidental angle of between 0° and 50°. It demonstrates radio waves with a stronger signal intensity and a better quality can be transmitted by the antenna assembly equipped with a sub-wavelength structured enhancer according to this present invention. Consequently, the satellite antenna can be integrated with a small number of antenna assemblies, and the size of the satellite antenna can be greatly reduced, which is helpful to meet user's demand of reducing the satellite antenna's size, and helpful to the popularization of network in remote areas.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An antenna assembly equipped with a sub-wavelength structured enhancer, comprising:

an antenna supporting substrate with a top surface and a bottom surface opposite to each other;

a first patch antenna disposed on the top surface of the antenna supporting substrate or disposed inside of the antenna supporting substrate;

a ground layer disposed under the bottom surface of the antenna supporting substrate;

a signal feeding line for transmitting satellite signals disposed on one of surfaces of the antenna supporting substrate, or inside of the antenna supporting substrate, or under the first patch antenna, or under a side of the ground layer back to the antenna supporting substrate; and a sub-wavelength structured enhancer disposed above the first patch antenna, wherein the sub-wavelength structured enhancer is a solid structure and spaced with the first patch antenna by an air gap ranging between 7 mm and 47 mm, and a vertical projection of the sub-wavelength structured enhancer overlaps with a vertical projection of the first patch antenna;

wherein a maximum 1D linear dimension of the vertical projection of the sub-wavelength structured enhancer is not greater than the wavelength of Ku band, and the maximum 1D linear dimension of the vertical projection of the sub-wavelength structured enhancer is N-fold of the maximum 1D linear dimension of the vertical projection of the first patch antenna, and 1≤N≤ratio of [(wavelength of Ku band)/(the maximum 1D linear dimension of the vertical projection of the first patch antenna)], to make the satellite signals be diffracted when passing through the sub-wavelength structured enhancer.

2. The antenna assembly equipped with a sub-wavelength structured enhancer as claimed in claim 1, wherein the sub-wavelength structured enhancer is made of a non-metallic material.

3. The antenna assembly equipped with a sub-wavelength structured enhancer as claimed in claim 1, wherein the sub-wavelength structured enhancer has a polygonal bottom or a circular bottom.

4. The antenna assembly equipped with a sub-wavelength structured enhancer as claimed in claim 1, wherein the sub-wavelength structured enhancer has a structure of polygonal cylinder, polygonal pyramid, cylinder, cone, sphere, or hemisphere.

5. The antenna assembly equipped with a sub-wavelength structured enhancer as claimed in claim 1, wherein the maximum 1D linear dimension of the vertical projection of the sub-wavelength structured enhancer is not greater than 25 mm.

6. The antenna assembly equipped with a sub-wavelength structured enhancer as claimed in claim 1, wherein the signal feeding line and the first patch antenna are disposed on a same or different surfaces of the antenna supporting substrate and connected to each other.

7. The antenna assembly equipped with a sub-wavelength structured enhancer as claimed in claim 1, wherein the signal feeding line is disposed under the first patch antenna, and the signal feeding line connects with the first patch antenna by running through the ground layer and part or all of the antenna supporting substrate.

8. The antenna assembly equipped with a sub-wavelength structured enhancer as claimed in claim 1, wherein the signal feeding line is disposed under a side of the ground layer back to the antenna supporting substrate, and the ground layer has a coupling slit corresponding to the first patch antenna, and a vertical projection of a first long axis direction L1 of the signal feeding line and a vertical projection of a second long axis direction L2 of the coupling slit are substantially orthogonal to each other to transmit the satellite signals by coupling effect.

9. The antenna assembly equipped with a sub-wavelength structured enhancer as claimed in claim 1, further comprising a second patch antenna disposed inside of the antenna supporting substrate when the first patch antenna disposed on the top surface of the antenna supporting substrate, wherein the signal feeding line and the second patch antenna are disposed on a same or different surfaces of the antenna supporting substrate and connected with each other, or the signal feeding line is disposed under the second patch antenna and connected to the second patch antenna by running through part of the antenna supporting substrate and the ground layer, or the signal feeding line is disposed under a side of the ground layer back to the antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

10. The antenna assembly equipped with a sub-wavelength structured enhancer as claimed in claim 1, further comprising a second patch antenna disposed on the bottom surface of the antenna supporting substrate when the first patch antenna disposed on the top surface of the antenna supporting substrate, wherein the signal feeding line is disposed under a side of the ground layer back to the antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

11. An antenna assembly equipped with a sub-wavelength structured enhancer, comprising:

- a first antenna supporting substrate with a first top surface and a first bottom substrate opposite to each other;
- a first patch antenna disposed on the first top surface or the first bottom surface of the first antenna supporting substrate, or disposed inside of the first antenna supporting substrate;
- a second antenna supporting substrate with a second top surface and a second bottom substrate opposite to each other, wherein the second antenna supporting substrate is disposed under the first antenna supporting substrate, and the second top surface of the second antenna supporting substrate is facing to the first bottom surface of the first antenna supporting substrate;
- a second patch antenna disposed on the second top surface of the second antenna supporting substrate or disposed inside of the second antenna supporting substrate;
- a ground layer disposed under the second bottom surface of the second antenna supporting substrate;
- a signal feeding line for transmitting satellite signals disposed on one of surfaces of the second antenna supporting substrate, or disposed inside of the second antenna supporting substrate, or disposed under the second patch antenna, or disposed under a side of the ground layer back to the second antenna supporting substrate; and
- a sub-wavelength structured enhancer disposed above the first patch antenna, wherein the sub-wavelength structured enhancer is a solid structure and spaced with the first patch antenna by an air gap ranging between 7 mm and 47 mm, and a vertical projection of the sub-wavelength structured enhancer overlaps with a vertical projection of the first patch antenna and a vertical projection of the second patch antenna;

wherein a maximum 1D linear dimension of the vertical projection of the sub-wavelength structured enhancer is not greater than the wavelength of Ku band, and the maximum 1D linear dimension of the vertical projection of the sub-wavelength structured enhancer is greater than or equal to a maximum 1D linear dimension of the vertical projection of the first patch antenna to make the satellite signals be diffracted when passing through the sub-wavelength structured enhancer.

12. The antenna assembly equipped with a sub-wavelength structured enhancer as claimed in claim 11, wherein the sub-wavelength structured enhancer is made of a non-metallic material.

13. The antenna assembly equipped with a sub-wavelength structured enhancer as claimed in claim 12, wherein the sub-wavelength structured enhancer has a polygonal bottom or a circular bottom.

14. The antenna assembly equipped with a sub-wavelength structured enhancer as claimed in claim 13, wherein the sub-wavelength structured enhancer has a structure of polygonal cylinder, polygonal pyramid, cylinder, cone, sphere, or hemisphere.

15. The antenna assembly equipped with a sub-wavelength structured enhancer as claimed in claim 11, wherein the maximum 1D linear dimension of the vertical projection of the sub-wavelength structured enhancer is not greater than 25 mm.

16. The antenna assembly equipped with a sub-wavelength structured enhancer as claimed in claim 11, wherein the signal feeding line and the second patch antenna are disposed on a same or different surfaces of the second antenna supporting substrate and connected to each other.

17. The antenna assembly equipped with a sub-wavelength structured enhancer as claimed in claim 11, wherein the signal feeding line is disposed under the second patch antenna, and the signal feeding line connects with the second patch antenna by running through the ground layer and part or all of the second antenna supporting substrate.

18. The antenna assembly equipped with a sub-wavelength structured enhancer as claimed in claim 11, wherein the signal feeding line is disposed under a side of the ground layer back to the second antenna supporting substrate, and the ground layer has a coupling slit corresponding to the second patch antenna, and a vertical projection of a first long axis direction L1 of the signal feeding line and a vertical projection of a second long axis direction L2 of the coupling slit are substantially orthogonal to each other to transmit the satellite signals by coupling effect.

19. The antenna assembly equipped with a sub-wavelength structured enhancer as claimed in any one of claim 11, wherein the maximum 1D linear dimension of the vertical projection of the sub-wavelength structured enhancer is N-fold of the maximum 1D linear dimension of the vertical projection of the first patch antenna, and $1 \leq N \leq$ ratio of [(wavelength of Ku band)/(the maximum 1D linear dimension of the vertical projection of the first patch antenna)].

* * * * *